US010934053B1

(12) United States Patent
Payson

(10) Patent No.: US 10,934,053 B1
(45) Date of Patent: Mar. 2, 2021

(54) ADJUSTABLE PALLET RACK

(71) Applicant: FreightWeb Services, Inc., Mercer Island, WA (US)

(72) Inventor: William Payson, Mercer Island, WA (US)

(73) Assignee: FreightWeb Services, Inc., Mercer Island, WA (US)

( * ) Notice: Subject to any disclaimer, the term of this patent is extended or adjusted under 35 U.S.C. 154(b) by 0 days.

(21) Appl. No.: 16/817,270

(22) Filed: Mar. 12, 2020

Related U.S. Application Data

(60) Provisional application No. 62/945,707, filed on Dec. 9, 2019.

(51) Int. Cl.
  *B65D 19/38* (2006.01)
  *B65D 19/42* (2006.01)
  *B65D 19/00* (2006.01)
  *B65D 21/02* (2006.01)

(52) U.S. Cl.
  CPC ....... *B65D 19/385* (2013.01); *B65D 19/0012* (2013.01); *B65D 19/42* (2013.01); *B65D 21/0235* (2013.01); *B65D 2519/0094* (2013.01); *B65D 2519/00542* (2013.01); *B65D 2519/00781* (2013.01); *B65D 2519/00786* (2013.01)

(58) Field of Classification Search
  CPC .. B65D 19/385; B65D 19/00; B65D 21/0235; B65D 2519/0094; B65D 2519/00955
  USPC .................. 108/53.1, 53.3, 53.5, 55.1, 51.11
  See application file for complete search history.

(56) References Cited

U.S. PATENT DOCUMENTS

| | | | | |
|---|---|---|---|---|
| 1,912,847 | A * | 6/1933 | Klepel | B62B 3/16 206/503 |
| 2,579,685 | A * | 12/1951 | Loose | B65D 19/385 108/53.5 |
| 2,941,772 | A * | 6/1960 | Thayer | A47B 57/14 108/53.1 |
| 3,273,720 | A * | 9/1966 | Seiz | A47B 57/402 211/192 |
| 3,400,671 | A * | 9/1968 | Erismann | B65D 19/0095 108/53.5 |
| 3,945,501 | A * | 3/1976 | Jay | B65D 61/00 211/194 |
| 3,998,169 | A * | 12/1976 | Koch | B65D 19/16 108/53.5 |
| 4,199,069 | A | 4/1980 | Talarico | |

(Continued)

*Primary Examiner* — Jose V Chen
(74) *Attorney, Agent, or Firm* — Morgan, Lewis & Bockius LLP

(57) ABSTRACT

Systems and devices are provided for loading a transportation unit. The system includes a pallet rack unit. The pallet rack unit is configured to receive and support loaded pallets. The pallet rack unit is configured to be loaded into the transportation unit with other pallet rack units that are substantially identical to the pallet rack unit. The pallet rack unit and the other pallet rack units, together, substantially fill a length and a width of the transportation unit. The pallet rack unit includes a base configured to receive a first loaded pallet. The pallet rack unit is further configured to be forkliftable. The pallet rack unit includes a plurality of posts coupled to the base and at least one height adjustable shelf coupled to the posts. The at least one height adjustable shelf is configured to receive and support a second loaded pallet. Additional shelves may be used to handle additional loaded pallets.

22 Claims, 31 Drawing Sheets

(56) References Cited

U.S. PATENT DOCUMENTS

| | | | |
|---|---|---|---|
| 4,266,678 A | 5/1981 | Daly | |
| 4,295,431 A * | 10/1981 | Stavlo | B65D 19/08 108/55.1 |
| 4,344,368 A * | 8/1982 | Remington | B65D 19/0022 108/55.1 |
| 4,703,702 A * | 11/1987 | Speicher | B65D 19/385 108/52.1 |
| 4,773,547 A | 9/1988 | Bell | |
| 4,901,650 A * | 2/1990 | Armstead | B65D 19/08 108/55.1 |
| 5,217,125 A | 6/1993 | Swanson | |
| 5,348,149 A * | 9/1994 | McCarthy | A47B 81/00 108/53.1 |
| 5,647,284 A * | 7/1997 | Frysinger | B65D 19/385 108/53.1 |
| 5,979,338 A * | 11/1999 | Salmanson | A47B 57/22 108/107 |
| 6,602,032 B2 * | 8/2003 | Arai | B65D 19/385 108/55.1 |
| 7,491,024 B2 * | 2/2009 | Heinrichs | B65D 19/12 108/53.1 |
| 7,997,213 B1 * | 8/2011 | Gauthier | B65D 88/022 108/55.1 |
| 8,317,039 B2 * | 11/2012 | Norman | A47F 5/118 211/60.1 |
| 9,340,322 B2 * | 5/2016 | Harris | A47B 47/028 |
| 10,029,820 B2 * | 7/2018 | Van Doorn | B65D 19/06 |
| 10,315,839 B2 * | 6/2019 | Kondoh | B65D 90/08 |
| 2007/0217883 A1 | 9/2007 | Heinrichs et al. | |
| 2009/0057191 A1 * | 3/2009 | Temple, Jr. | B65D 19/12 206/600 |
| 2010/0147842 A1* | 6/2010 | Reynard | B65D 90/22 220/23.88 |
| 2010/0178126 A1* | 7/2010 | Ness | B65D 90/0066 410/31 |
| 2013/0276677 A1* | 10/2013 | Kokatsu | B65D 19/0004 108/55.5 |
| 2017/0137210 A1* | 5/2017 | Kamata | H02S 30/20 |

* cited by examiner

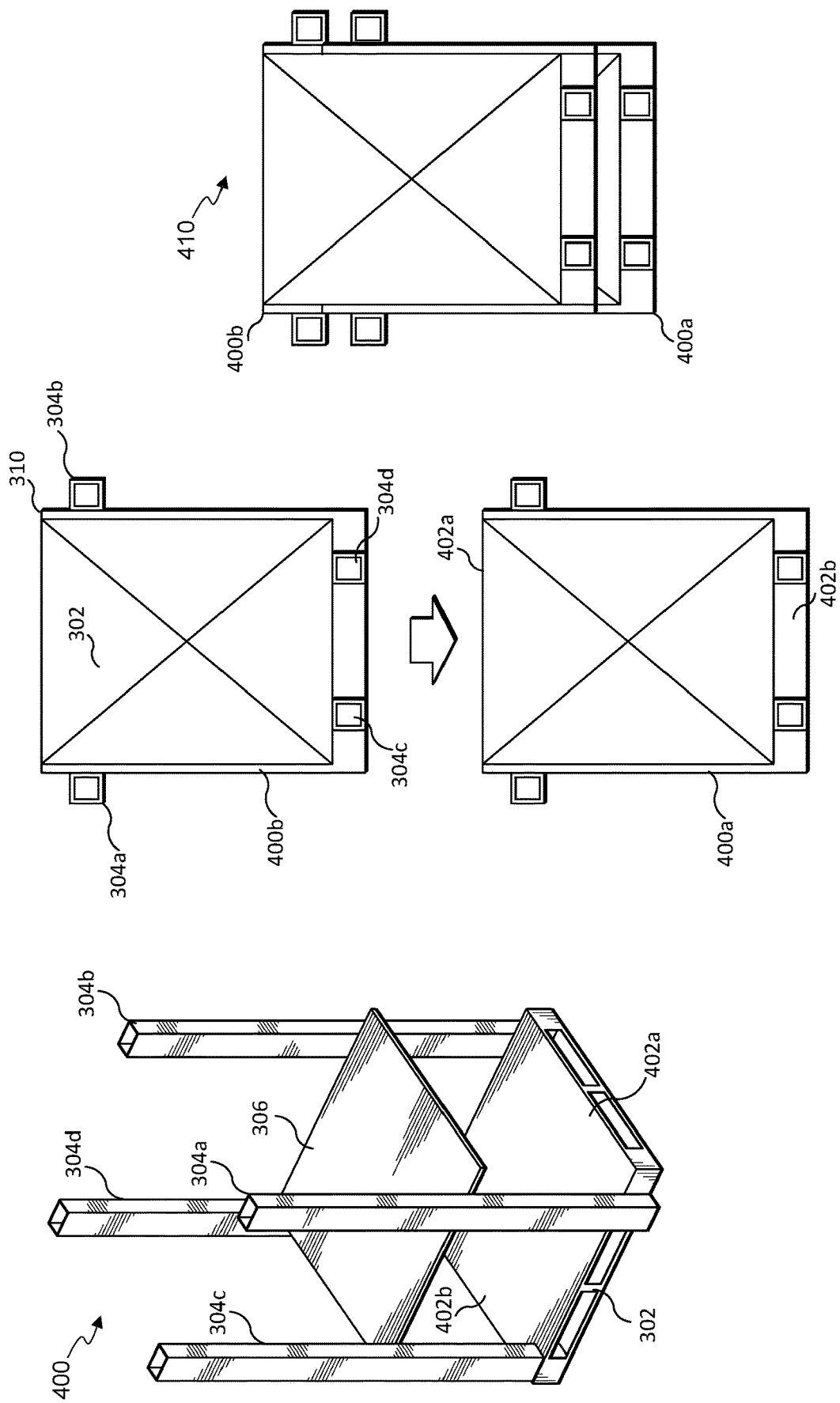

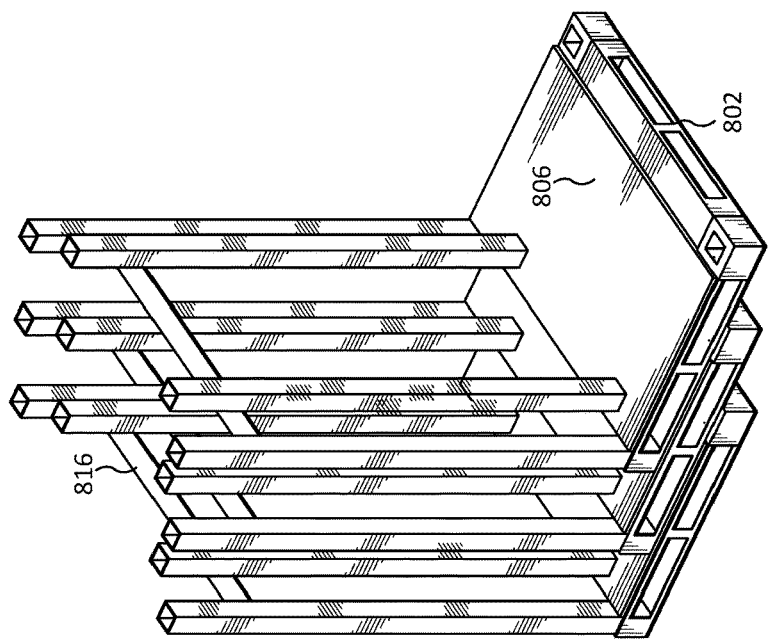
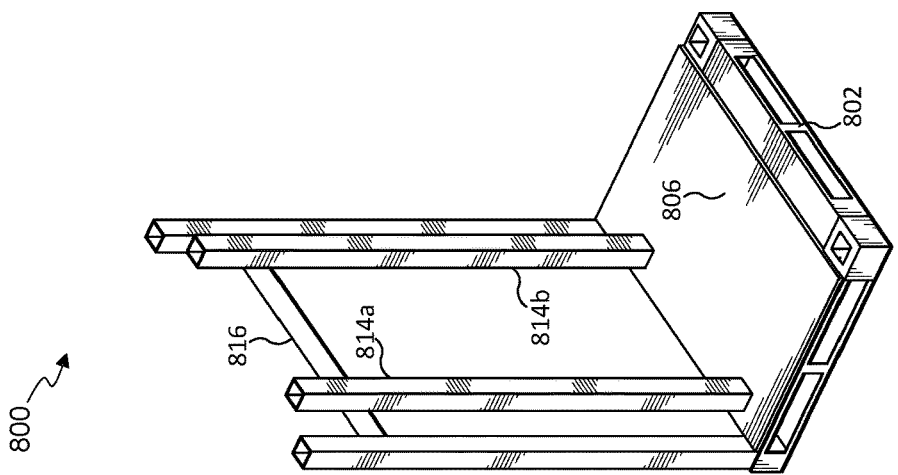
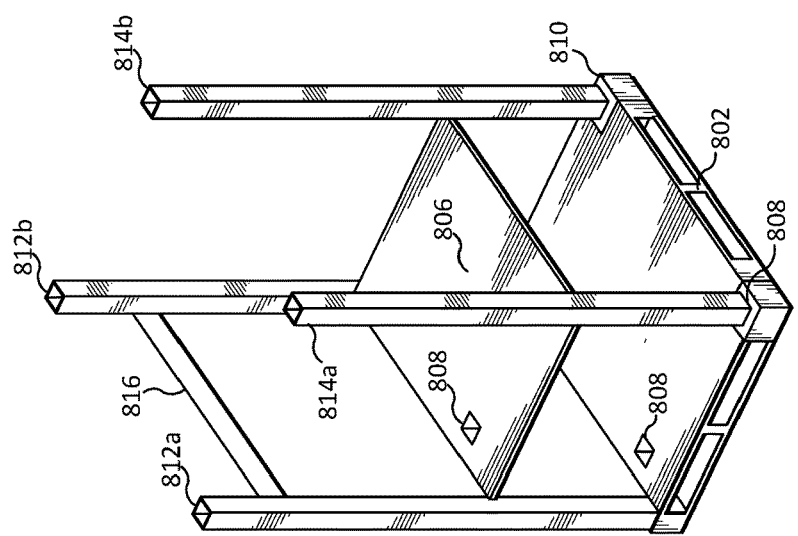
Figure 8C
Figure 8B
Figure 8A

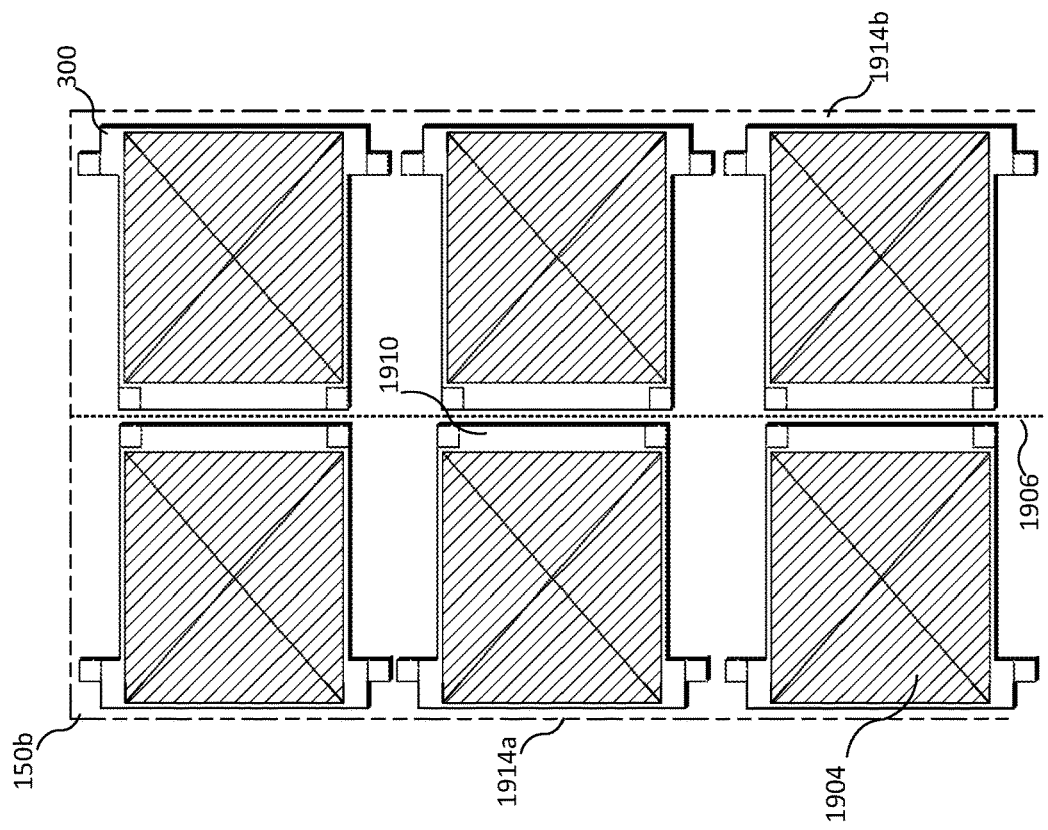
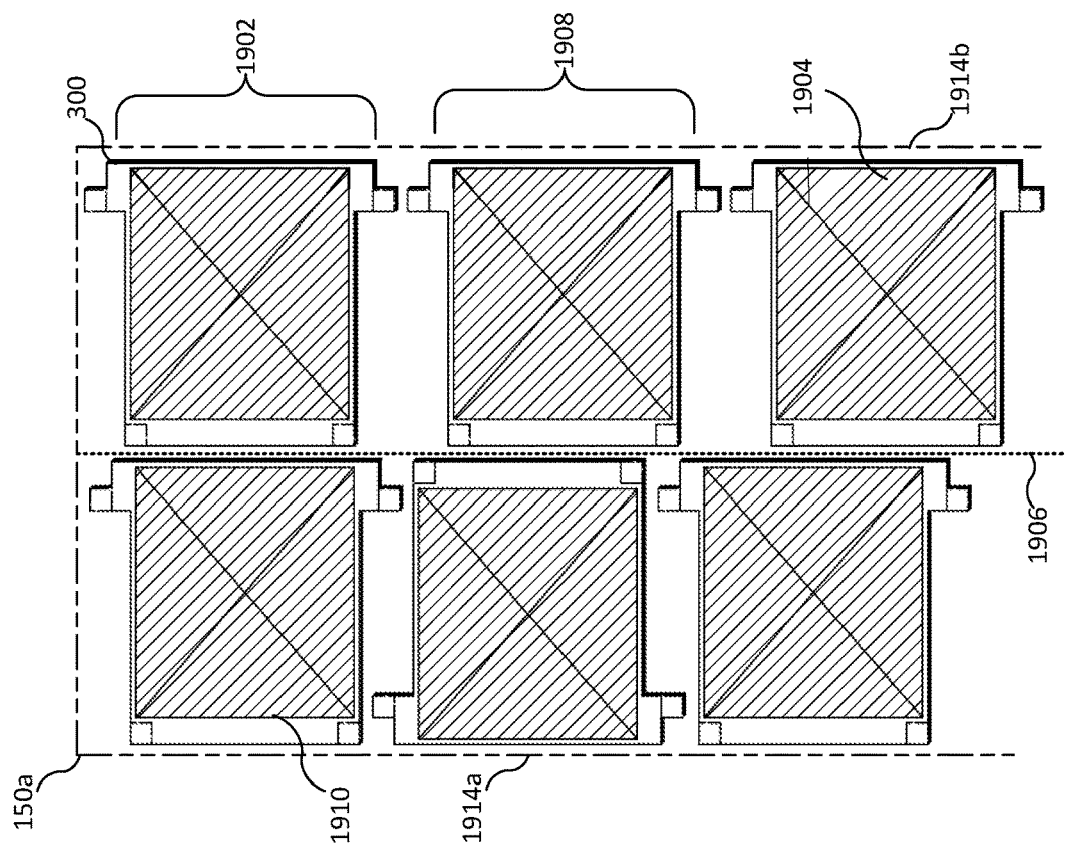
Figure 19A
Figure 19B

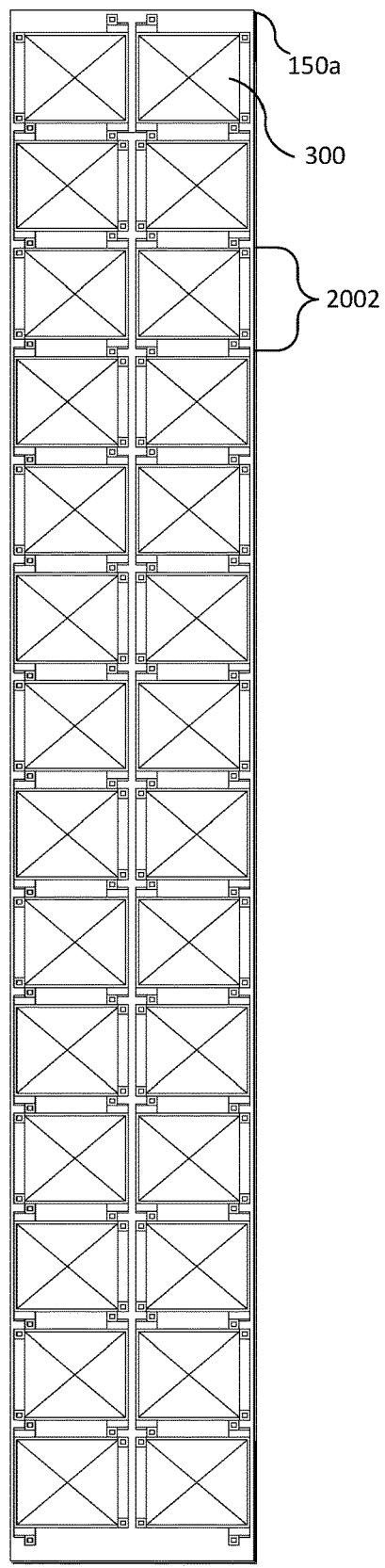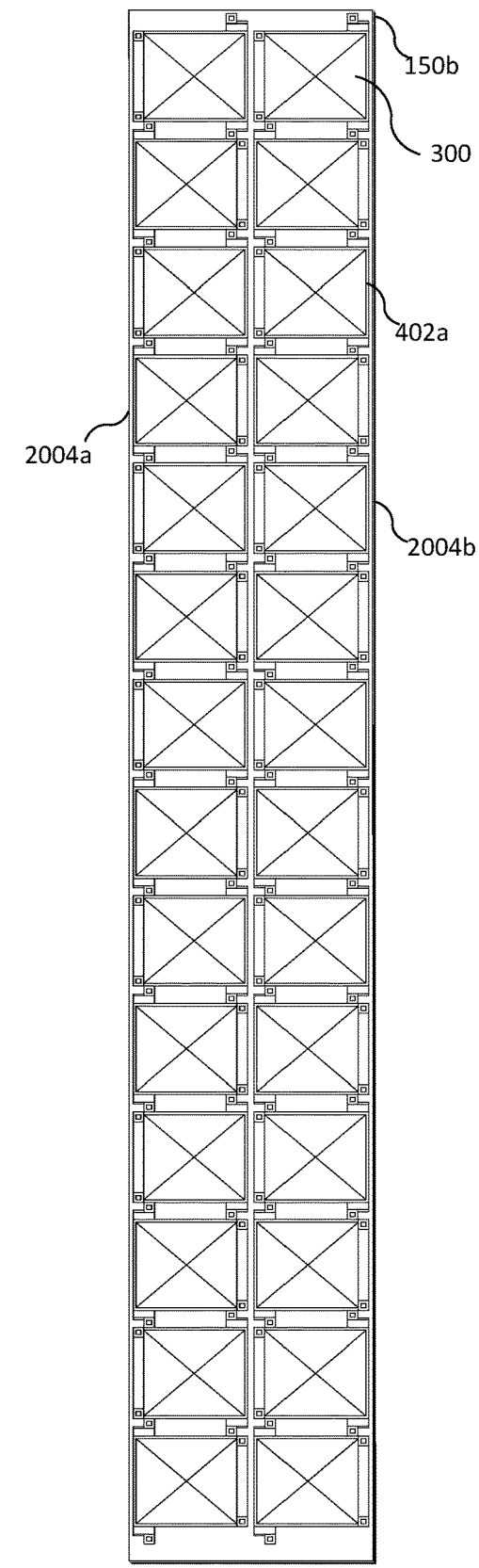
Figure 20A
Figure 20B

ADJUSTABLE PALLET RACK

RELATED APPLICATIONS

This application claims priority to U.S. Provisional Patent Application No. 62/945,707, filed Dec. 9, 2019, entitled "Adjustable Pallet Rack," which is hereby incorporated by reference in its entirety.

TECHNICAL FIELD

The disclosed embodiments relate generally to adjustable pallet racks that are used to store and transport loaded pallets or other cargo efficiently and flexibly in a variety of transportation units. Typically, the adjustable pallet rack includes adjustable shelves for supporting loaded pallets or other cargo and the pallet rack is designed to be raised and moved with a forklift vehicle or mechanical device, with the shelves adjusted to maximize the loaded efficiency of the pallet rack device and the transportation unit into which the pallet rack(s) are loaded.

BACKGROUND

Transportation units, such as trucks; tractor trailers; intermodal containers; trains; cars; or containers, transport large quantities of goods. In fact, it is estimated that about 70% of freight transported in the United States is via truck. Organizing the goods to efficiently fill the available space in a transportation unit can be difficult. Contributing factors to the difficulty of efficiently loading a truck include: (i) the variety of shapes and sizes in which goods come that make it hard to stack and load; (ii) a majority of pallets of goods cannot have other freight stacked on top of them without risk of damage to the palletized freight from crushing; (iii) the size of customer orders can vary and may not be large enough to fill a truck; and (iv) partial truckloads are often sent to meet a customer order that is not exactly a truckload quantity.

For these reasons and others, it is difficult with existing methods to combine loads from different shippers into a single truck as it can be difficult to estimate space required, and to efficiently load multiple shipments. Further, it is often not possible for shippers and carrier to efficiently use the available space and weight bearing capacity of the transportation unit. As an example of this, US DOT data shows that a majority of loaded Class 8 heavy duty trucks are less than half full by weight, and visual inspection of loaded tractor trailers often shows the top half of the transportation unit is unoccupied. As such, more efficient methods and systems for loading and transporting goods are needed.

SUMMARY

The adjustable pallet racks described herein facilitate storage of transported goods in transportation units while increasing the total space occupied in the transportation unit. More particularly, the adjustable pallet racks have been developed to more efficiently load the goods (including vertically) without placing additional weight or stress on the goods below and to efficiently use the full volume of a transportation unit. Furthermore, the adjustable pallet racks disclosed herein allow for additional flexibility and mobility of transported goods by providing adjustable shelves, moveable bases, and/or form factors that efficiently use the available space of a transportation unit while allowing for efficient handling of loaded pallet racks and efficient storage of unused pallet racks.

As an example of the design constraints that differentiate the pallet rack, space on a transportation unit is at a premium. If the transportation unit is not full by weight, then any unused cubic capacity is effectively wasted capacity. As such, the space occupied by a loading system, such as the pallet rack, and the space that is not usable for loading on the transportation unit due to the loading system (e.g., the gap between the pallet rack and the wall of the transportation unit) are wasted capacity if the truck is not at its weight limit. While wasted space in a warehouse is also a consideration, the effective cost of wasted capacity per square foot or cubic foot in a warehouse is much less than on a transportation unit. In addition, while warehouse aisles and layouts can be configured to a range of dimensions, transportation units dimensions are largely defined by legal and regulatory considerations (e.g., In the United States the maximum allowable exterior width of a trailer is 102.7").

As such, optimizing the design of a pallet rack for use on a transportation unit involves very different design considerations than optimizing a rack system for a warehouse environment. As an example, an implementation of a pallet rack for US deployment may be designed to receive and support palletized freight with dimensions of 48 in.+/−1.5 in by 40 in.+/−1.5 in such that two pallets racks (e.g., a pallet rack row) may be loaded across an interior trailer width of at least 100 in. when loaded on a side of the palletized freight with dimensions approximately 48 in. (e.g., approximately 96 in. of freight used by a pallet rack row in an at least 100 in. wide trailer). The example implementation is further configured such that 14 pallet rack rows may be loaded along the length of an at least 53 ft. trailer (e.g., each row using approximately between 40 and 45 in. of the length of an at least 53 ft. trailer). The exemplary implementation utilizes the space available for loading a transportation unit while minimizing the space occupied by the pallet racks and the space required to load the pallet racks in the transportation unit with a forklift.

Prior to a federal law change which authorized a width of 102 inches for commercial trucks, and the subsequent deployment of wider trailers with at least 100 inches of interior width, the example implementation with 14 rows of pallet racks for pallets of approximately 40 inches×48 inches would not have been feasible in a 53 ft. long transportation unit even with tight engineering. Precise engineering is also needed to reduce the space required from front to back on the transportation unit for the pallet racks and between each row of pallet racks on the transportation unit, as this can enable additional rows of pallet racks on the transportation unit (e.g., the example implementation supports at least 14 rows of 40 in. pallets in 53 ft. transportation unit compared to 13 rows of 40 in. pallets commonly achieved by prior art LTL loading systems that use logistics posts and decking). Different variations or embodiments of the example implementation allow for greater use of the available space or specialized for the need of the shippers or carriers (e.g., embodiments of the pallet racks disclosed herein allow for at least 15 rows to be loaded in a 53 ft. transportation unit; pallet racks may be configured to be nested; pallet racks may be collapsible for easy storage; pallet racks may be locked for added security; etc.).

The pallet rack design features are optimized for use on a transportation unit to improve efficiency. The pallet racks may increase load efficiency by as much as 200% when pallets are racked or loaded on at least 3 shelves per unit compared to floor loading unstackable pallets. Similarly, enabling at least 14 rows of pallets to be loaded in the transportation unit is roughly a 7.5% improvement in productivity (e.g., when compared to 13 rows loaded in the transportation unit). The greater the number of rows of pallets that may be loaded in the transportation the greater improvement in productivity. Additionally, the ability to forklift the pallet racks while they are loaded with freight both reduces handling costs, and helps enable this load efficiency.

The embodiments of the systems and methods described herein overcome the various limitations and disadvantages described above. In particular, the specification describes an adjustable pallet rack that is configured to receive and support at least two loaded pallets. A pallet, as described herein, is a portable platform on which goods can be stacked, moved, and stored, especially with the aid of a forklift.

The adjustable pallet rack is configured to be loaded into a transportation unit with other adjustable pallet racks that are substantially identical. A transportation unit as described herein is a straight truck (e.g., a truck where the cargo unit is fixed to the chassis of the truck), a swap body (e.g., a cargo unit that can be attached and removed from a truck or trailer chassis), a trailer (e.g. trailer of a tractor trailer), a truck, and/or an intermodal container (e.g., a cargo unit that can be attached and removed from either an intermodal trailer chassis or a rail car). The adjustable pallet racks, together, substantially fill a length and width of the transportation unit, as described in further detail below. Features of the adjustable pallet rack, e.g., positioning one or more shelves that support additional loaded pallets, moving the adjustable pallet rack, and storing unloaded adjustable pallet racks, are also describe in details below.

The adjustable pallet racks enable faster loading and unloading of transportation units. The adjustable pallet racks are configured to be forklifted (e.g., raised and moved by a forklift or similar device) while unloaded or loaded with goods. This allows for multiple pallets loaded in the adjustable pallet rack to be moved together, via forklift. A forklift as used herein is a motorized or non-motorized device or vehicle used to lift and move a pallet or pallet rack. Such forklifts typically have two prongs for engaging slots in a pallet (e.g., a forklift, pallet jack, walkie, and/or devices and/or devices that use forklift blades). In some embodiments, the forklift has the same or smaller width than an adjustable pallet rack. In other embodiments, a forklift does not include any prongs for engaging slots in a pallet and instead lifts and moves a pallet from underneath the pallet base (e.g., automated forklifts or robots).

Due to their ability to vertically stack pallets, adjustable pallet racks further reduce the loading dock (e.g., crossdock, freight dock, etc.) or storage (e.g., warehouse, storeroom, etc.) space required to stow freight that is awaiting transport via the transportation unit. The adjustable pallet racks enable for loading and/or unloading of pallets while in a loading dock or warehouse before being loaded into the transportation unit. In this way, shippers can reduce the amount of floor space required to stow goods near a loading dock while the goods await transport. Similarly, consignees that want to stage goods near a loading dock before stowing it in a warehouse or transferring it for further transportation are able to free floor space by loading the goods into the adjustable pallet racks while awaiting the next step in handling or transportation. The use of pallet racks can also increase truck dock productivity, by enabling more freight to be loaded or unloaded in a given amount of time, and by facilitating the use of consolidation trailers that handle several shipments on one truck, such that each shipment does not require its own loading dock.

The following presents a summary of the invention in order to provide a basic understanding of some of the aspects of the invention. This summary is not an extensive overview of the invention. It is not intended to identify key or critical elements of the invention or to delineate the scope of the invention. Its sole purpose is to present some of the concepts of the invention in a simplified form as a prelude to the more detailed description that is presented later.

In some embodiments, a pallet rack unit is configured to receive and support at least two loaded pallets. The pallet rack unit is further configured to be loaded into a transportation unit with other pallet rack units that are substantially identical to one another. The pallet rack units together substantially fill the length of the trailer. The pallet rack units together substantially fill the width of the trailer. The pallet rack unit includes a base configured to support a first loaded pallet of the at least two loaded pallets, wherein the base is forkliftable (e.g., capable of being lifted and transported by forklift and/or similar devices). The pallet rack unit includes a plurality of posts coupled to a base and at least one height adjustable shelf coupled to the posts. The at least one height adjustable shelf is configured to support a second loaded pallet of the at least two loaded pallets. In some embodiments, the base of the pallet rack units also includes wheels.

In other embodiments, the pallet rack unit includes a base configured to receive a first loaded pallet and is forkliftable. The pallet rack unit further includes a plurality of posts coupled to the base and at least one height adjustable shelf coupled to the posts. The at least one height adjustable shelf is configured to support a second loaded pallet. The pallet rack unit is further configured to be loaded into a transportation unit with other pallet rack units that are substantially identical to the pallet rack unit. The pallet rack unit and the other pallet rack units, that are substantially identical, substantially fill a length of the transportation unit. The pallet rack unit and the other pallet rack units, that are substantially identical, substantially fill a width of the transportation unit.

In some embodiments, the base is configured to be moved by a forklift, a pallet jack, a walkie, or an automated forklifts. In some embodiments, the plurality of posts coupled to the base includes at least four posts. In some embodiments, each post is coupled to a respective corner of the base. In some embodiments, the plurality of the posts are spaced such that the at least two loaded pallets are loaded from a first side of the pallet rack unit, the first side of the pallet rack unit configured to receive a short side of the at least two loaded pallets. In some embodiments, the plurality of the posts are spaced such that the at least two loaded pallets are loaded from a second side of the pallet rack unit, the second side of the pallet rack unit configured to receive a long side of the at least two loaded pallets. In some embodiments, the rack unit includes a cross-beam coupled between at least two posts of the plurality of posts and is aligned with a side of the base.

In some embodiments, the transportation unit is selected from the group consisting of: a truck, trailer of a tractor trailer, a swap body, or an intermodal container. In some embodiments, the pallet rack unit and the other pallet rack units are configured to be loaded into the transportation unit in two or more rows, the two or more rows substantially filling the length and width of the transportation unit. In some embodiments, substantially filling the width of the transportation unit leaves less than 6 inches of unused width in the transportation unit. In some embodiments, substantially filling the length of the transportation unit leaves less than 2 feet of unused length in the transportation unit. In some embodiments, the pallet rack unit includes an open top to allow a third loaded pallet of the at least two loaded pallets to extend above the plurality of posts. In some embodiments, the pallet rack unit and the other pallet rack units substantially fill a height of the transportation unit. In some embodiments, the base includes an opening for forklift access that is less than 3.25 inches high and a top of the base is less than 4.5 inches from the ground.

In some embodiments, dimensions of the at least two loaded pallets include a length of at least 42 inches and a width of at least 40 inches. In some embodiments, the first loaded pallet has first dimensions and the second loaded pallet has second dimensions, the first dimensions distinct from the second dimensions. In some embodiments, the at least two loaded pallets have a height of at least 4 feet. In some embodiments, the least one height adjustable shelf is configured to support at least 500 lbs.

In some embodiments, the pallet rack unit has a height of at least 72 inches and a first side of the pallet rack unit has a length less than 51 inches, the first side being the greatest length. In some embodiments, the at least one height adjustable shelf is covered with a nonslip coating.

In some embodiments, the other pallet rack units are configured to be nested within the pallet rack unit. In some embodiments, a first row of the two or more rows includes the pallet rack unit and a first other pallet rack unit. The first row has a first configuration, wherein the pallet rack unit and the first other pallet rack unit have respective loading sides facing each another. In some embodiments, a second row of the two or more rows is adjacent to the first row. The second row of the two or more rows includes a second pallet rack unit and a second other pallet rack unit, and the second row has a second configuration, wherein the second pallet rack unit and the second other pallet rack unit have respective loading sides facing opposite directions. In some embodiments, the two or more rows alternate between a first and second configuration. In some embodiments, the two or more rows alternate between the first configuration and the second configuration, wherein the first configuration and the second configuration are configured such the two or more rows have the plurality of posts of the respective pallet rack units partially overlapped. In some embodiments, the pallet rack unit and the other rack units are configured to be loaded into the transportation unit in 14 or more rows.

In some embodiments, the pallet rack unit and the other pallet rack units in each row of the two or more rows are coupled to one another. In some embodiments, the pallet rack unit and other pallet rack units are configured to be secured in place in the transportation unit. In some embodiments, the pallet rack unit and other pallet rack units are configured to be secured by a strap or beam coupled to the transportation unit. In some embodiments, a first row of the two or more rows is located within the transportation unit at a first end of the transportation unit, the first end of the transportation unit opposite the transportation unit entrance. A second row of the two or more rows is located within of the transportation unit at a second end of the transportation unit, the second end of the transportation unit adjacent to the transportation unit entrance. The second row of the two or more rows is configured to be adjusted into a distinct orientation, wherein the distinct orientation position the second row perpendicular to other rows of the two or more rows, and the distinct orientation is configured to create a space for accessing the first row of the two or more rows.

In some embodiments, the base of the pallet rack unit is foldable. In some embodiments, the pallet rack unit is configured to be nested within the other pallet rack units. In some embodiments, the pallet rack unit is collapsible. In some embodiments, the pallet rack unit includes one or more solid walls enclosing one or more sides of the pallet rack unit. In some embodiments, the a solid wall of the one or more solid walls includes a door that enables access to the interior of the pallet rack unit. In some embodiments, the door includes a locking system. In some embodiments, at least one solid wall of the one or more solid walls is configured to be folded. In some embodiments, at least one solid wall of the one or more solid walls is configured to be stowed.

In yet other embodiments, a method of loading and transporting pallet rack units in a transportation unit includes obtaining transportation data. The method includes determining a number of pallet racks units based on the transportation data. The number of determined pallet rack units is at least two pallet rack units. The method includes loading a pallet rack unit of the at least two pallet rack units with at least one loaded pallet. The method includes determining an arrangement of the pallet rack unit with other pallet rack units of the at least two pallet rack units. The method further includes loading the pallet rack unit in the transportation unit with the other pallet rack units of the at least two pallet rack units based on the determined arrangement of the pallet rack unit with other pallet rack units of the at least two pallet rack units and transporting the at least two pallet rack units to a predetermined location, the predetermined location based on the obtained transportation data.

In some embodiments, the transportation data includes goods data corresponding to the goods to be transported, the goods data including at least one of type of goods, weight of goods, quantity of goods, or condition of the goods. In some embodiments, the transportation data includes transportation unit data corresponding to the transportation unit, the transportation unit data including at least one of a type of transportation unit, dimensions of the transportation unit, condition of the transportation unit, or available space in the transportation unit. In some embodiments, the transportation data includes location data corresponding to the transportation location, the location data including at least one of a delivery location, route restriction, a route, or intermediate stops.

In some embodiments, the method includes, after determining the number of pallet racks units based on the transportation data, assembling the at least two pallet racks. In some embodiments, the method includes, after loading the pallet rack unit of the at least two pallet rack units with at least one loaded pallet, adjusting one or more height adjustable shelves of the pallet rack unit and loading an additional loaded pallet on the adjusted one or more height adjustable shelves of the pallet rack unit.

In some embodiments, the transportation data includes data for more than one shipment, each of which consists of one or more pallets, and will be loaded on one or more pallet racks. If the transportation data includes data for more than one shipment, the method will include assigning the shipments to a transportation unit. In some embodiments this will be done by using optimization or other algorithms to minimize the cost to transport the shipments within the service commitments and transit times committed to the shipper. If a given transportation unit will be used to handle more than one shipment, the method will also include sequencing the pickup stop and the delivery stop sequence. In some embodiments this will include arranging the sequence to that the first shipment pickup will be the last delivered, and so on, so that the amount of handling required at each freight dock will be minimized.

In other embodiments, the method includes, after transporting the at least two pallet rack units to a predetermined location (e.g., delivery location), storing the at least two pallet racks units. In some embodiments, before storing the at least two pallet racks units, the at least two pallet rack units are disassembled. In some embodiments, the method includes, before storing the at least two pallet rack units, strapping the at least two pallet rack units together. In other embodiments, the method includes determining a nesting number for nested pallet rack units, wherein the nested pallet racks include a nested number of pallet rack units equal to or less than the determined nesting number. In other embodiments, the method includes, determining a height for nested pallet rack units, wherein the nested pallet racks have a height equal to or less than the determined height for the nested pallet rack units.

Thus, these systems and methods provide new, flexible, and more efficient ways to load and organize loaded pallets into a transportation unit utilizing adjustable pallet racks.

Various embodiments of systems, methods, and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description," one will understand how the features of various embodiments are used.

BRIEF DESCRIPTION OF THE DRAWINGS

For a better understanding of the aforementioned aspects of the invention, as well as additional aspects and embodiments thereof, reference should be made to the Description of Embodiments below, in conjunction with the following drawings in which like reference numerals refer to corresponding parts throughout the figures.

FIGS. 4A-4D illustrate an adjustable pallet rack that is configured to be nested with other adjustable pallet racks in accordance with some embodiments.

FIGS. 8A-8C illustrate an adjustable pallet rack with removable posts in accordance with some embodiments.

FIGS. 19A-19C illustrate a top down view of configurations and/or positions of adjustable pallet racks in a transportation unit in accordance with some embodiments.

FIGS. 20A and 20B illustrate top down views of transportation units loaded with different positioning of adjustable pallet racks in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the present various embodiments may be practiced without these specific details. In other instances, well-known components and methods have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another e.g., first side panel and second side panel. For example, a first element could be termed a second element, and, similarly, a second element could be termed a first element, without changing the meaning of the description, so long as all occurrences of the first element are renamed consistently and all occurrences of the second element are renamed consistently. The first element and the second element are both elements, but they are not the same element.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, integers, steps, operations, elements, and/or components, but do not preclude the presence or addition of one or more other features, steps, elements, components, and/or groups thereof. Furthermore, as used herein, the term "if" may be construed to mean "when" or "upon" or "in response to," depending on the context.

Figure 1:
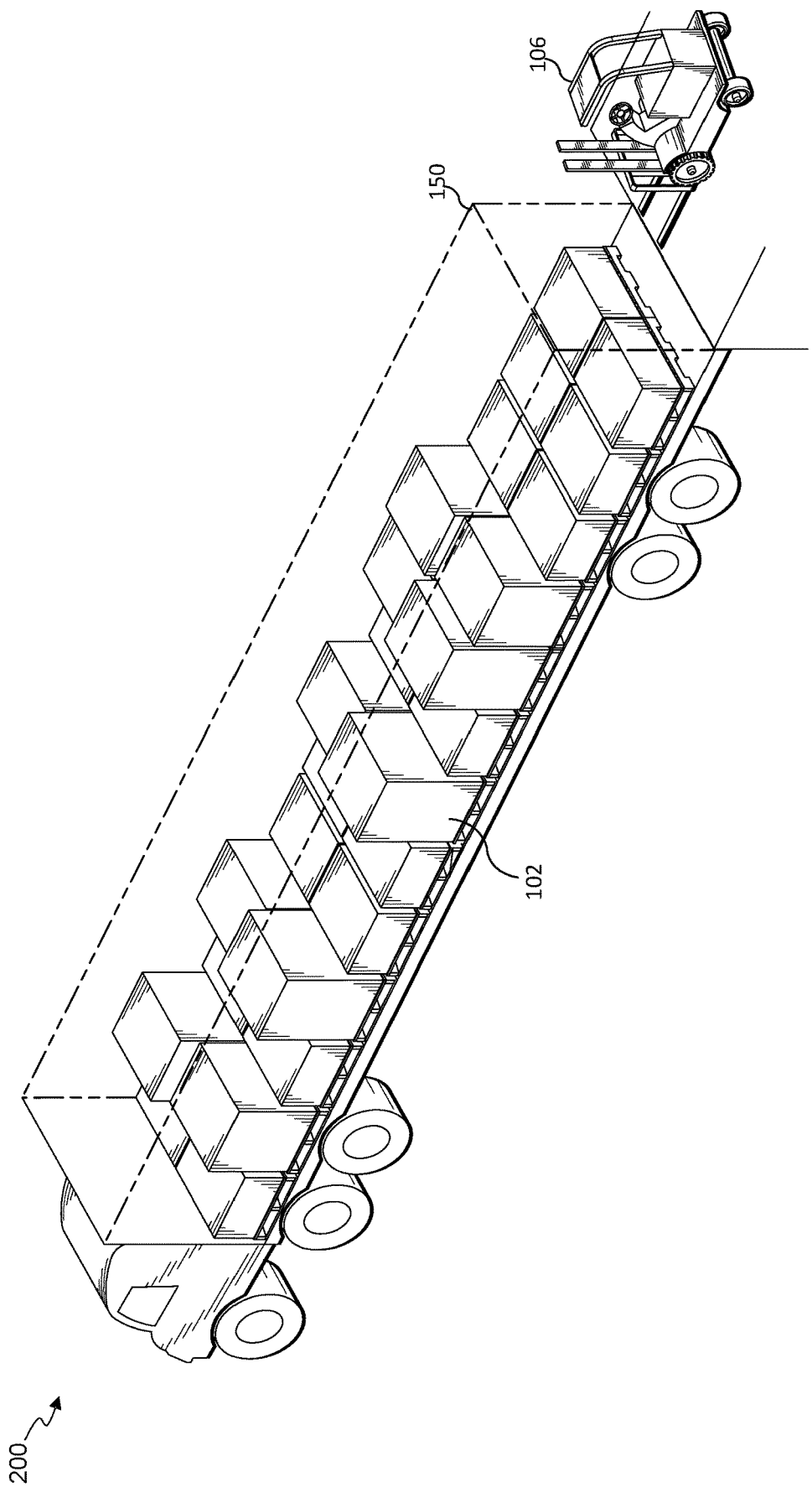
FIG. 1 illustrates a conventional prior art system for loading a transportation unit with palletized freight and/or other unpalletized freight.

FIG. 1 illustrates a conventional system for loading a transportation unit with palletized freight and/or other freight. Conventional system 100 shows a cutaway of transportation unit 150. As shown in FIG. 1, single loaded pallets 102 are loaded within the transportation unit 150 and each loaded pallet 102 occupies its own unit size and/or footprint (e.g., dimensions of a pallet as described herein). The individual loading of the loaded pallets 102 and unused space of the transportation unit 150 generate significant inefficiencies. In some embodiments, loaded pallets 102 range from approximately four to six feet in height. In some embodiments, loaded pallets 102 are not capable of supporting any weight and/or the weight of additional loaded pallets 102 stacked on top of them without the risk of damaging their freight (e.g., goods). In some embodiments, transportation units 150 are approximately 9 ft. 6 in. from floor to ceiling (e.g., in a standard US standard configuration) and has a nominal cubic capacity of approximately 4,000 cubic feet in this type of transportation unit. Conventional systems, as shown in FIG. 1, are typically unable to fully maximize use of the approximately 4,000 cubic feet. For example, conventional systems are able to load a transportation unit 150 less than half full (approximately 1,870 cubic feet) when twenty-eight 40 in.×48 in. pallets are loaded into the transportation unit 150 if every loaded pallet averages 5 ft. high. As such, better methods and systems are needed to maximize the available space of a transportation unit 150.

Figure 2:
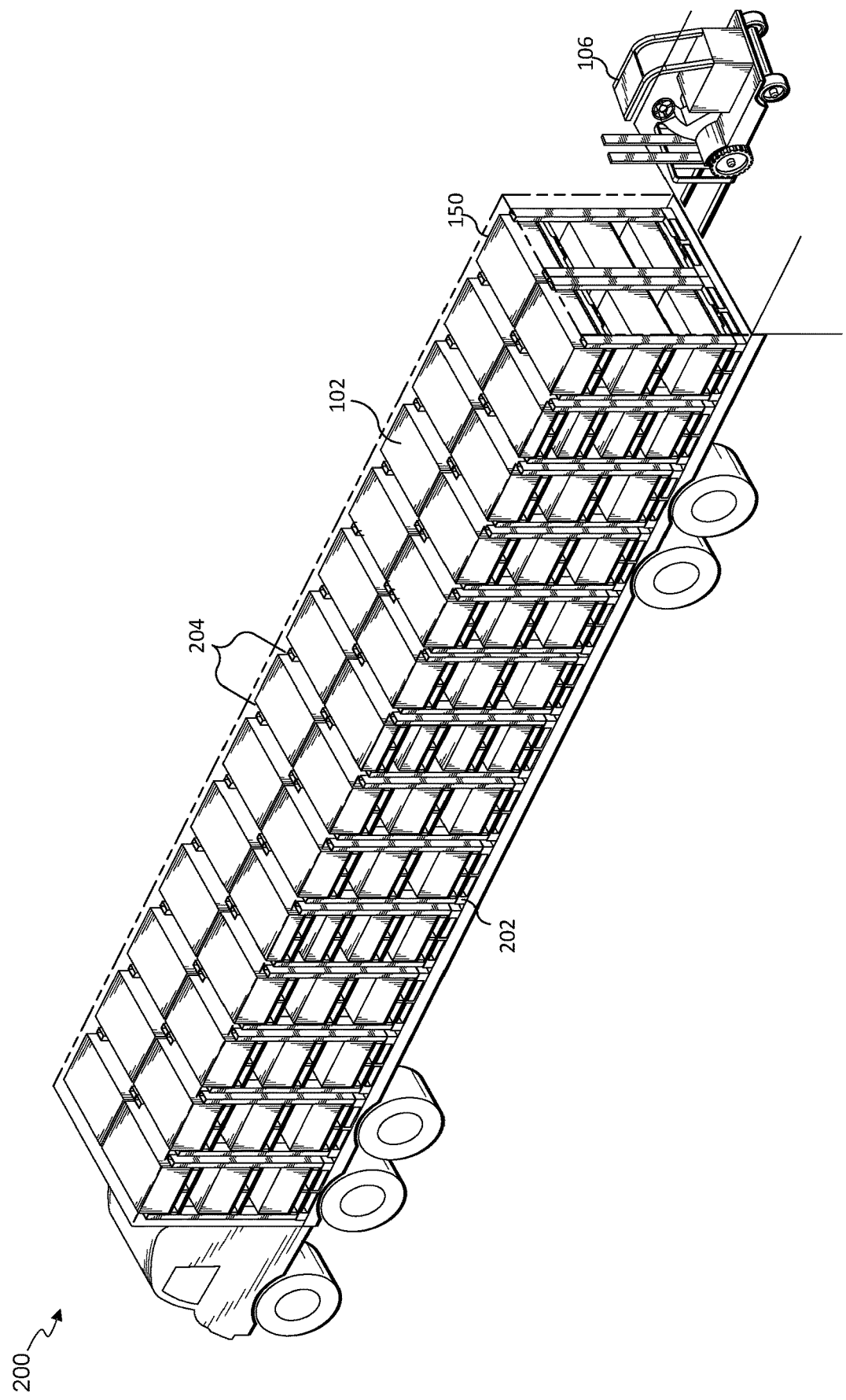
FIG. 2 illustrates a system using adjustable pallet racks for loading a transportation unit with loaded pallet racks and/or other freight in accordance with some embodiments.

FIG. 2 illustrates a system using adjustable pallet racks for loading a transportation unit with loaded pallet racks or other freight in accordance with some embodiments. System 200 shows a transportation unit 150 that is loaded with adjustable pallet racks 202 as disclosed herein. In some embodiments, the transportation unit 150 is a straight truck (e.g., a truck where the cargo unit is fixed to the chassis of the truck), a swap body (e.g., a cargo unit that can be attached and removed from a truck or trailer chassis), a trailer (e.g. trailer of a tractor trailer), a truck, and/or an intermodal container (e.g., a cargo unit that can be attached and removed from either an intermodal trailer chassis or a rail car). Additionally or alternatively, in some embodiments, the transportation unit 150 is specific to a region and/or country such as the United States, Europe, Japan, China, etc. For example, in some embodiments, the transportation unit 150 is a 53 ft. trailer (e.g., external length of trailer) with an interior width of approximately 8 ft. to 8 ft., 5 in. and an internal length of approximately 52 ft. to 52 ft., 10 in. In another example, in some embodiments, the exterior dimensions of a European transportation unit (e.g., a European tractor) vary from 6.5 to 16.5 meters (m) in length (18.75 m for road trains), 2.3 to 2.6 m in width, and 4 m in height. In some embodiments, the transportation unit 150 is a high capacity trailer. A high capacity trailer has a distance between the floor of the trailer and the ceiling is greater than on a normal trailer. For example, a high capacity trailer may have an external height of up to 14 ft. in the in US West of the Mississippi or up to 16 ft. in the UK, thus providing additional cubic capacity within the high capacity transportation unit. Alternatively or additionally, a high capacity trailer may have a lower floor height than is standard (e.g., 30 in. floor height in the US as opposed to the 48 in. standard transportation unit 150 floor height).

In some embodiments, an adjustable pallet rack 202 is configured to be loaded into the transportation unit 150 with other adjustable pallet rack units 202. In some embodiments, the adjustable pallet rack 202 is configured to receive and support at least two loaded pallets (e.g., via a base and at least one height adjustable shelf as discussed in detail below). In some embodiments, the adjustable pallet racks 202 are substantially identical to each other. The adjustable pallet racks 202 together substantially fill a length and width of the transportation unit. In some embodiments, the adjustable pallet racks 202 are configured to be loaded into the transportation unit 150 in one or more rows 204. In some embodiments, the one or more rows 204 of adjustable pallet racks 202 include at least two adjustable pallet racks 202. For example, as shown in FIG. 2, the one or more rows 204 of adjustable pallet racks 202 may be loaded so as to substantially fill the length and/or width of the transportation unit 150 such that minimal portion of the length and/or width of the transportation unit 150 is left unoccupied. In some embodiments, substantially filling the length of the transportation unit 150 includes leaving at most 2 ft. (0.60 m) of the transportation unit 150 length unoccupied/unused. In some embodiments, substantially filling the width of the transportation unit 150 includes leaving at most 6 in. (15.24 cm) of the transportation unit 150 width unoccupied/unused.

In some embodiments, each row of the one or more rows 204 of adjustable pallet racks 202 include a particular configuration for the adjustable pallet racks 202. In some embodiments, different adjustable pallet racks 202 (e.g., variations of adjustable pallet racks discussed below in FIGS. 3A-11B) allow different configurations and/or orientations of the one or more rows 204 of adjustable pallet racks 202. In some embodiments, particular configurations enable adjustable pallet racks 202 to fit closer together (e.g., the adjustable pallet racks 202 between adjacent rows are able to be mated and/or have a space less than 1 in (2.54 cm)) between one another, thereby enabling the loading of an additional row of pallet racks on some transportation unit configurations. Specific examples of the different configurations for the one or more rows are provided in FIGS. 19A-20B.

As shown in FIG. 2, loaded adjustable pallet racks 202 are placed within transportation unit 150. Loaded adjustable pallet racks 202 are loaded with one or more loaded pallets or other freight as discussed below. In some embodiments, the loaded adjustable racks 202 are loaded with one or more loaded pallets 102 and allow for multiple loaded pallets 102 to be loaded (and unloaded) into the transportation unit 150 at a time. In some embodiments, the loaded adjustable pallet racks 202 are loaded into the transportation unit 150 via a forklift as described herein (e.g., forklift 106). Each adjustable pallet rack 202 occupies a predetermined portion of the transportation unit 150 such that the adjustable pallet rack 202 and other substantially identical adjustable pallet racks 202 (e.g., adjustable pallet racks may all be the same and/or distinct variations described herein) together substantially fill the length and width of the interior transportation unit 150. In some embodiments, the unit size and/or footprint of the adjustable pallet racks 202 is determined by the dimensions of a pallet (as described herein). In particular, in some embodiments, adjustable pallet racks 202 are designed based on one or more predetermined pallet dimensions (e.g., pallet dimensions described in FIGS. 14A-14B). Adjustable pallet racks 102 efficiently use the available space of the transportation unit 150.

For example, as shown in FIG. 2, in some embodiments, transportation unit 150 is a 53 ft. trailer loaded with 14 rows of loaded adjustable pallet racks 202, each row including at least two adjustable pallet racks 202 (e.g., in total twenty-eight adjustable pallet racks 202), such that transportation unit 150 is substantially filled with one or more loaded pallets 102 or other freight (e.g., nested adjustable racks as described herein). Substantially filling the transportation unit 150 includes leaving at most 2 ft. (0.60 m) of the transportation unit 150 length unoccupied or unused and leaving at most 6 in. (15.24 cm) of the transportation unit 150 width unoccupied or unused. The above example is not meant to be limiting. The adjustable pallet racks described herein are configured to be used in a wide variety of transportation units 150 or transportation equipment with varying dimensions.

In some embodiments, the number of adjustable pallet racks 202 that are loaded into the transportation unit 150 is based on the inner dimensions of the transportation unit 150. In some embodiments, the configurations or variations of the adjustable pallet racks 202 (e.g., the different embodiments of the adjustable pallet racks described herein) are based on the transportation unit 150 and/or the size and type of the freight transportation equipment (e.g., dimensions of pallets racks as described below). For example, in some embodiments, the transportation unit 150 is a 28 ft. trailer (e.g., a "pup" trailer) and may be loaded with a different number of adjustable pallet racks 202 than a 53 ft. trailer (e.g., both transportation units loaded with 40 in.×48 in. pallet accommodating adjustable pallet racks as described below).

Figure 12:
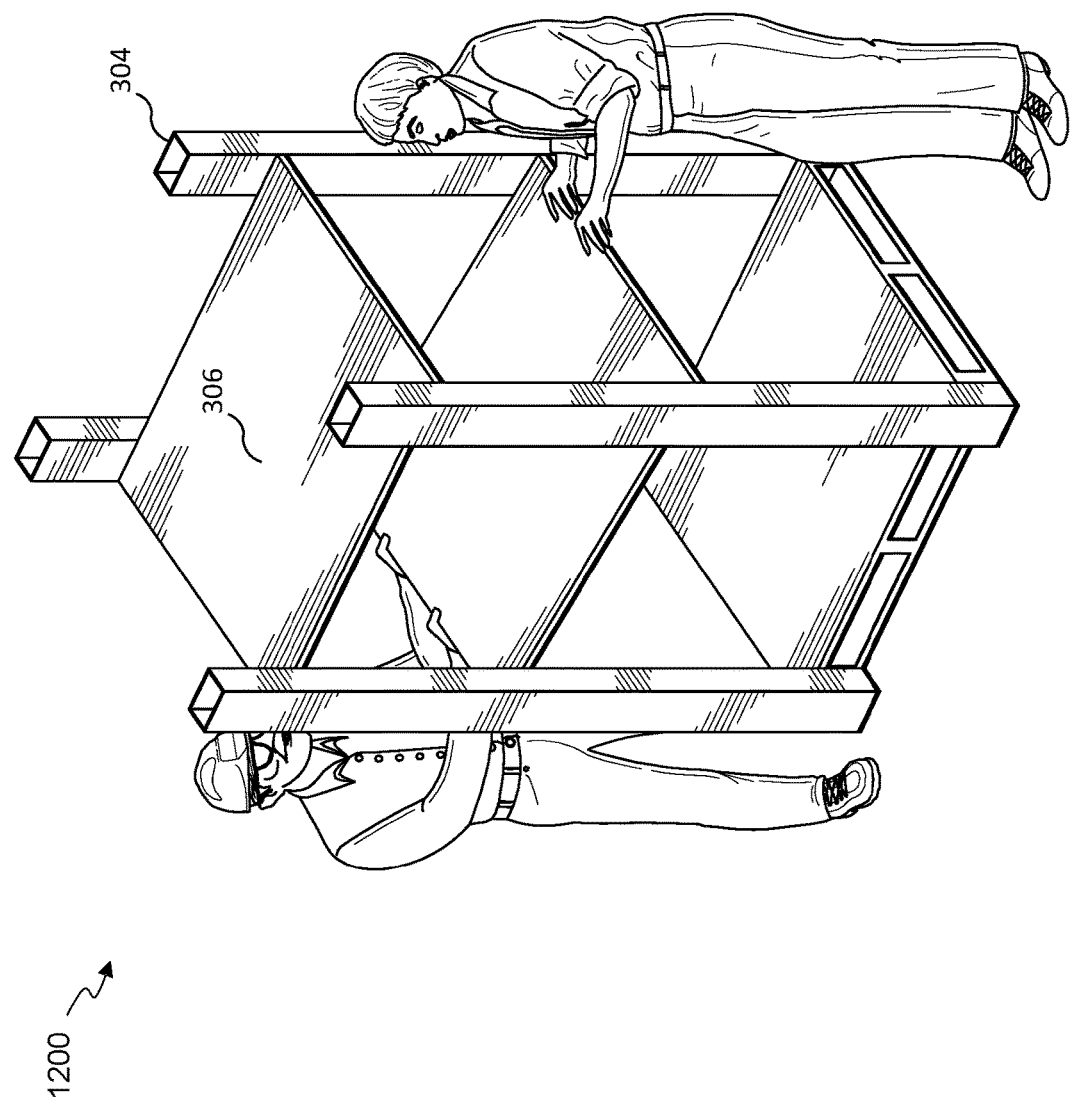
FIG. 12 illustrates the configuration of height adjustable shelves in accordance with some embodiments.
Figure 13:
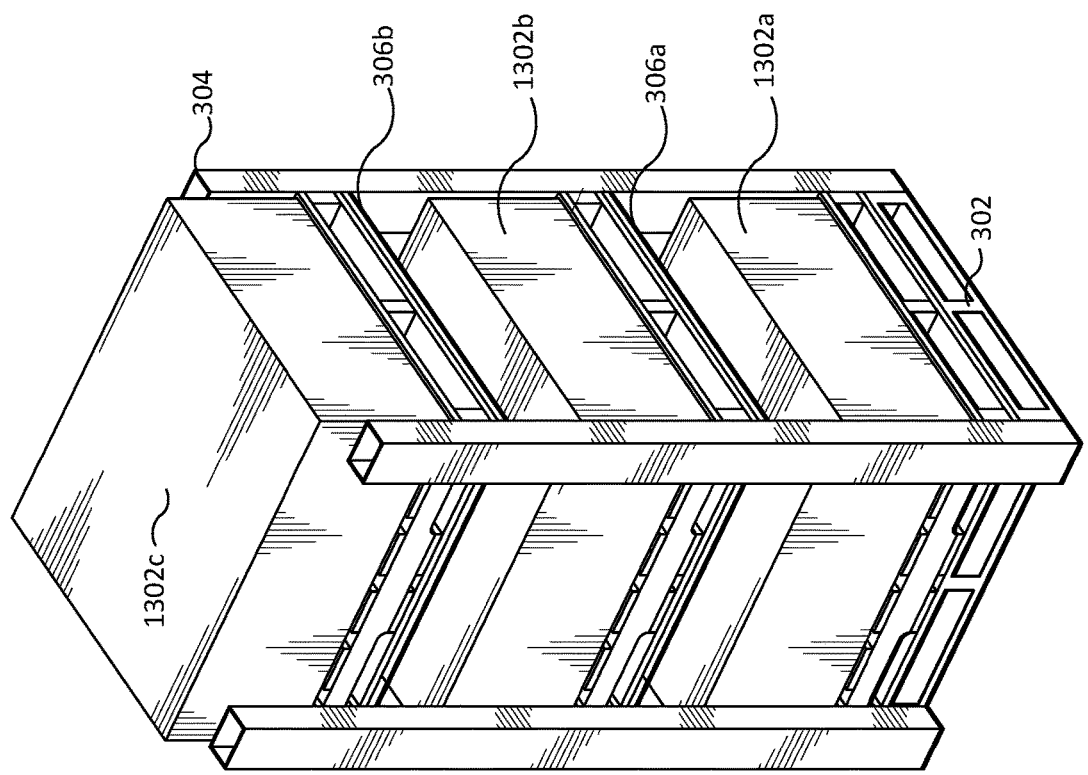
FIG. 13 illustrates a loaded adjustable pallet rack in accordance with some embodiments.

In some embodiments, vertically stacking loaded pallets 102 in adjustable pallet racks 202 reduces the amount of unused space in transportation unit 150 without the risk of damage to the loaded pallets at the bottom of adjustable pallet racks 202 (e.g., see description in FIGS. 12 and 13). In some embodiments, as shown in FIG. 2, the transportation unit 150 is loaded from floor to ceiling (via adjustable pallet racks 202), which significantly increases utilization (e.g., with the pallet racks disclosed herein, 2,700 cubic feet of a 53 ft. trailer may be loaded and occupied by freight assuming two feet of unused height). As compared to conventional systems (described above in FIG. 1), adjustable pallet racks 202 greatly increase the used cubic capacity (volume) of the transportation unit 150. For example, in some embodiments, for a 53 ft. trailer using adjustable pallet racks 202 the used cubic capacity is increased by nearly 50 percent (e.g., from approximately 1,870 cubic feet used to approximately 2,700 cubic feet used). In some embodiments, a portion of the transportation unit 150 space is left unused due to the physical dimensions of the adjustable pallet racks 202 as well as the difference between the height adjustable pallet racks 202 and the inner height of the transportation unit 150.

Figure 3B:
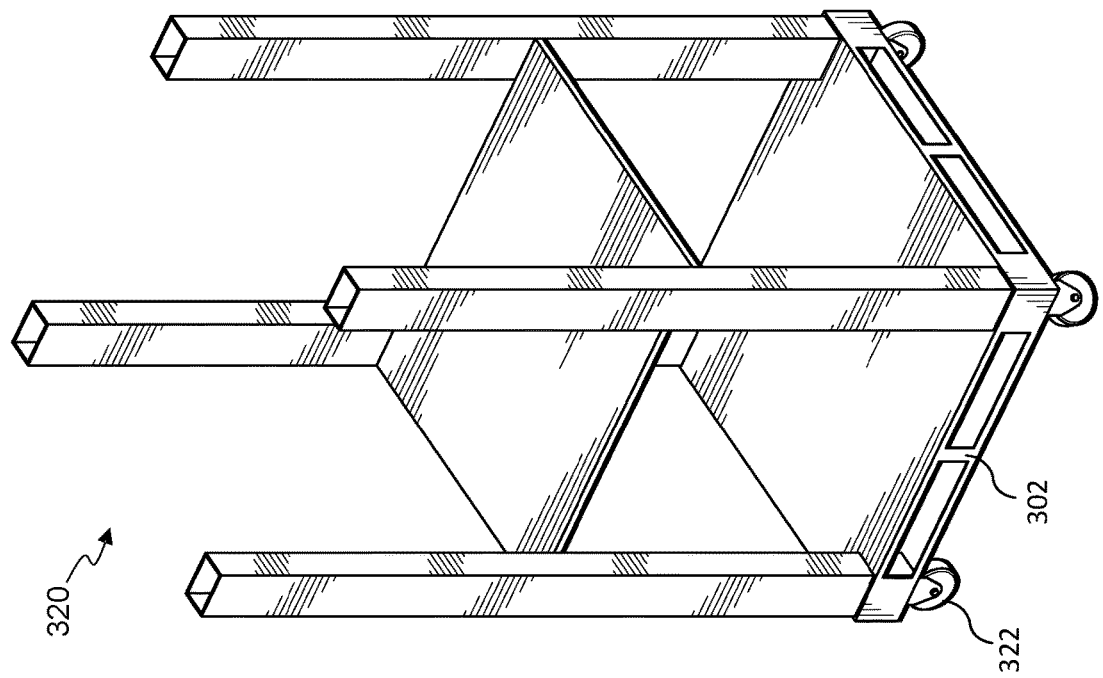
FIGS. 3A-3C illustrate adjustable pallet racks in accordance with some embodiments.
Figure 3A:
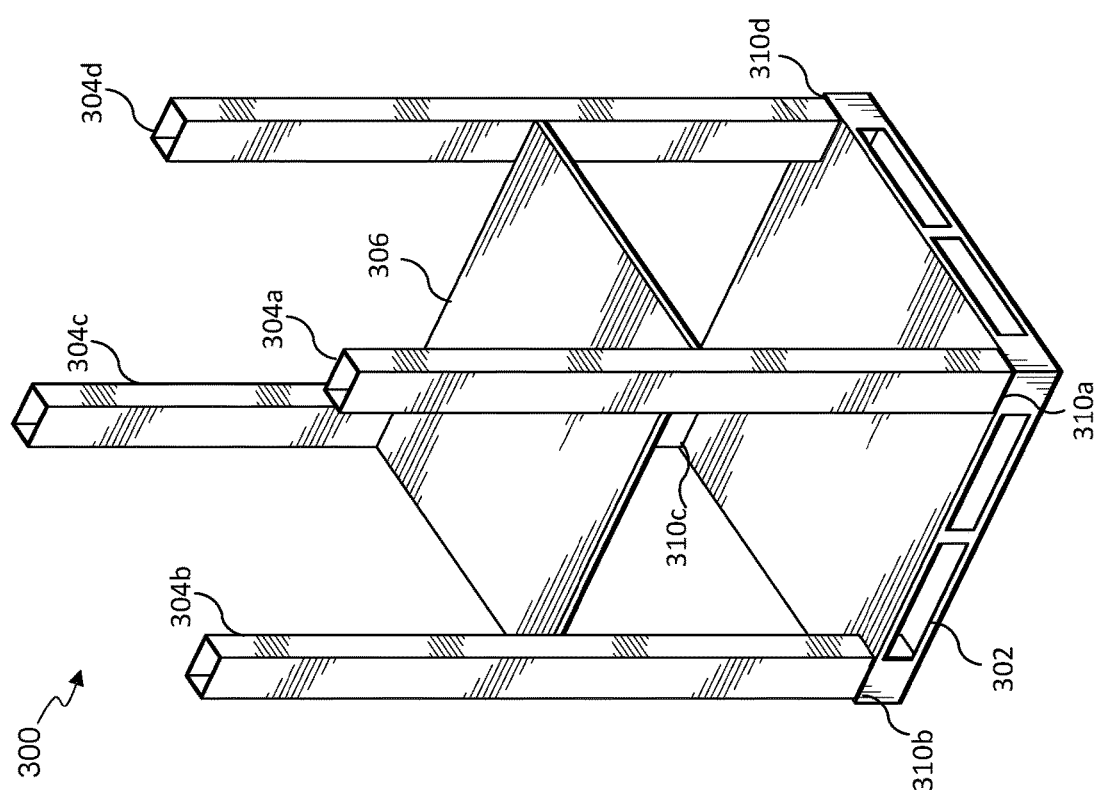
Figure 3C:
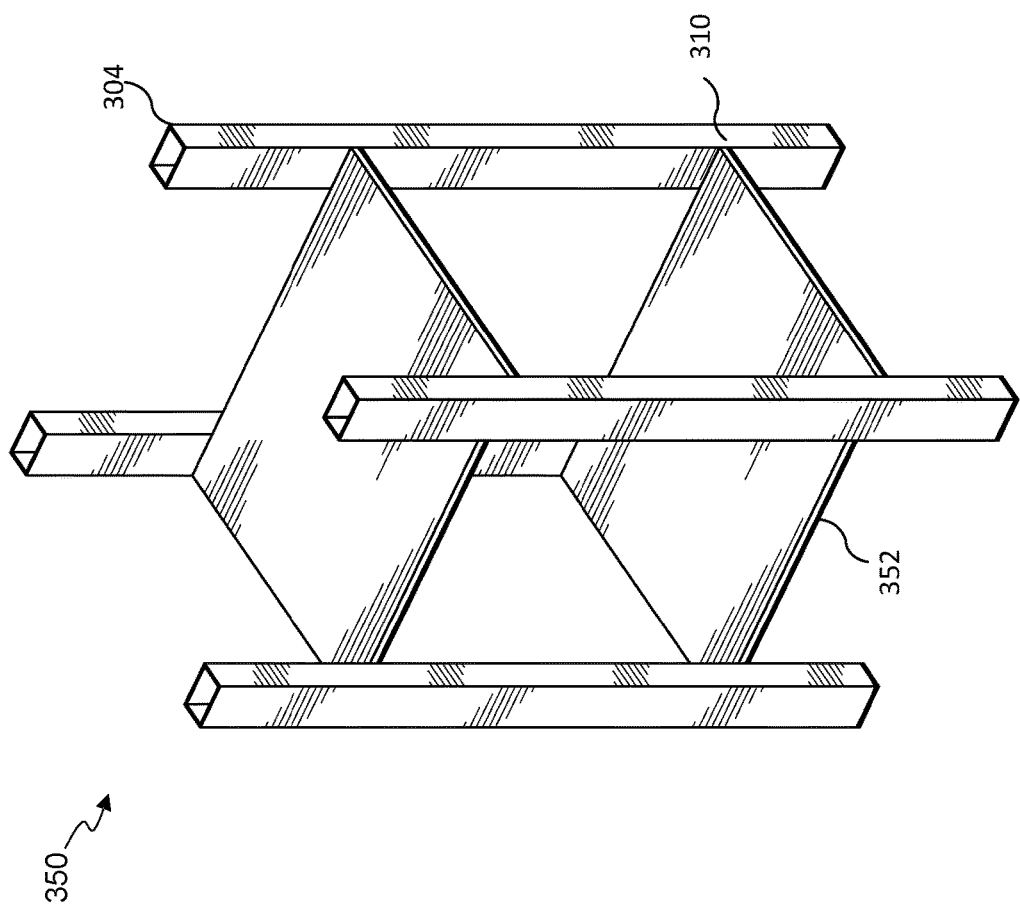

FIGS. 3A-3C illustrate adjustable pallet racks in accordance with some embodiments. In some embodiments, an adjustable pallet rack 300 is configured to be loaded into the transportation unit 150 with other adjustable pallet racks 300 and/or variations thereof discussed herein. The other adjustable pallet racks 300 and/or the variations discussed herein are substantially identical to the adjustable pallet racks 300 and together substantially fill the length and width of the transportation unit 150 (as described above in FIG. 2). In some embodiments, adjustable pallet rack 300 is configured to receive and support loaded pallets (e.g., at least two loaded pallets).

In some embodiments, the size and dimensions of the adjustable pallet rack 300 are adjusted based on the size of the largest pallet dimensions to be accommodated (e.g., see FIGS. 14A and 14B below for pallet dimensions). In some embodiments, the adjustable pallet rack 300 is configured to have two sides 1.5 in +/−1 in. greater than the longest side of an pallet. In some embodiments, the adjustable pallet rack 300 has two sides of varying widths (e.g., an opening side and the rear side). In some embodiments, a first side (e.g. the opening side) is configured to have a width 5 in.+/−3 in. greater than the shortest side of the pallet and a second side (e.g., the rear side) is configured to have a width 2 in.+/−2 in. greater than the shortest side of the pallet. Alternatively or additionally, in some embodiments, the pallet has equal dimensions (e.g., 42 in. by 42 in.) and the dimensions of the adjustable pallet rack 300 are determined in the same manner. For example, two sides are 1.5 in.+/−1 in. greater than a first side of the pallet, and two sides have varying widths, specifically the opening side is configured to have a width 5 in.+/−4 in. greater than the second side of the pallet and the rear side is configured to have a width 3 in.+/−2.5 in. greater than the second side of the pallet.) In some embodiments, different pallet sizes are loaded into adjustable pallet rack 300 and the dimension of the adjustable pallet rack 300 is based on based on the largest pallet. Additionally or alternatively, in some embodiments, the size and dimensions of the adjustable pallet rack 300 are adjusted based on the size of the transportation unit 150 so as to optimize the loading of the type of pallets within the transportation unit 150.

For example, in some embodiments, an adjustable pallet rack 300 is designed to accommodate a pallet size of 48 in. by 40 in.; and a transportation unit 150 with an interior width of at least 100 in. and with an interior length of at least 52 ft. In some embodiments, to accommodate 40 in. by 48 in. pallets, the adjustable pallet rack 300 is configured to be 49.5 in.+/−1 in. on its longest side such that two adjustable pallet racks (e.g., rows 204; FIG. 2) may be loaded across a width of transportation unit 150 (e.g., as shown in FIG. 2 and described in FIGS. 19A through 20B). In some embodiments, to efficiently use the space of the transportation unit 150 and accommodate 40 in. by 48 in. pallets, the adjustable pallet rack 300 varies a front width and a rear width of the adjustable pallet rack 300, as discussed below. For example, an opening side (e.g., where pallets are loaded into adjustable pallet rack 300) is wider than the rear side to reduce the space used by the adjustable pallet rack 300 and substantially fill the length and width of the transportation unit 150. In some embodiments, the front of the current pallet rack is approximately 46 in.+/−2 in. and the rear is approximately 43 in.+/−2 in.

In some embodiments, the adjustable pallet rack 300 includes a base 302, a plurality of posts 304 coupled to the base 302, and at least one height adjustable shelf 306 coupled to the plurality of posts 304. In some embodiments, the base 302 of the adjustable pallet rack 300 is configured to receive one or more loaded pallets and is configured to be forkliftable from any side (e.g., configured to receive blades and/or forks of a forklift, pallet jack, or walkie to transport the adjustable rack). In some embodiments, base 302 is configured to have an opening for forklift access that is less than 3.25 in. high, and the top of base 302 is less than 4.5 in. (e.g., from the floor). In this way, base 302 increases the usable space available for line haul transport of freight. Additionally or alternatively, base 302 is configured to receive other adjustable pallet racks 300 such that the additional adjustable pallet racks 300 are nested (described further below in FIGS. 4A-4D) together. The adjustable pallet rack 300 may be moved, reoriented, loaded, or unloaded as described below. In some embodiments, the adjustable pallet rack 300 includes an open top 308 such that loaded pallets (e.g., palletized or loose freight) or other freight (e.g., nested adjustable pallet racks as described below) loaded into the adjustable may exceed the height of the plurality of posts 304.

In some embodiments, the plurality of posts 304 of the adjustable pallet rack 300 include at least four posts (e.g., 304a-304d). In some embodiments, the plurality of posts 304 are coupled to each respective corner (e.g., 310a-310d) of the base 302. For example, as illustrated in FIG. 3A, the plurality of posts 304 are coupled to the corners 310 of the base 302 of the adjustable pallet rack 300. In some embodiments, the plurality of the posts 304 are spaced such that loaded pallets may be loaded from a loading side 312 of the adjustable pallet rack 300. The loading side of the adjustable pallet rack 300 is configured to receive a short side of the loaded pallets as described below in FIGS. 14A-14B. In some embodiments, the height of the adjustable pallet rack 300 is based on the plurality of posts 304. In some embodiments, the height of the plurality of posts 304 is at least 6 ft. high.

In some embodiments, each height adjustable shelf 306 is configured to support an additional loaded pallet. In some embodiments, the height adjustable shelf 306 is coupled to different positions of the plurality of posts 304. The height adjustable shelf 306 may be coupled along any portion and/or height of the plurality of posts 304. For example, the height adjustable shelf 306 may be coupled anywhere from to the top end of the plurality of posts 304 to the base 302 of the adjustable pallet rack 300. For example, the height adjustable shelf 306 may couple to the plurality of posts 304 via any sortable hooks, keyholes, pins, and/or anchors. In some embodiments, the adjustable pallet rack 300 includes more than one height adjustable shelf 306 (e.g., the adjustable pallet rack 300 may include as many height adjustable shelves 306 as can be coupled to the plurality of posts 304).

In some embodiments, each height adjustable shelf 306 is configured to receive and support a loaded pallet (e.g., palletized or loose freight) or other freight. In some embodiments, the dimensions and/or size of each height adjustable shelf 306 is determined based on to size and dimensions of the pallet to be handled (e.g., see pallet sizes in FIGS. 14A and 14B). In some embodiments, the height adjustable shelf 306 is configured to have two sides 1 in.+/−1 in. greater than the longest side of the pallet and two sides 2 in.+/−2 in. greater than the shortest side of the pallet. Alternatively or additionally, in some embodiments, the pallet has equal dimensions (e.g., 42 in. by 42 in.) and the dimensions of the height adjustable shelves 306 are determined in the same manner (e.g., two sides 1 in.+/−1 in.) than a first side of the pallet and two sides 2 in.+/−2 in. greater than a second side of the pallet). In some embodiments, different pallet sizes are loaded into adjustable pallet rack 300. The dimension of the height adjustable shelves 306 for mixed pallet size configuration is based on the largest pallet.

In some embodiments, the height adjustable shelf 306 is configured to receive and support loaded pallets such that the weight of the loaded pallets is fully supported by the height adjustable shelf 306. In other words, other loaded pallets or freight within an adjustable pallet rack 300 does not support any weight from another loaded pallet. In some embodiments, the height adjustable shelf 306 include a small margin (e.g. 1 in.) of extra space to provide leeway to load or unload the pallet from the height adjustable shelf 306. In some embodiments, the height adjustable shelf 306 allow for a slight overlap of packages that may slightly overhang the pallet. Additionally or alternatively, in some embodiments, the height adjustable shelf 306 is configured such that the loaded pallets or loose freight on the height adjustable shelf 306 do not touch or press down on other loaded pallets or loose freight on the base or on a lower height adjustable shelf 306 (e.g., thereby protecting the freight in transit and helping secure the loaded pallets or freight). In some embodiments, the height adjustable shelves 306 include a nonslip coating to reduce the shifting of freight during handling and transport on the transport unit 150.

FIG. 3B illustrates another embodiment of the adjustable pallet rack in accordance with some embodiments. Adjustable pallet rack 320 includes all of the features discussed above in FIG. 3A. In this embodiment, wheels 322 are attached to base 302. In some embodiments, the wheels 322 are coupled to one or more sides of base 302 and are configured to move the adjustable pallet rack 320 when the adjustable pallet rack 320 is pushed. In this way, adjustable pallet rack 320 may be moved via the one or more wheels 322. For example, if a forklift is not available and/or if the adjustable pallet rack 320 needs to be moved manually (e.g., by person), the adjustable pallet rack 320 may be rolled on the wheels 322. In some embodiments the wheels or casters may include a locking mechanism to prevent unintended movement of the pallet rack.

FIG. 3C illustrates another embodiment of the adjustable pallet rack in accordance with some embodiments. Adjustable pallet rack 350 includes similar features to those discussed above in FIGS. 3A and 3B. In this embodiment, the adjustable pallet rack 350 includes an open base 352 coupled to the plurality of posts 304. In some embodiments, the plurality of posts 304 are coupled to outside corners 310a-310d of the open base 352. The open base 352 is open to receive one or more automated forklift devices and/or robotics (e.g., by an AMAZON KIVA robot). In some embodiments, the open base 352 is coupled to the plurality of posts 304 a predetermined distance from the floor. In some embodiments, the predetermined distance from the floor is at least 6 in. In some embodiments, the predetermined distance from the floor is such that the device may receive the one or more automated forklift devices and/or robots. For example, in operation, the one or more automated forklift devices and/or robots roll under the open base 352 of the adjustable pallet rack 350 and lift the legs (e.g., plurality of posts 304) of the adjustable pallet rack 350 off the ground. In this way, the adjustable pallet rack 350 may be moved or reoriented by the one or more automated forklift devices or robots. Additionally or alternatively, the open base 352 is not limited to one or more automated forklift devices or robots and is configured to receive blades or forks of a forklift to transport the adjustable pallet rack 350 as described above in FIGS. 3A and 3B. In some embodiments, the one or more automated forklifts or a portion of the one or more automated forklifts roll or extend under the adjustable pallet rack 350 (e.g., under open base 352) and lift the plurality of posts 304 of the adjustable pallet rack 350 off the floor.

Figure 4D:
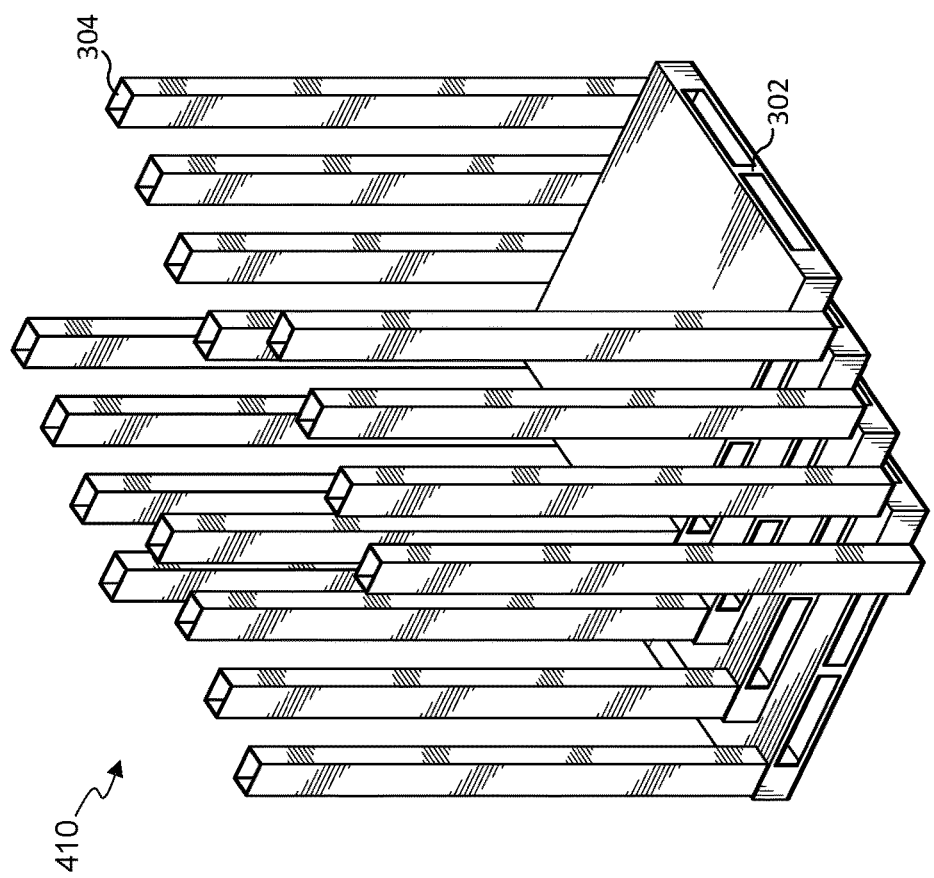

FIGS. 4A-4D illustrate an adjustable pallet rack that is configured to be nested with other adjustable pallet racks in accordance with some embodiments. Adjustable pallet rack 400 includes all of the features discussed above in FIGS. 3A-3C. Additionally, adjustable pallet rack 400 is configured to be moved or reoriented as described above in FIGS. 3A-3C. In this embodiment, base 302 of the adjustable pallet rack 400 is configured to receive one or more other adjustable pallet rack 400 and/or other variations described herein. Base 302 of the adjustable pallet rack 400 receives and supports additional adjustable pallets rack 400 so that they are nested (as shown in FIGS. 4C and 4D). In some embodiments, adjustable pallet racks 400 are nested so that multiple adjustable pallet racks 400 occupy the same width as a single adjustable pallet rack 400 (e.g., the dimensions of nested adjustable pallet racks occupy approximately the same width and a slightly longer length of a single adjustable pallet rack 400). In some embodiments, the length of the nested adjustable pallet racks increases 1.5 in. to 6 in. per each nested adjustable rack 400. In some embodiments, one or more height adjustable shelves 306 of adjustable pallet rack 400 are removed or adjusted (e.g., lowered onto the base 302) to allow for additional adjustable pallet racks 400 to be nested into the adjustable pallet rack 400. Nesting one or more adjustable pallet racks 400 allows for multiple adjustable pallet racks 400 to be carried from place to place while not in use, and reduces the cost and resources required to transport empty adjustable pallet racks 400, and reduces the space required for handling.

In some embodiments, adjustable pallet racks 400 include a base 302 and/or height adjustable shelves 306 that are slightly wider or longer than the size of a pallet (e.g., receiving pallets described below in FIG. 14A-14B). In some embodiments, the plurality of posts 304 are coupled to the base 302 and the height adjustable shelves 306 at distinct locations. In some embodiments, at least two posts 304a/304b of the plurality of posts 304 are coupled to opposite sides of base 302 at or near the corners 310 of base 302 generating an opening side 402a (also referred to as a loading side) and at least two posts 304c/304d of the plurality of posts 304 are both coupled to a rear side 402b (distinct from the sides posts 304a and/or 304b are coupled to) of base 302, the rear side 402b is opposite the opening side 402a. In some embodiments, the at least two posts 304a/304b are coupled at or near the corners 310 of base 302 such that there is a wider space or gap between the at least two posts 304a/304b allowing for one or more pallets of adjustable pallet racks 400 to be received. In some embodiments the at least two posts 304a/304b are coupled away from the corners 310 of opening side 402a of the adjustable pallet rack 400 such that the at least two posts 304a/304b of the plurality of posts 304 support the height adjustable shelves 306 and are coupled slightly towards the middle of the adjustable pallet rack 400 in order to secure loaded pallets from shifting from side to side.

In some embodiments, the at least two posts 304c/304d are coupled to the rear side 402b such that there is a narrow opening. The narrow opening (also referred to as narrow side) prevents a loaded pallet or another adjustable pallet rack 400 from falling off of or sliding through the adjustable pallet rack 400. In this configuration, a first set of posts 304a/304b are set further apart than the width of the base 302 and a second set of posts 304c/304d are positioned with an equal or narrower width than the base 302. In some embodiments, this configuration allows adjustable pallet racks 400 to be received into a bottom adjustable pallet racks 400 (e.g. with the second set of posts 304c/304d entering via loading side 402a, as shown in FIGS. 4B-4D) to be nested together.

FIG. 4B illustrates a top down view of nesting adjustable pallet racks in accordance with some embodiments. In some embodiments a first adjustable pallet rack 400a is configured to receive a second adjustable pallet rack 400b. The first adjustable pallet rack 400a is configured to receive one or more adjustable pallet racks 400. As shown in FIG. 4B, in some embodiments, the at least two posts 304a/304b of the plurality of posts 304 are coupled to opposite sides of base 402 at or near the corners 310 of base 302 (e.g. generating a wider gap between the plurality of posts 304 at a side of adjustable pallet racks 400) and at least two posts 304c/304d of the plurality of posts 304 are coupled to a rear side of base 402, distinct from the sides coupled by posts 304a/304b, at an opposite end to the opening side 402a (e.g., generating narrow gap between the plurality of posts 304 opposite the opening side 402a).

In some embodiments, the second adjustable pallet rack 400b is received by the first adjustable pallet rack 400a via the opening side 402a (e.g., side of adjustable pallet rack 400 with a larger gap between the plurality of posts 304). The base 302b of the second adjustable pallet rack 400b is received and supported by the base 302a of the first adjustable pallet rack 400a. Subsequently nested adjustable pallet racks 400 (e.g., a third, fourth, . . . nth adjustable pallet rack) are loaded into a previously nested adjustable pallet rack 400. For example, after the second adjustable pallet rack 400b is received by the first adjustable pallet rack 400a, a third adjustable pallet rack (not shown) is received by the second adjustable pallet rack 400b. A fourth adjustable pallet rack would be received by the third adjustable pallet rack and so on. In some embodiments, the nested adjustable pallet racks 400 are configured to be moved or reoriented via the first adjustable pallet racks 400a.

FIG. 4C is another top down view of nesting adjustable pallet racks in accordance with some embodiments. In FIG. 4C, the second adjustable pallet racks 400b is received by the first adjustable pallet rack 400a. The length of the adjustable pallet rack increases 1.5 in. to 6 in. for each additional adjustable pallet rack nested. The nested adjustable pallet racks 410 occupy the same width.

FIG. 4D illustrates nested adjustable pallet racks in accordance with some embodiments. Nested adjustable pallet racks 410 include a number of adjustable pallet racks 400 nested together. As described above, each additional adjustable pallet rack 400 is stacked within a previously nested adjustable pallet rack 400. In some embodiments, height adjustable shelves (not shown) are removed from the plurality of posts 304 and placed on top of the base 302 of the individual adjustable pallet racks 400. Alternatively and/or additionally, in some embodiments, all height adjustable shelves 406 are placed on top of the base 402 of the top adjustable pallet racks 400 (e.g. last loaded adjustable pallet racks 400).

Figure 5:
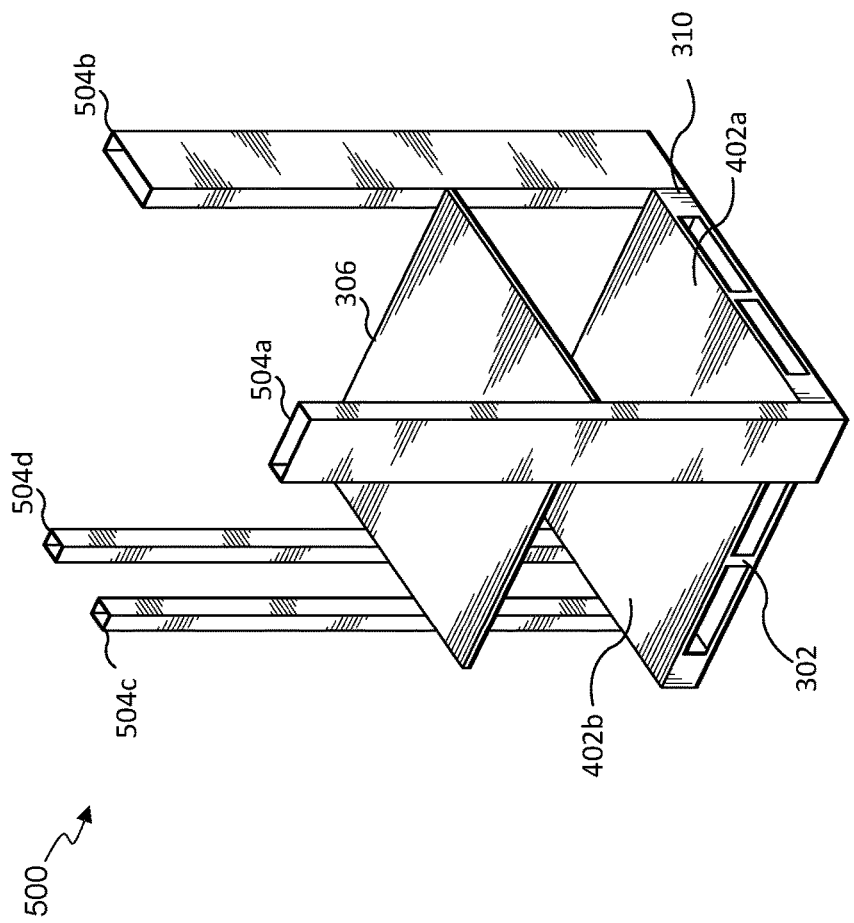
FIG. 5 illustrates another adjustable pallet rack in accordance with some embodiments.

FIG. 5 illustrates another adjustable pallet rack in accordance with some embodiments. Adjustable pallet racks 500 includes all of the features discussed above in FIGS. 3A-4D. In FIG. 5, the adjustable pallet rack 500 includes a distinct configuration for the plurality of posts 504. Adjustable pallet racks 500 are configured and increase the total number of adjustable pallet racks 500 that are loaded in a transportation unit 150. In some embodiments, adjustable pallet racks 500 reduce the space occupied by the adjustable pallet racks 500 through the configuration and placement of the plurality of posts 504 (e.g., as described in FIG. 19C). For example, adjustable pallet racks 500 with plurality of posts 504 are configured to enable at least 15 rows of adjustable pallet racks 500 to be loaded on a 53 ft. transportation unit 150.

Figure 19C:
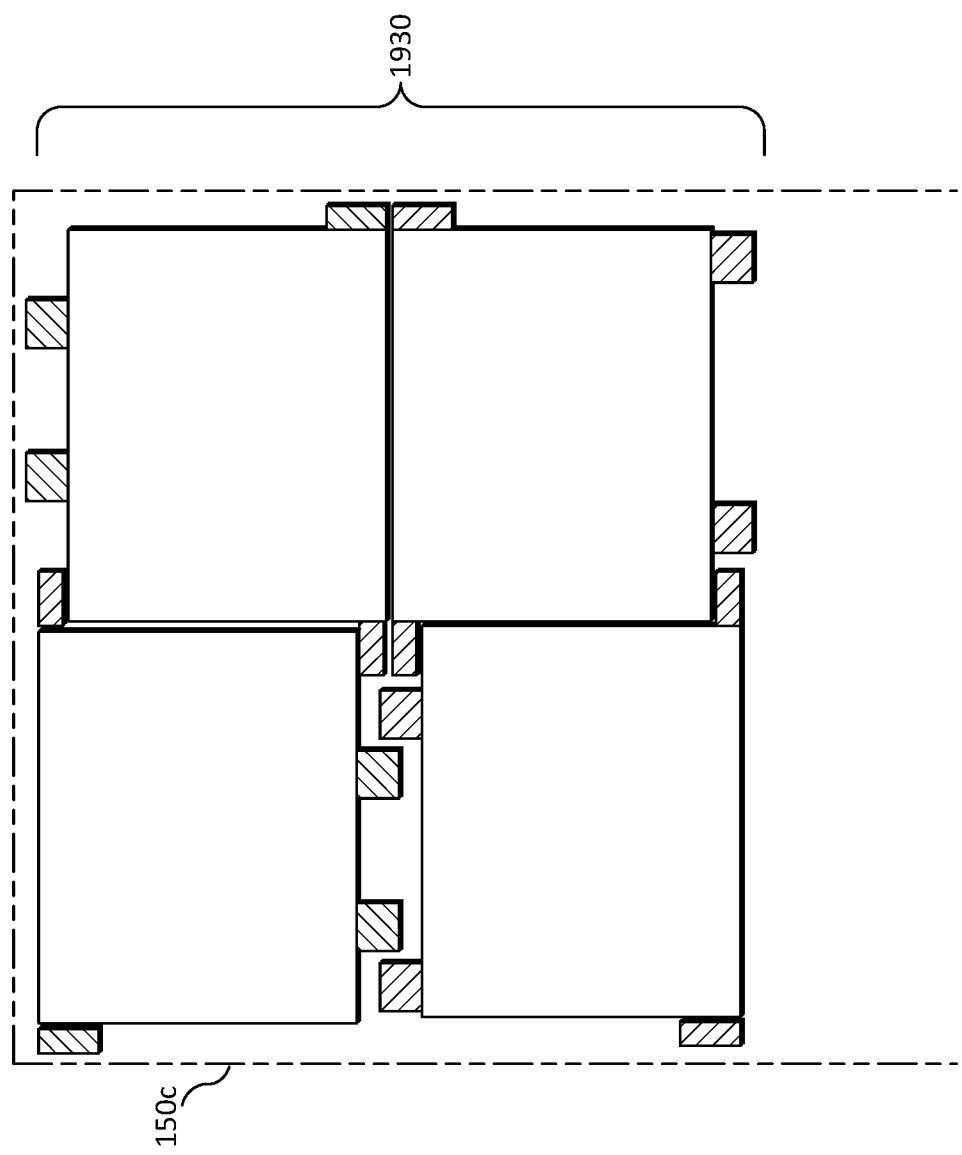

In some embodiments, as shown in FIG. 19C, a second configuration of the pallet rack is used in tandem with a first configuration of the pallet rack to minimize wasted space. In some embodiments, a first set of posts 504a/504b of the posts plurality of posts 504 are coupled wider apart than a second set of post 504c/504d of the posts plurality of posts 504 to enable nesting. In some embodiments, the first set of posts 504a/504b have larger dimensions than the second set of post 504c/504d (e.g., the first set of posts 504a/504b have a larger surface area than the second set of posts 504c/504d). In some embodiments, the orientation of the first set of posts 504a/504b are varied between post 504a and post 504b, such that, when loaded, post 504a may be set flush against the side of the transportation unit 150. In this way, the amount of spaced used by the plurality of posts 504 is minimized reducing the wasted space from side to side of the transportation unit 150. In some embodiments, due to its different orientation, post 504b fits in the gap required for the rear posts (second set of posts 504c and 504d) of a second adjacent adjustable pallet rack 500. A top down view of the configuration of adjacent adjustable pallet racks 500 is shown in FIG. 19C.

In some embodiments, the first set of posts 504a/504b are coupled to opposite sides of base 302 at respective corners near and/or at an opening side 402a of the adjustable pallet racks 500. In some embodiments, at least one post (e.g., post 504a) of the first set of posts 504a/504b is coupled to the base 302, at corners 310, along a wider side of post 504a (e.g., wider side of post 504a planar with base 302) and at least one other post (e.g., post 504b) of the first set of posts 504a/504b is coupled to the base 302 along a narrow side of post 504b (e.g., narrow side of post 504b planar with base 302). For example, as shown in FIG. 5, post 504a of the first set of posts is coupled to base 302 along its wider side and post 504b of the first set of posts is coupled to base 302 along its narrow side (e.g., post 504b is perpendicular to post 504a of the first set of posts). In some embodiments, the second set of posts 504c/504d are coupled to a rear side 402b, the rear side 402b opposite the opening side 402b (e.g., loading side) of the adjustable pallet racks 500 as described above in FIGS. 4A-4D). Both of the second set of posts 504c/504d are coupled along the same side (e.g. rear side 402b).

In some embodiments, adjustable pallet racks 500 improves use of space available in a transportation unit (e.g., transportation unit 150; FIG. 2) by reducing wasted space generated by the plurality of posts 504 (as shown in FIG. 19C below). In some embodiments, adjustable pallet racks 500 include different configurations (e.g., positioning of the plurality of posts 504) than other embodiments of the adjustable pallet racks described herein.

Figure 6:
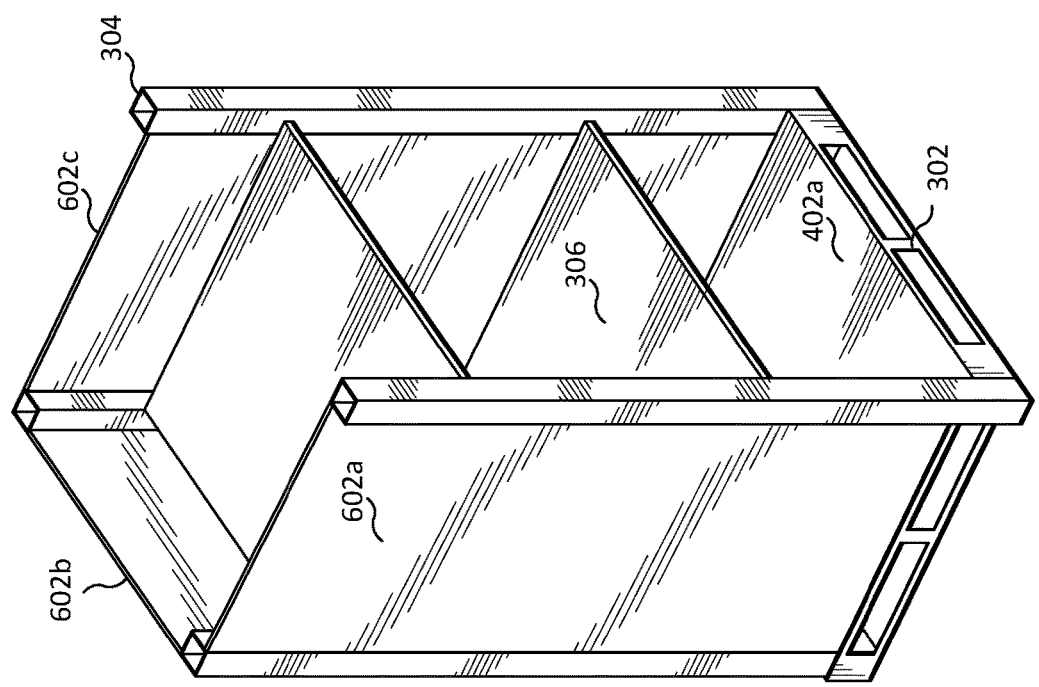
FIG. 6 illustrates adjustable pallet racks with rigid sidewalls in accordance with some embodiments.

FIG. 6 illustrates adjustable pallet racks with rigid sidewalls in accordance with some embodiments. Adjustable pallet rack 600 includes all of the features discussed above in FIGS. 3A-5. In this embodiment, adjustable pallet rack 600 further includes one or more rigid walls 602 (e.g., side panels). In some embodiments, the plurality of posts 304 are coupled to the adjustable pallet rack 600 as described above in FIGS. 4A-5. Specifically, the plurality of post 304 couple to base 302 such that an opening side 402a and a rear side 402b are generated (e.g., wider front side and narrower back side).

In some embodiments, one or more rigid walls 602 are coupled between the plurality of post 304 along one or more sides of base 302. In some embodiments, opening side 402a of base 302 does not include a rigid wall 602. For example as shown in FIG. 6, adjustable pallet rack 600 includes three rigid walls 602 coupled between the plurality of posts 304 along three sides of base 302 and opening side 402a is open (e.g., without a rigid wall 602). In some embodiments, the one or more rigid walls 602 function as vertical supports (e.g., an additional post) along with the plurality of posts 304. In some embodiments, the one or more rigid walls 602 are used instead of the plurality of posts 304. In some embodiments, at least one height adjustable shelf 306 is coupled to the one or more rigid walls 602. For example, in some embodiments the one or more rigid walls 602 may couple to the at least one height adjustable shelf 306 via one or more sortable hooks, pins, keyholes, anchors.

In some embodiments, adjustable pallet rack 600 is configured to be nested as described above in FIGS. 4A-4D. Similarly, the at least one height adjustable shelf 306 is configured to be removed and may be placed on top of base 302 while the adjustable pallet racks 600 are nested (as described in FIG. 4A-4D).

Figure 7B:
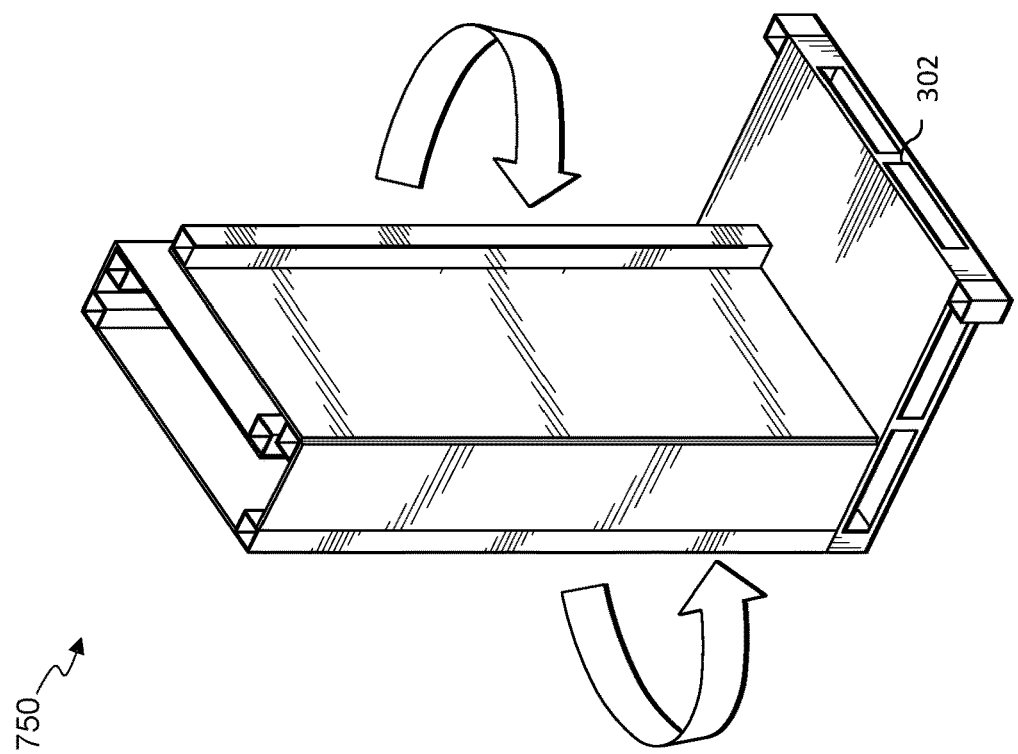
FIGS. 7A and 7B illustrate adjustable pallet racks with foldable rigid sidewalls in accordance with some embodiments.
Figure 7A:
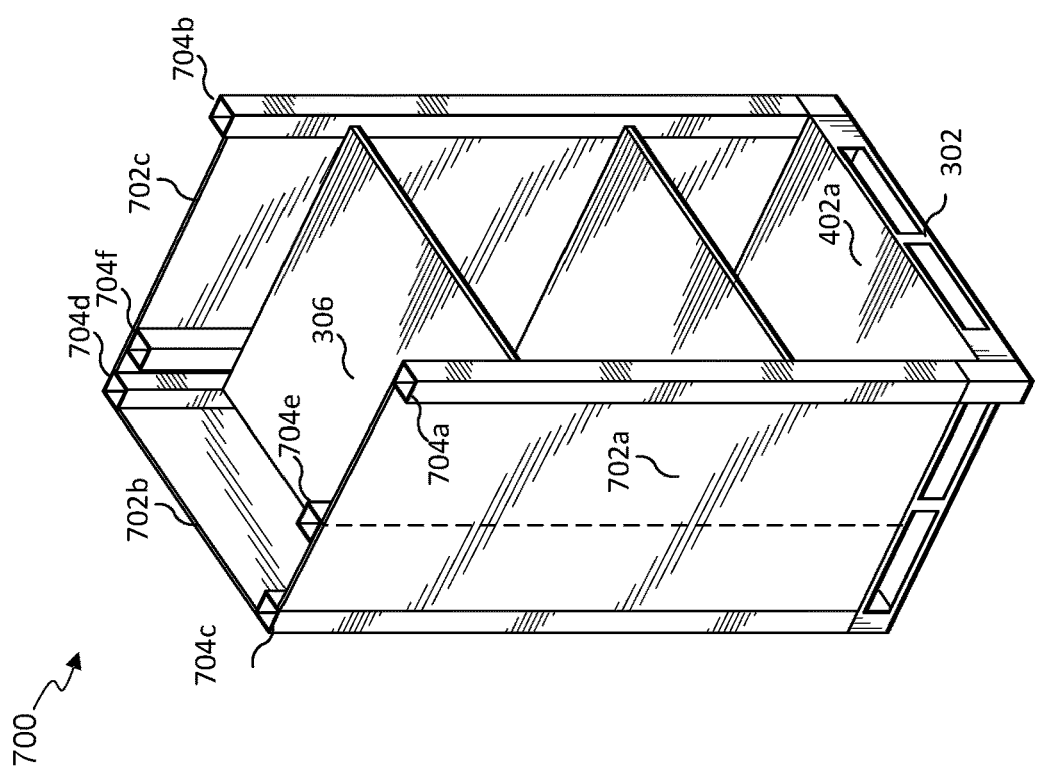

FIGS. 7A-7B illustrate adjustable pallet racks with foldable rigid sidewalls in accordance with some embodiments. Adjustable pallet rack 700 includes all of the features discussed above in FIGS. 3A-6. In this embodiment, adjustable pallet rack 700 further includes one or more foldable rigid walls 702 (e.g., side panels).

In some embodiments, the plurality of posts 704 of adjustable pallet rack 700 includes at least six posts. In some embodiments, the plurality of posts 704 include a front set of posts 704a/704b, a rear set of posts 704c/704d, and/or an intermediate set of posts 704e/704f. In some embodiments, the front set of posts 704a/704b are coupled to base 302 as described above in FIGS. 4A-5 with respect to generating an opening side 402a (e.g., loading side and/or wider front side). In some embodiments, the rear set of posts 704c/704d are coupled to base 302 as described above in FIGS. 4A-5 with respect to rear side 402b (e.g. narrower back side). In some embodiments, intermediate set of posts 704e/704f are positioned along the same side as the front set of posts 704a/704b; however, the intermediate set of posts 704e/704f are located near the rear set of posts 704c/704d and coupled on base 302 at and/or near the side (e.g. instead of coupled to the side of the side as with the front set of posts 704a/704b). In some embodiments, a first post 704e of the intermediate set of posts 704e/704f is located closer to the opening side 402a while a second post 704f of the intermediate set of posts 704e/704f is closer to the rear side (not shown) and vice versa).

In some embodiments, the one or more foldable rigid walls 702 are coupled along the plurality of posts 704. In some embodiments, the one or more foldable rigid walls 702 are coupled along one or more sides of base 302 via the plurality of posts 704. In some embodiments, opening side 402a of base 302 does not include a rigid wall 702. In some embodiments, the one or more foldable rigid walls 702 function as vertical supports along with the plurality of posts 704. In some embodiments, the one or more foldable rigid walls 702 coupled via the front set of posts 704a/704b, the rear set of posts 704c/704d, and the intermediate set of posts 704e/704f, include two sub panels (shown by dotted line in rigid wall 702) coupled together via a hinge. In some embodiments, the two side panels for a respective rigid wall are coupled at the intermediate set of posts 704e/704f such that the respective rigid wall is configured to open and/or fold along the intermediate set of posts 704e/704f. For example, adjustable pallet rack 700 includes one or more foldable rigid walls 702a-702c. Foldable rigid sidewalls 702a and 702c are coupled along respective front set of posts 704a/704b, the rear set of posts 704c/704d, and/or the intermediate set of posts 704e/704f. Fordable rigid sidewalls 702a and 702c further include two sub panels 706 coupled together at intermediate set of posts 704e/704f. The two sub panels 706 of foldable rigid sidewalls 702a and 702c, respectively, are configured to open or fold along the intermediate set of posts 704e/704f.

FIG. 7B illustrates a folded configuration of an adjustable pallet rack in accordance with some embodiments. Folded adjustable pallet rack 750 has foldable rigid sidewalls 702a and 702c folded to reduce the total space used in an unfolded configuration (e.g. adjustable pallet rack 700). In some embodiments, folded adjustable pallet rack 750 is configured to be nested with other folded adjustable pallet rack 750 and/or other adjustable pallet racks described herein. In some embodiments, adjustable pallet rack 750 allows for efficient storage by folding the rigid sidewalls 702a and 702c to reduce the space used by adjustable pallet rack 700 (as shown in FIG. 750). Additionally and/or alternatively, in some embodiments, base 302 is configured to fold upward (not shown).

FIGS. 8A-8C illustrate an adjustable pallet rack with removable plurality of posts in accordance with some embodiments. In some embodiments, adjustable pallet rack 800 includes all of the features discussed above in FIGS. 3A-7B. In this embodiment, base 802 includes one or more post openings 808, the one or more post openings 808 configured to receive one or more posts. In some embodiments, the one or more post openings 808 are at one or more corners 810 of base 802 or near one or more sides of base 802. In some embodiments, the plurality of posts includes fixed posts 812 and removable posts 814. In some embodiments, the plurality of posts include at least two fixed posts 812a/812b and at least two removable posts 814a/814b. In some embodiments, fixed posts 812a/812b of the plurality of posts are coupled to a first side of base 802. In some embodiments, the fixed posts 812 include a rear crossbar 816. In some embodiments, at least two removable posts 814a/814b are configured to be received by the one or more post openings 808 of base 802. In some embodiments, each post of the plurality of posts is removable from base 802.

In some embodiments, the at least two removable posts 814a/814b are removed from base 802 to reduce the amount of space used by adjustable pallet rack 800. For example, in some embodiments, adjustable pallet rack 800 is stored or in transit without any loaded pallets or other freight and to reduce the space used by adjustable pallet rack 800, the at least two removable posts 814a/814b are removed to allow for the available space to be used efficiently. In some embodiments, the removable posts 814 and the at least one height adjustable shelf 806 are stored and/or stowed against the back panel (e.g., rear crossbeam 816). Alternatively, the at least one height adjustable shelf 806 includes one or more holes 808 and is used to couple removable posts 814 with base 802.

FIG. 8B illustrates an adjustable pallet rack with removed posts of the plurality of posts. In some embodiments, the removable posts 814 are removed from adjustable pallet rack 800. In some embodiments, the removable posts 814 are placed on base 802 and secured (e.g. via a strap, bolt, anchor, or other fixture) against the rear crossbar 816. For example, as shown in FIG. 8B, removable posts 814 are placed on base 802 and pushed against the rear crossbar 816. The removable posts 814 are secured against the rear crossbar 816 such that they do not move or fall from adjustable pallet rack 800. As described above, removing removable posts 814 reduces the space used by adjustable pallet rack 800 and allows for more free space in a transportation unit (e.g., transportation unit 150; FIG. 2) to be used if the adjustable pallet rack 800 is not in use (e.g. loaded). In some embodiments, the at least one height adjustable shelf 806 is removed from the plurality of posts 804 and placed on base 802 for transportation.

FIG. 8C illustrates nested/stacked adjustable pallet racks with removable plurality of posts. In some embodiments, adjustable pallet rack 800 is configured to be nested/stacked as described above in FIGS. 4A-4D. Similarly, the at least one height adjustable shelf 806 is configured to be removed and may be placed on top of base 802 while the adjustable pallet racks 800 are nested (as described in FIGS. 4A-4D). Additionally or alternatively, the at least one height adjustable shelf 806 is stowed against the back panel (e.g., rear crossbeam 816).

In some embodiments, the removable posts 814 are removed from adjustable pallet rack 800 before nesting. In some embodiments, the removable posts 814 are placed on base 802 and secured against rear crossbar 816 as described above in FIG. 8B. Nested/stacked adjustable pallet rack 850 include one or more adjustable pallet racks 800. In some embodiments, each adjustable pallet rack 800 of nested/stacked adjustable pallet rack 850, except for the bottom adjustable pallet rack 800, is pushed against rear crossbar 816 and/or secured removable posts 814. Nested/stacked adjustable pallet rack 850 is configured to transport one or more adjustable pallet racks 800 while limiting the space used (e.g., limiting the space used to the footprint of a single adjustable pallet rack 800).

Figures 9A, 9B:
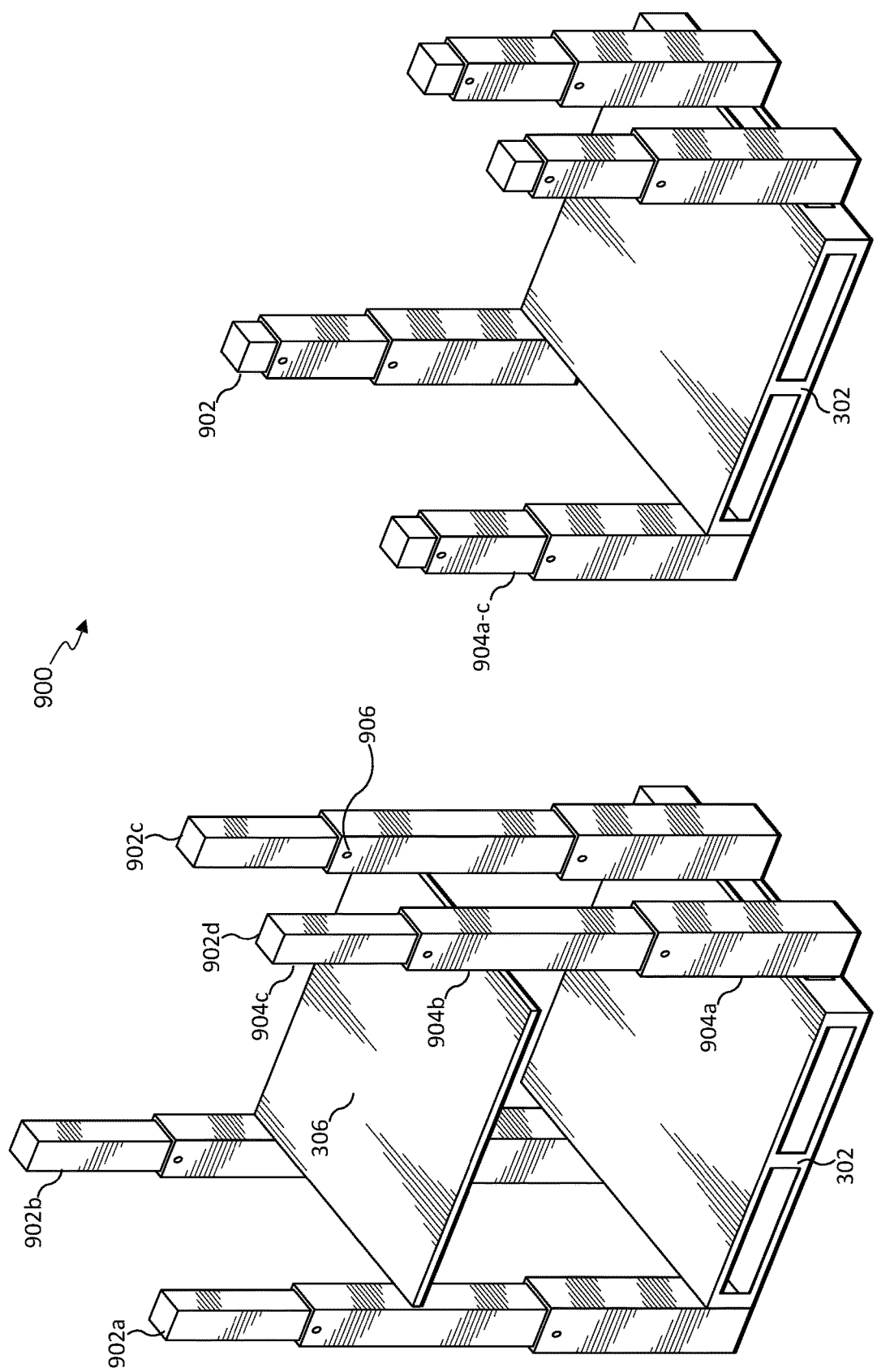
FIGS. 9A-9C illustrate adjustable pallet racks with a plurality of collapsible posts in accordance with some embodiments.
Figure 9C:
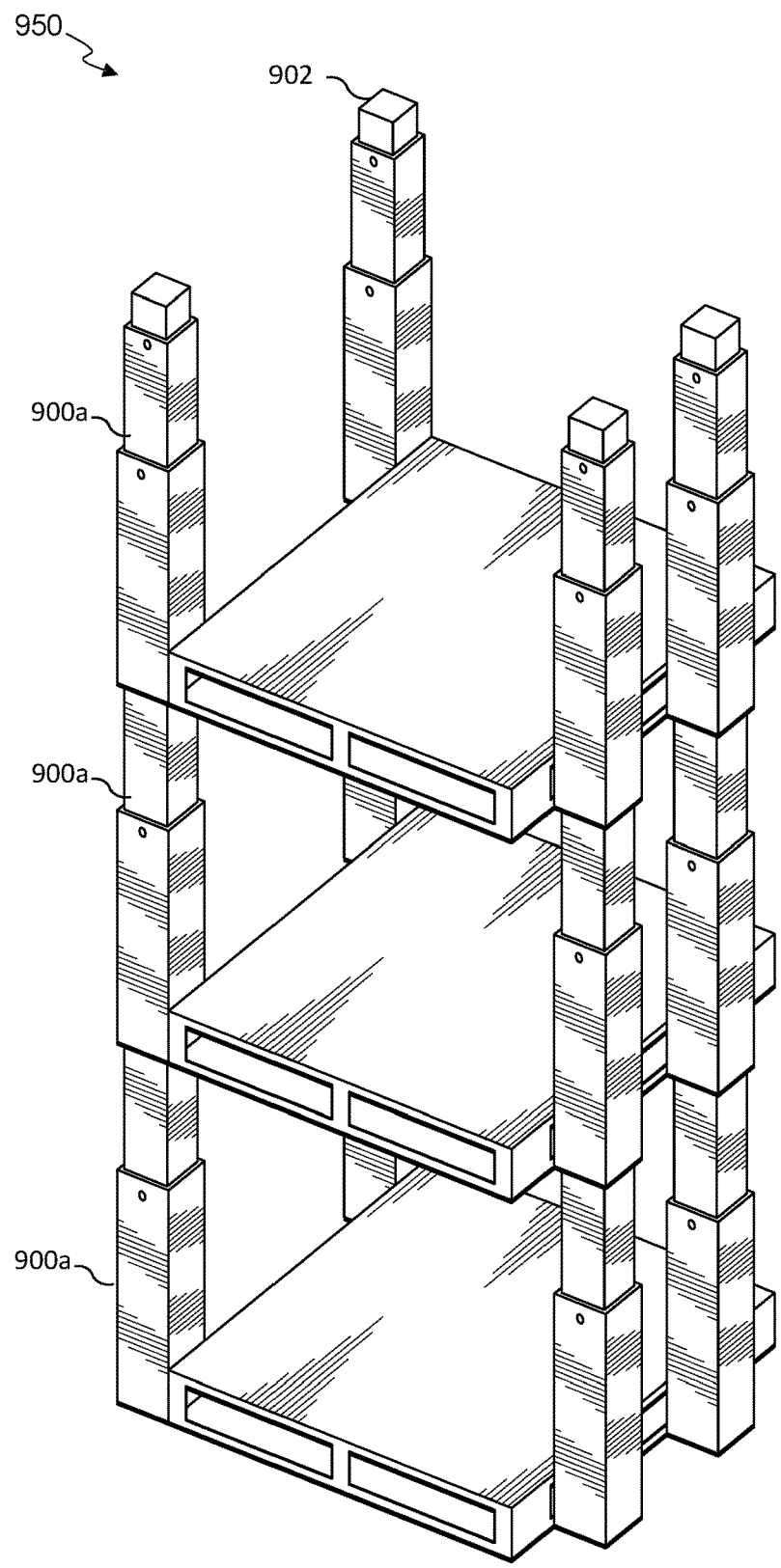

FIGS. 9A-9C illustrate adjustable pallet racks with a plurality of collapsible posts in accordance with some embodiments. In FIG. 9A, an adjustable pallet rack 900 includes all of the features discussed above in FIGS. 3A-8C. In this embodiment, adjustable rack 900 includes a plurality of collapsible posts 902 coupled to the base 302. In some embodiments, at least two posts 902a/902b of the plurality of collapsible posts 902 are coupled to a first side of base 302 at respective corners of the side of base 302. In some embodiments, at least two posts 902c/902d of the plurality of collapsible posts 902 are coupled to a second side of base 302 opposite the first side at and/or near the center of the second side of base 302. In this way, the first side is wider (e.g., an opening side) than the second side (narrow side) of base 302. In some embodiments, each post of the plurality of collapsible posts 902 includes at least three subsections 904a-904c. In some embodiments, the at least three subsections 904a-904c are secured 906 via pins, spring loaded pins, bolts, anchors, and/or other securing mechanisms when extended fully or partially. In some embodiments, each subsection 904 is a distinct length. For example, in some embodiments, the first subsection 904a is the longest and the second subsection 904b is longer than the third subsection 904c. Alternative and/or additionally, in some embodiments, each subsection 904 is the same length.

FIG. 9B shows adjustable pallet rack in a collapsed configuration in accordance with some embodiments. In some embodiments, the at least three sub sections 904a-904c are configured to collapse inside the larger sub sections when not secured (e.g., pins, bolts, anchors, etc. removed and/or disengaged). For example, a first sub section 904a of the plurality of collapsible posts 902 is configured to be received and/or nest inside a second sub section 904b of the plurality of collapsible posts 902 that is larger than the first sub section 904a and the second sub section 904b of the plurality of collapsible posts 902 is configured to be received or nested inside a third sub section 904c of the plurality of collapsible posts 902 that is larger than the second sub section 904b. In some embodiments, the third sub section 904c of the plurality of collapsible posts 902 is configured to lock and/or secure (via pins, bolts, anchors, and/or other securing mechanisms) the first and second sub sections 904a/904b when collapsed (e.g., reducing the risk of the plurality of collapsible posts 902 extending when not in use). In some embodiments, the plurality of collapsible posts 902 have a predetermined height (e.g. 1 to 4 feet) when fully collapsed. In some embodiments, the at least one height adjustable shelf (not shown) is removed from the plurality of collapsible posts 902 and placed on base 302 for easy access and transportation.

FIG. 9C shows stacking adjustable pallet rack with a plurality of collapsible posts in accordance with some embodiments. In some embodiments, adjustable pallet racks 900 is configured to be stacked with at least one other adjustable pallet racks 900. For example, stacked adjustable pallet racks 950 include at least three adjustable pallet racks 900 stacked on top of one another. In some embodiments, the plurality of collapsible posts 902 of adjustable pallet racks 900 is configured to receive (e.g., via a recess at the bottom of each plurality of collapsible posts 902) the plurality of collapsible posts 902 of an additional adjustable pallet rack 900. For example, as shown in FIG. 9C, the plurality of collapsible posts 902 of a bottom adjustable pallet rack 900a is configured to receive the plurality of collapsible posts 902 of a second adjustable pallet rack 900b. Similarly, the plurality of collapsible posts 902 of the second adjustable pallet rack 900b is configured to receive the plurality of collapsible posts 902 of a third adjustable pallet rack 900c and so forth. FIG. 9C shows stacked adjustable pallet racks 950 in a collapsed configuration; however, in some embodiments, the adjustable pallet racks 900 are stacked with fully extended or partially extended plurality of collapsible posts 902. Alternatively and/or and additionally, in some embodiments, plurality of collapsible posts 902 are fold down legs and include the features discussed herein.

FIGS. 10A-10D illustrate an asymmetric adjustable pallet rack with asymmetric plurality of posts. In some embodiments, adjustable pallet rack 1000 includes all of the features discussed above in FIGS. 3A-9C. In this embodiment, the plurality of posts 1002 include at four posts 1002a-1002d. In some embodiments, a first set of posts 1002a/1002b are coupled to a first side of base 302 and a second post 1002c/1002d are coupled to a second side of base 302, the second side opposite the first side. In some embodiments, the first set of posts 1002a/1002b are coupled at the corners 1008a/1008b of the first side of base 302 and the second set of posts 1002c/1002d are coupled at and/or near the center of the second side of base 302. In some embodiments, the first set of posts 1002a/1002b and the second set of post 1002c/1002d include a respective inset (e.g., first inset 1010a and a second inset 1010b). An inset is a portion of the first set of posts 1002a/1002b and the second set of posts 1002a/1002b that extends slightly from the first side and the second side of the base 302, respectively.

In some embodiments, the plurality of posts 1002 are arranged asymmetrically (e.g., posts coupled to base 302 are distinct). In some embodiments, a first set of posts 1002a/1002b of the plurality of posts 1002 have a greater height than the second post 1002c/1002d of the plurality of posts 1002 or vice versa. For instance, as shown in FIG. 10A the first set of posts 1002a/1002b have a greater height than the second set of posts 1002c/1002d. In some embodiments, the first set of posts 1002a/1002b and the second set of posts 1002c/1002d have respective crossbeams at the top of the plurality of posts 1002a-1002c (e.g. first crossbeam 1012a and second crossbeam 1012b) from post to post (e.g., from post 1002a to post 1002b and from post 1002c to post 1002d). In some embodiments, the length of the first crossbeam 1012a is based on distance between the posts of the first set of posts 1002a/1002b and the length of the second crossbeam 1012b is based on distance between the posts of the second set of posts 1002a/1002b. As discussed below, adjustable pallet rack 1000 with asymmetric plurality of posts 1002 are configured to be nested and provide additional space reduction when placed in a transportation unit (e.g., transportation unit 150; FIG. 2).

Figure 10B:
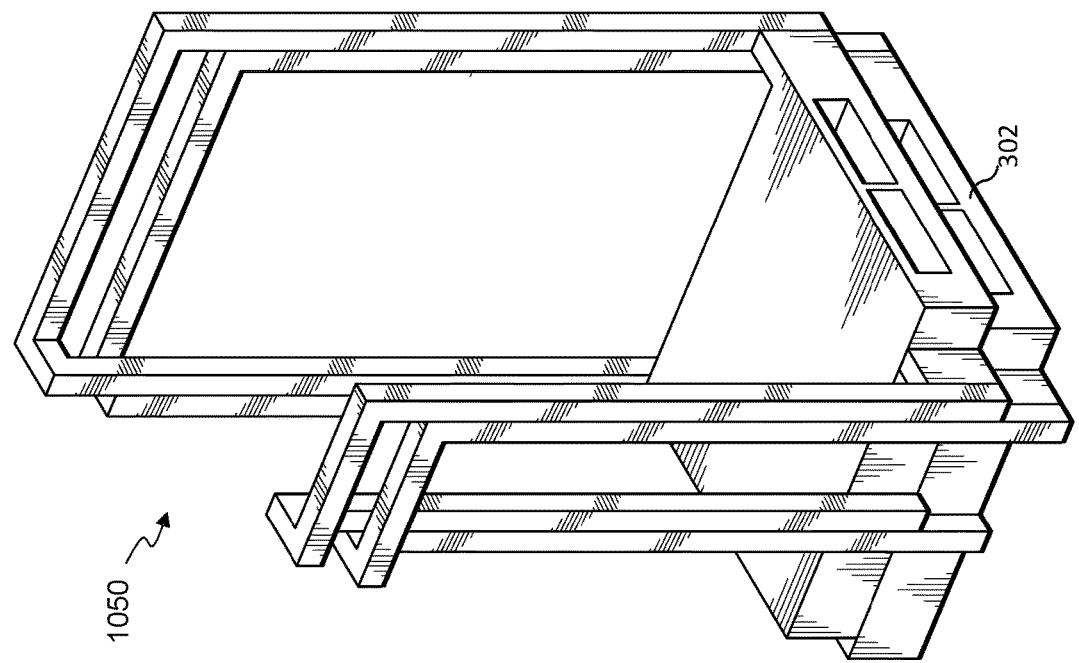
FIGS. 10A-10D illustrate an adjustable pallet rack with asymmetric plurality of posts.
Figure 10A:
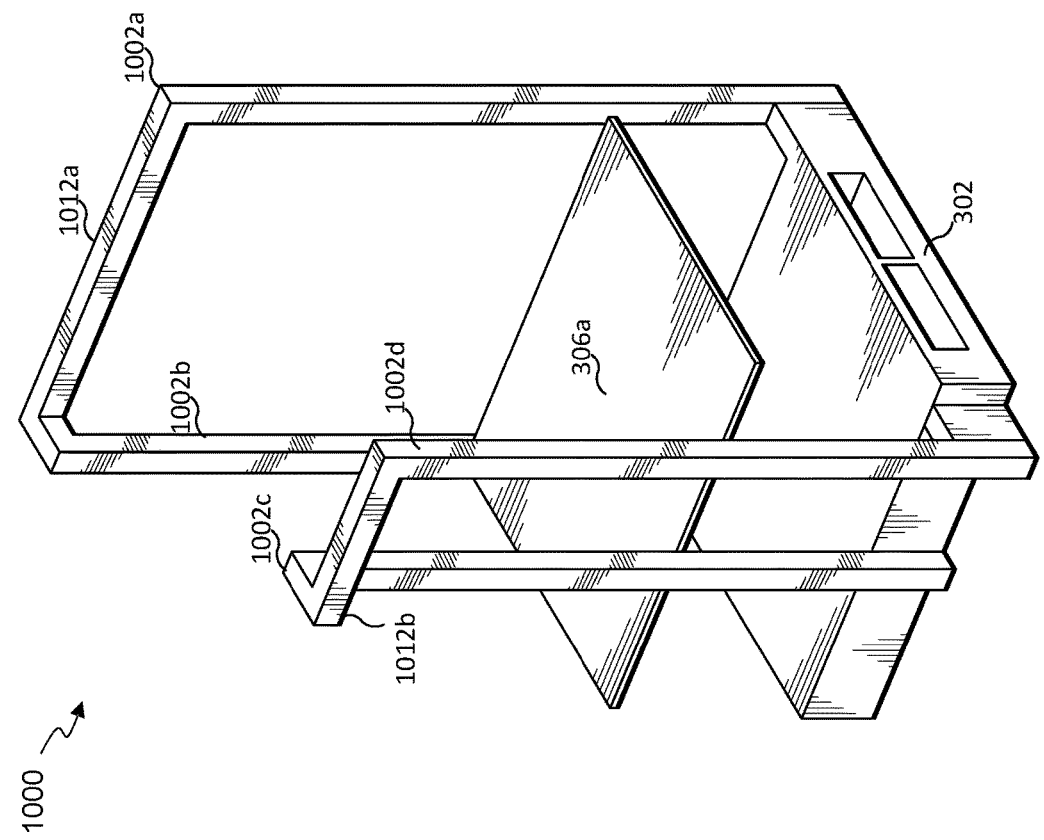

FIG. 10B illustrates adjustable pallet racks with asymmetric plurality of posts nested in accordance with some embodiments. In some embodiments, adjustable pallet rack 1000 is configured to be nested or stacked as described above in FIG. 4A-4D. Similarly, the at least one height adjustable shelf (not shown) is configured to be removed and may be placed on top of base 302 while the adjustable pallet racks 1000 are nested (e.g., as described in FIGS. 4A-4D). In some embodiments, nested adjustable pallet rack 1050 includes at least two adjustable pallet racks 1000. In some embodiments, the base 302 of the adjustable pallet rack 1000 that is being nested is received and supported by the base 302 of the bottom adjustable pallet rack 1000. As described above with respect to FIG. 4A-4D, nested adjustable pallet rack 1050 reduces the amount of space occupied by multiple adjustable pallet racks 1000 by occupying the same width and occupying slightly more length (e.g., 1 in. to 6 in. per each additional nested rack) of a single adjustable pallet rack 1000. Additionally, nested adjustable pallet rack 1050 increase mobility by allowing multiple adjustable pallet racks 1000 to be moved at a time.

Figure 10C:
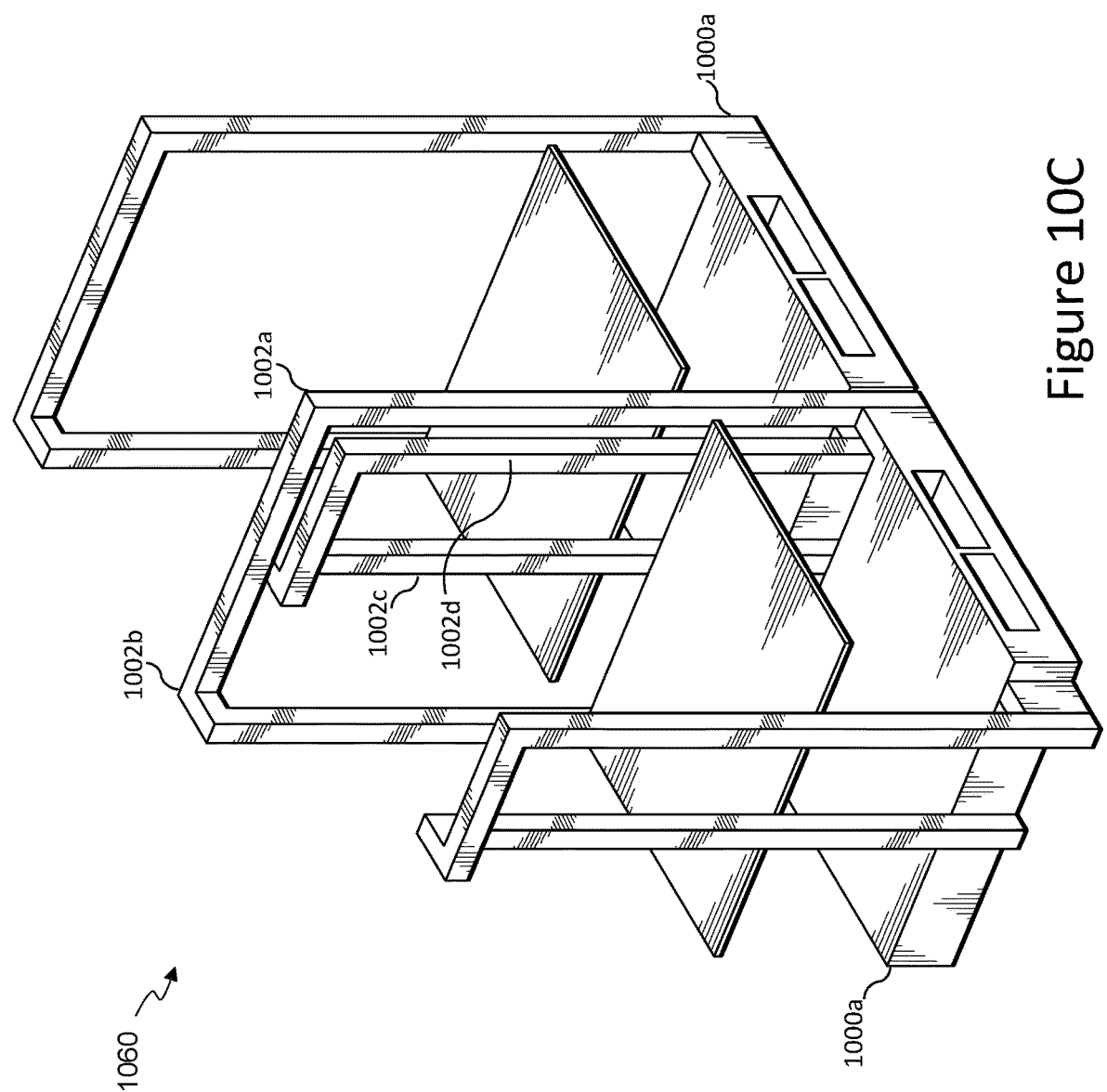

FIG. 10C illustrates two adjustable pallet racks with asymmetric plurality of posts next to each in accordance with some embodiments. In some embodiments, adjustable pallet racks 1000 are loaded in transportation unit 150 (e.g. FIG. 2) adjacent to each other facing the same direction. Adjustable pallet racks 1000 are configured such that the second set of posts 1002c/1002d of a first adjustable pallet rack 1000a fit underneath the first set of posts 1002a/1002b of a second adjustable pallet rack 1000b. For example, as shown in FIG. 10C the first adjustable pallet rack 1000a and the second adjustable pallet rack 1000b are configured to fit together such that the space used by the plurality of posts 1002 is reduced. In particular, the second set of posts 1002c/1002d of the first adjustable pallet rack 1000a and the first set of posts 1002a/1002b of the second adjustable pallet rack 1000b use the same space. In this configuration, a transportation unit 150 (e.g. FIG. 2) loaded with one or more rows of adjustable pallet racks 1000 would not need to alternate between a first row configuration and a second row configuration, as discussed herein, to reduce the space used by the adjustable pallet racks 1000.

Figure 10D:
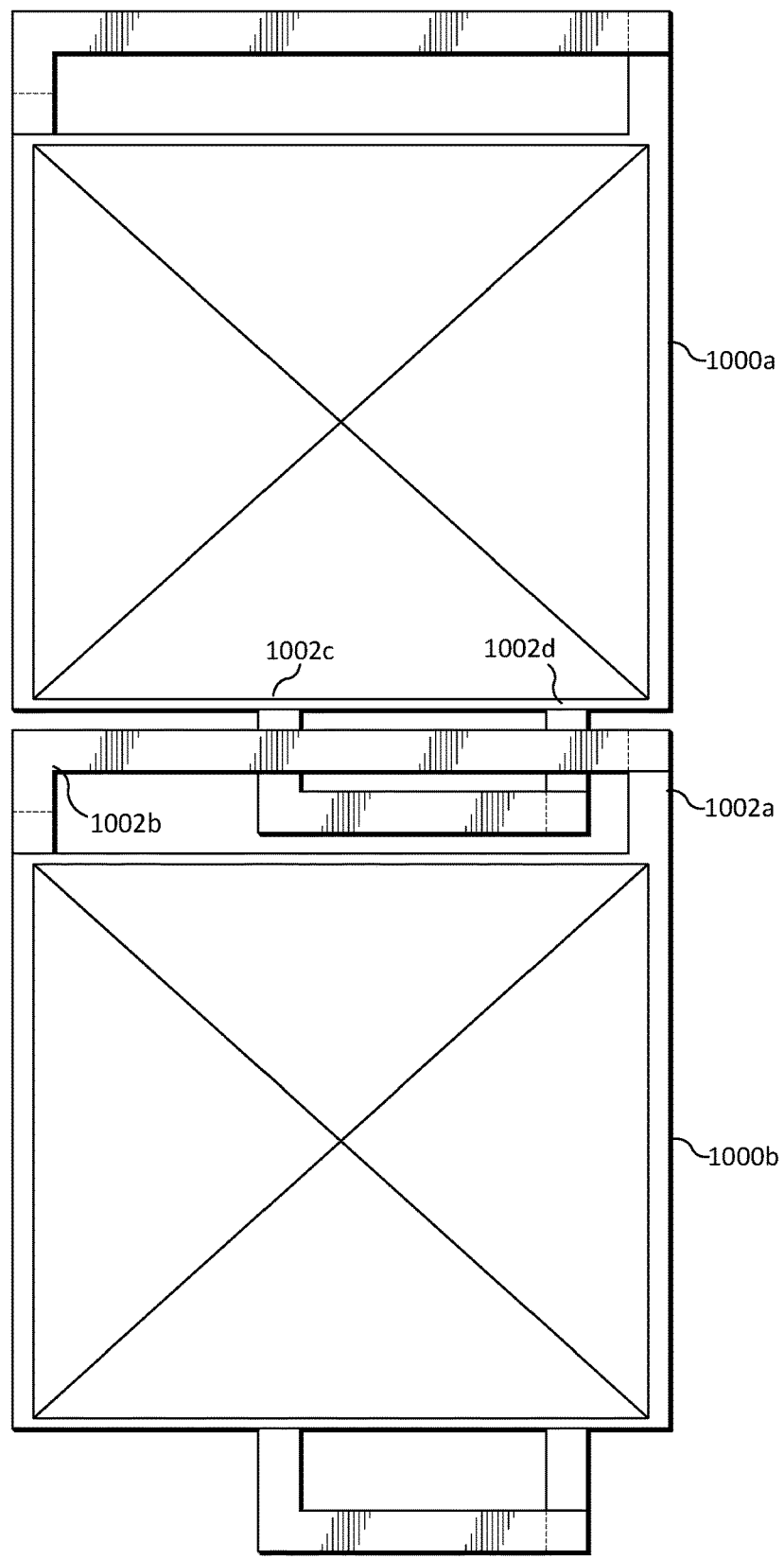

FIG. 10D illustrates a top down view of two adjustable pallet racks with asymmetric plurality of posts next to each in accordance with some embodiments. As described above in FIG. 10C, adjustable pallet racks 1000 allow for the plurality of posts 1002 of adjacent adjustable pallet racks 1000 to occupy the same space (e.g., a second set of posts 1002c/1002d of a first adjustable pallet rack 1000a resting underneath a first set of posts 1002a/1002b of a second adjustable pallet rack 1000b). Top down view 1060 shows the different plurality of posts 1002 fitting together to reduce the space used by adjustable pallet rack 1000.

Figure 11B:
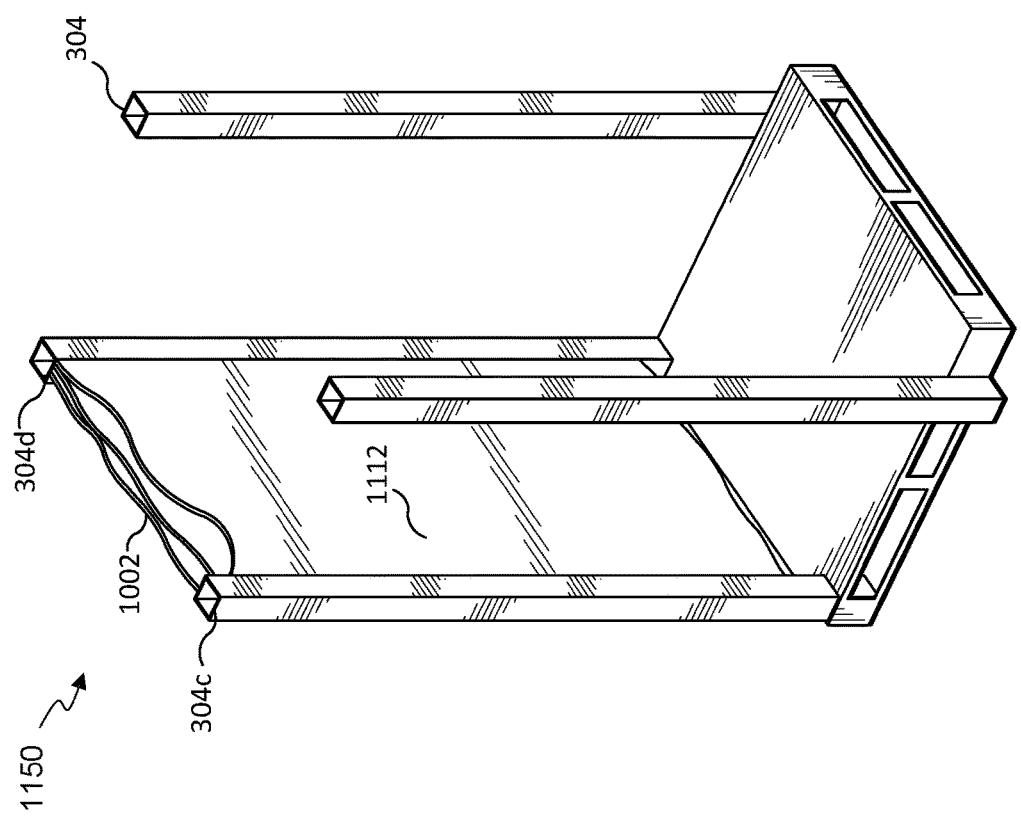
FIGS. 11A and 11B illustrate an adjustable pallet rack with flexible sidewalls in accordance with some embodiments.
Figure 11A:
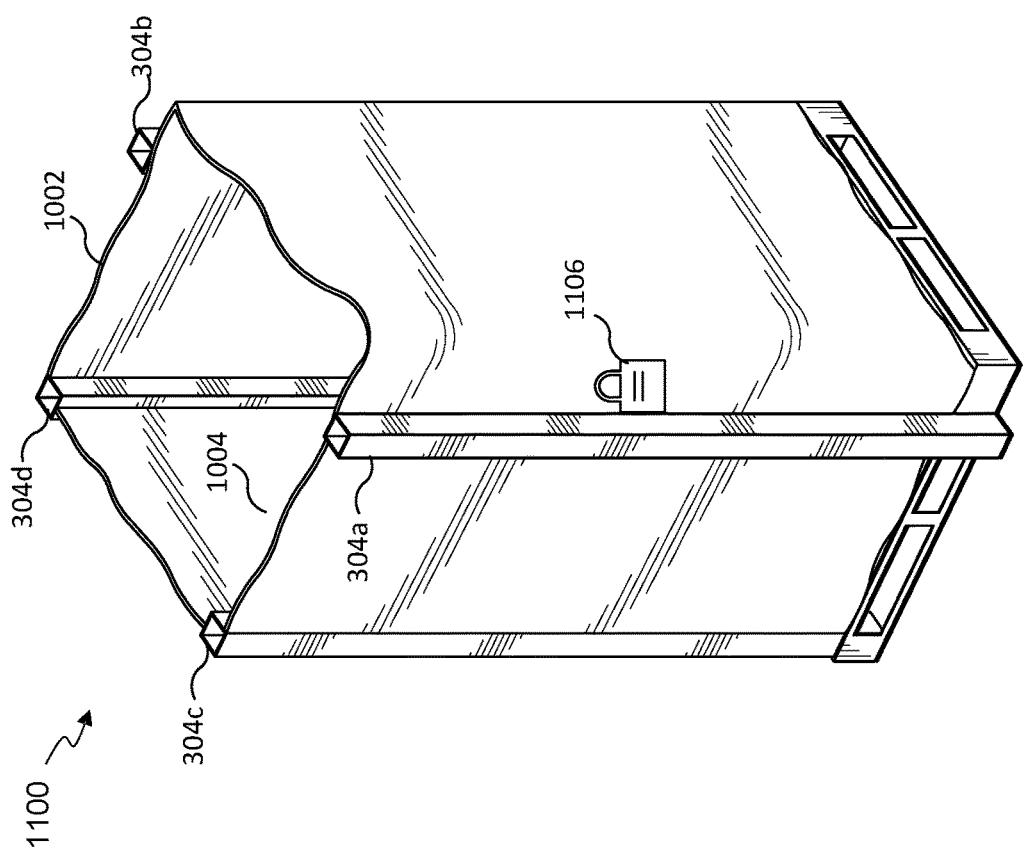

FIGS. 11A and 11B illustrate an adjustable pallet rack with flexible walls made of flexible material in accordance with some embodiments. In some embodiments, adjustable pallet rack 1100 includes all of the features discussed above in FIGS. 3A-10D. In this embodiment, adjustable pallet rack 1100 further includes flexible material 1102 coupled between and/or along the plurality of posts 304. In some embodiments, the flexible material 1102 generates one or more sidewalls 1104. In some embodiments, a flexible material 1102 is coupled to the at least two rear posts 304c/304d and at least one front post of the at least two front posts 304a/304b to generate two sidewalls 1104a/1104b. In this way, flexible material creates two secure panels (e.g., sidewalls 1104a/1104b) for two sides of adjustable pallet rack 1100. In some embodiments, another flexible material 1102 is coupled from at least two rear posts 304c/304d to a first front post and then to a second front post of the at least two front posts 304a/304b to enclose adjustable pallet rack 1100 (e.g., the first front post is opposite to the at least one front post of the at least two front posts 304a/304b). For example as shown in FIG. 11A, flexible material 1102 fully encloses adjustable pallet rack 1100. Additionally or alternatively, in some embodiments, enclosing the adjustable pallet rack 1100 with flexible material 1102 protects loaded pallets and/or other freight from theft, movement (e.g., sliding, falling, shifting, etc.), and/or damage.

In some embodiments, the flexible material 1102 is coupled to the plurality of posts 304 along the outside of the posts, the inside of the post, and/or in-between the posts (e.g., intersecting each posts). In some embodiments, the flexible material includes canvas, plastic, cloth/fabric, etc. In some embodiments, flexible material 1102 is a semi rigid or hinged rigid material such as aluminum, steel sheet metal, plastic, fiberglass or carbon composite, etc. In some embodiments, the flexible material is coupled to the plurality of posts 304 via fasteners such as sortable hooks, clips, screws, bolts, anchors and/or other fasteners. In some embodiments, the flexible material 1102 is removed adjustable pallet rack 1100 to adjust the at least one height adjustable shelf (as discussed below in FIG. 12), to nest the adjustable pallet rack 1100 (as discussed above in FIGS. 4A-4D), or to store/stow adjustable pallet rack 1100 or the flexible material 1102.

In some embodiments, adjustable pallet rack 1100 is configured to be locked or includes a locking mechanism 1106 (e.g., padlock, latch, handles, bolts, etc.). In some embodiments, the locking mechanism 1106 is on a post of the plurality of posts 304 and is configure to secure (e.g., prevent removal) flexible material 1102 in place. For example, after flexible material 1102 encloses adjustable pallet rack 1100 as described above, the flexible material 1102 may be secured in place via a locking mechanism 1106 on a post of the plurality of posts 304. Securing flexible material 1102 to the adjustable pallet rack 1100 prevents the loaded pallets or other freight from being readily accessed or viewed without the flexible material 1102 being removed.

FIG. 11B illustrates another configuration of the adjustable pallet rack with flexible material in accordance with some embodiments. In some embodiments, flexible material 1102 is coupled to the at least two rear posts 304c/304d. For example, as shown in adjustable pallet rack 1150, flexible material 1102 is coupled to the rear posts 304c/304d and/or the back of adjustable pallet rack 1150 (e.g. flexible material 1102 generating a back wall 1112 and laying additional flexible material 1102 flat against the back wall 1112). In some embodiments, flexible material 1102 is coupled to the rear posts 304c/304d to enable adjustable pallet rack 1150 to be nested with additional adjustable pallet rack 1150 (e.g., including all embodiments disclosed herein). Additionally and/or alternatively, in some embodiments, flexible material 1102 is coupled to the rear posts 304c/304d reduces the space used adjustable pallet rack 1150 and allows for efficient storage.

FIG. 12 illustrates the configuration of height adjustable shelves in accordance with some embodiments. In some embodiments, adjustable pallet rack 1200 includes all of the features described above in FIGS. 3A-11B. In FIG. 12, the height adjustable shelves 306 of adjustable pallet rack 300 are adjusted. Each height adjustable shelf 306 is configured to be coupled to any position along the plurality of posts 304. For example, height adjustable shelves 306 may be coupled to the top end of the plurality of posts 304 to the base 302 and/or anywhere in between. In some embodiments, height adjustable shelves 306 are configured to be coupled to the plurality of posts 304 via one or more hooks, keyholes, pins, anchors, etc.

In some embodiments, the height adjustable shelves 306 are configured to be adjusted by one or more people. For example, in some embodiments, the height adjustable shelves 306 are adjusted by two people on opposite sides of the adjustable pallet rack 300 and adjust the height adjustable shelf 306 by working together. The two people lift the adjustable height shelf 306 to remove it from its initial attachment point, raise or lower the height adjustable shelf 306 to a new attachment point height, and attach the height adjustable shelf 306 to adjustable pallet rack 300 at the new attachment point height. Alternatively or additionally, in some embodiments, the height adjustable shelves 306 are configured to be adjusted by a forklift and/or similar devices/vehicles. In some embodiments, the one or more height adjustable shelves 306 are lifted and/or moved from one or more sides of the height adjustable shelves 306. In some embodiments, the height adjustable shelves 306 are lifted and/or moved from underneath the height adjustable shelves 306. In some embodiments, couplings (e.g., hooks, pins, keyholes, anchors, etc.) that couple the height adjustable shelves 306 to the plurality of posts 304 are loosened and/or removed before the height adjustable shelves 306 is adjusted and reapplied after the new height of the height adjustable shelves 306 has been set.

In some embodiments, the height adjustable shelves 306 are configured to be readily adjustable such that the height of the height adjustable shelves 306 may be set according to the height of the loaded pallets or other freight. For example, the heights of the height adjustable shelves 306 are adjusted to leave enough room below the height adjustable shelf 306 for a loaded pallet or other freight to be loaded onto the adjustable pallet rack 300. The height adjustable shelves 306 are adjusted based on the spacing of the height adjustable shelves 306 couplings (e.g., hooks, pins, keyholes, anchors, etc.) in addition to an amount of space needed to load and/or unload a loaded pallet and/or freight from the space underneath each height adjustable shelves 306.

FIG. 13 illustrates a loaded adjustable pallet rack in accordance with some embodiments. In some embodiments, loaded adjustable pallet rack 1300 includes all of the features described above in FIGS. 3A through 11B. The base 302 of the loaded adjustable pallet rack 1300 is configured to receive and support a loaded pallet 1302a. Additionally, each height adjustable shelf 306a/306b is configured to receive respective loaded pallets 1302b and 1302c. In some embodiments, each height adjustable shelf 306 is configured to receive and/or support loaded pallets 1302 ad/or other freight weighing at least 500 lbs. In some embodiments, each height adjustable shelf 306 is configured to receive and/or support loaded pallets 1302 or other freight that may have a height of at least 24 in. In some embodiments, each height adjustable shelf 306 is configured to receive and/or support loaded pallets 1302 or other freight with a height of 4 ft. or greater. As described above in FIG. 3A, in some embodiments, the loaded adjustable pallet rack 1300 includes an open top such that loaded pallets and/or freight may extend above the plurality of posts 304. For example, as illustrated in FIG. 13, loaded pallet 1302c extends beyond the height of the plurality of posts 304.

In some embodiments, the height adjustable shelves 306a/306b are coupled to the plurality of posts 304 to use the available vertical space of a transportation unit. In some embodiments, the adjustable pallet racks 102 with loaded freight substantially fill the height of the transportation unit 150 (e.g., the vertical space of the transportation unit 150 from floor to ceiling; FIG. 2). The height of the transportation unit 150 is substantially filled when the available vertical space of the transportation unit is less than 12 in. of space between the interior ceiling of the transportation unit 150 and the top of the palletized freight (e.g. loaded pallet 1302c) loaded on the top or upper height adjustable shelf 306b of the loaded adjustable pallet rack 1300. In some embodiments, as described above in FIG. 13, the height adjustable shelves 306a/306b are coupled to the plurality of posts 304 such that no additional weight is placed on loaded pallets 1302a-1302c below. For example, as illustrated in FIG. 13, height adjustable shelf 306a is coupled to the plurality of posts 304 above loaded pallet 1302a without resting and/or adding additional weight to loaded pallet 1302a. Additionally, height adjustable shelf 306b is coupled to the plurality of posts 304 above loaded pallet 1302b without resting and/or adding additional weight to loaded pallets 1302a/1302b and/or to height adjustable shelf 306a. In some embodiments, loaded adjustable pallet rack 1300 is configured to support at least 3500 lbs. In some embodiments, loaded adjustable pallet rack 1300 is configured to support more than 3500 lbs.

In some embodiments, the adjustable pallet racks 1300 are configured to be loaded while in a loading dock and/or warehouse to reduce dock space required to stow freight that is awaiting transport on a transportation unit. In this way, the adjustable pallet racks 1300 reduce the amount of floor space required to stow freight near a freight dock while the freight is awaiting transport. Similarly, the adjustable pallet racks 1300 allow for staging of loaded pallets 1302 or other freight near a dock before stowing it into a warehouse or transferring it for further transportation to reduce the floor space required while the loaded pallets 1302 and/or other freight await the next step in handling or transportation.

Adjustable pallet rack 1300 may be moved or reoriented, via the fokliftable base 302 as described above in FIGS. 3A-3C. In some embodiments, the adjustable pallet rack 1300 is configured to be transported while loaded with freight or loaded pallets. For example, as shown in FIG. 13, the adjustable pallet rack 1300 is loaded with three loaded pallets 1302a-1302c and is configured to be moved with the a forklift and/or similar devices and/or vehicles as described herein.

Figures 14A, 14B:
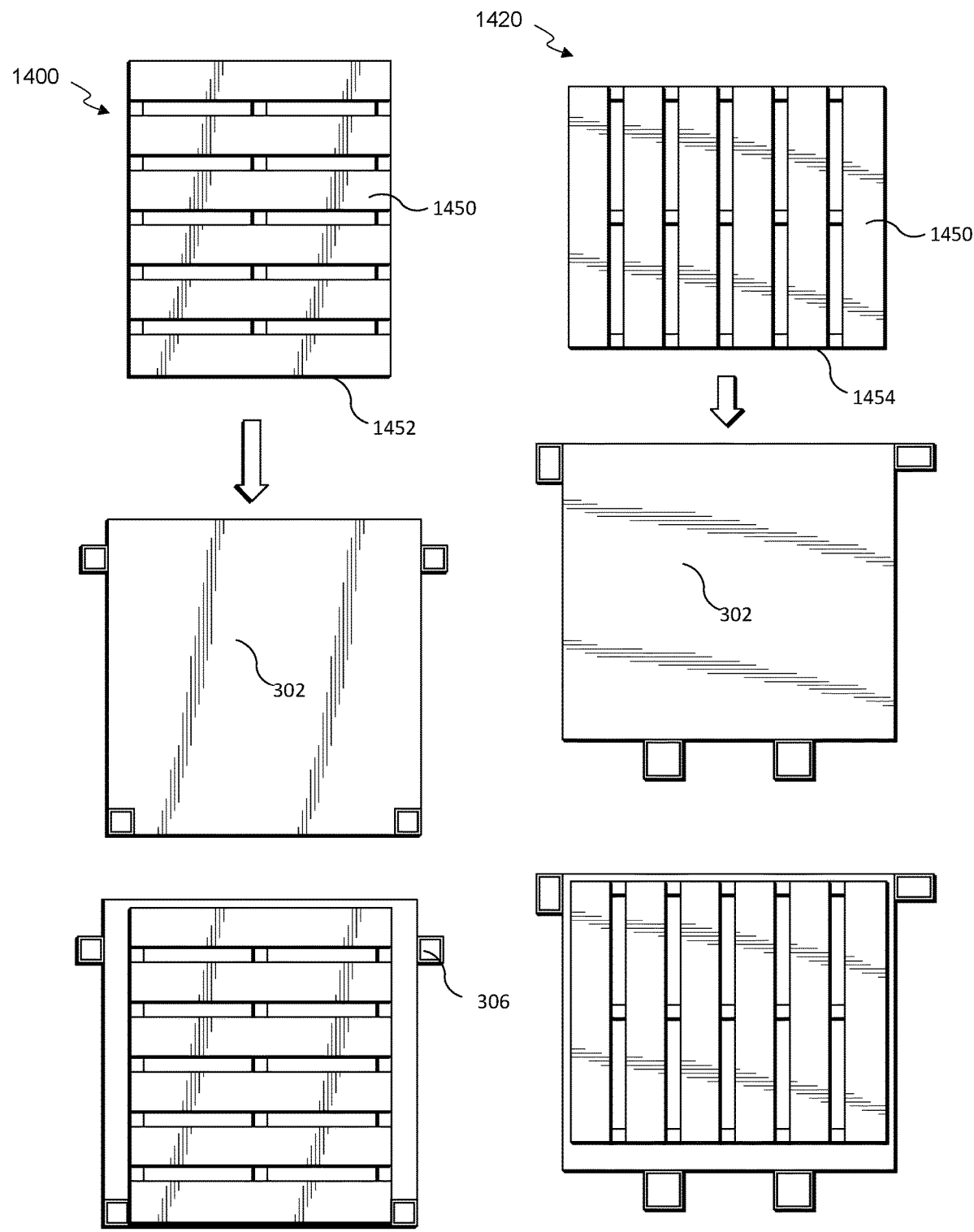
FIGS. 14A and 14B illustrate loading of pallet racks into the adjustable pallet racks in accordance with some embodiments.

FIGS. 14A and 14B illustrate loading of pallet racks into the adjustable pallet racks in accordance with some embodiments. FIG. 14A shows a top down view of an adjustable pallet rack 1400 (e.g., adjustable pallet racks described in FIGS. 3A-11B) receiving and/or being loaded by a pallet 1450. In some embodiments, pallet 1450 has predetermined dimensions based on use (e.g., type of freight), region, and/or regulatory standards. In some embodiments, the predetermined dimensions for pallet 1450 are (40.00 in.×48.00 in.), (39.37 in.×47.24 in.), (45.9 in.×45.9 in.), (42.00 in.×42.00 in.), (43.30 in.×43.30 in.), (31.50 in.×47.24 in.). It should be noted that this is a non-limiting list of dimensions for pallets and may vary based on use and/or other regions.

In some embodiments, adjustable pallet rack 1400 is configured to receive pallet 1450 with any predetermined dimensions. In some embodiments, adjustable pallet rack 1400 is configured to receive pallet 1450 via its short side 1452 (e.g. based on the configuration of the plurality of posts 306; see FIGS. 3A-11B). The short side 1452 is the side of pallet 1450 with the smallest length for the predetermined dimensions of pallet 1450. For example, if pallet 1450 has predetermined dimensions 40.00 in.×48.00 in., the short side 1452 of pallet 1450 is the side measuring 40.00 in. As further shown in FIG. 14A, the pallet 1450 is received and supported on base 302 of adjustable pallet rack 1400. Alternatively or additionally, the pallet 1450 rests on a height adjustable rack 306 (e.g. FIG. 3).

FIG. 14B shows a top down view of another variation of adjustable pallet rack 1420 (e.g., adjustable pallet racks described in FIG. 5) receiving and/or being loaded by a pallet 1450. In some embodiments, adjustable pallet rack 1420 is configured to receive pallet 1450 with any predetermined dimensions. In some embodiments, adjustable pallet rack 1420 is configured to receive pallet 1450 via its long side 1454. The long side 1454 is the side of pallet 1450 with the longest length for the predetermined dimensions of pallet 1450. For example, if pallet 1450 has predetermined dimensions 40.00 in.×48.00 in., the long side 1454 of pallet 1450 is the side measuring 48.00 in. FIG. 14B further shows the pallet 1450 received and supported on base 302 of adjustable pallet rack 1420. Alternatively or additionally, the pallet 1450 rests on a height adjustable rack 306 (e.g. FIG. 3).

Figure 15A:
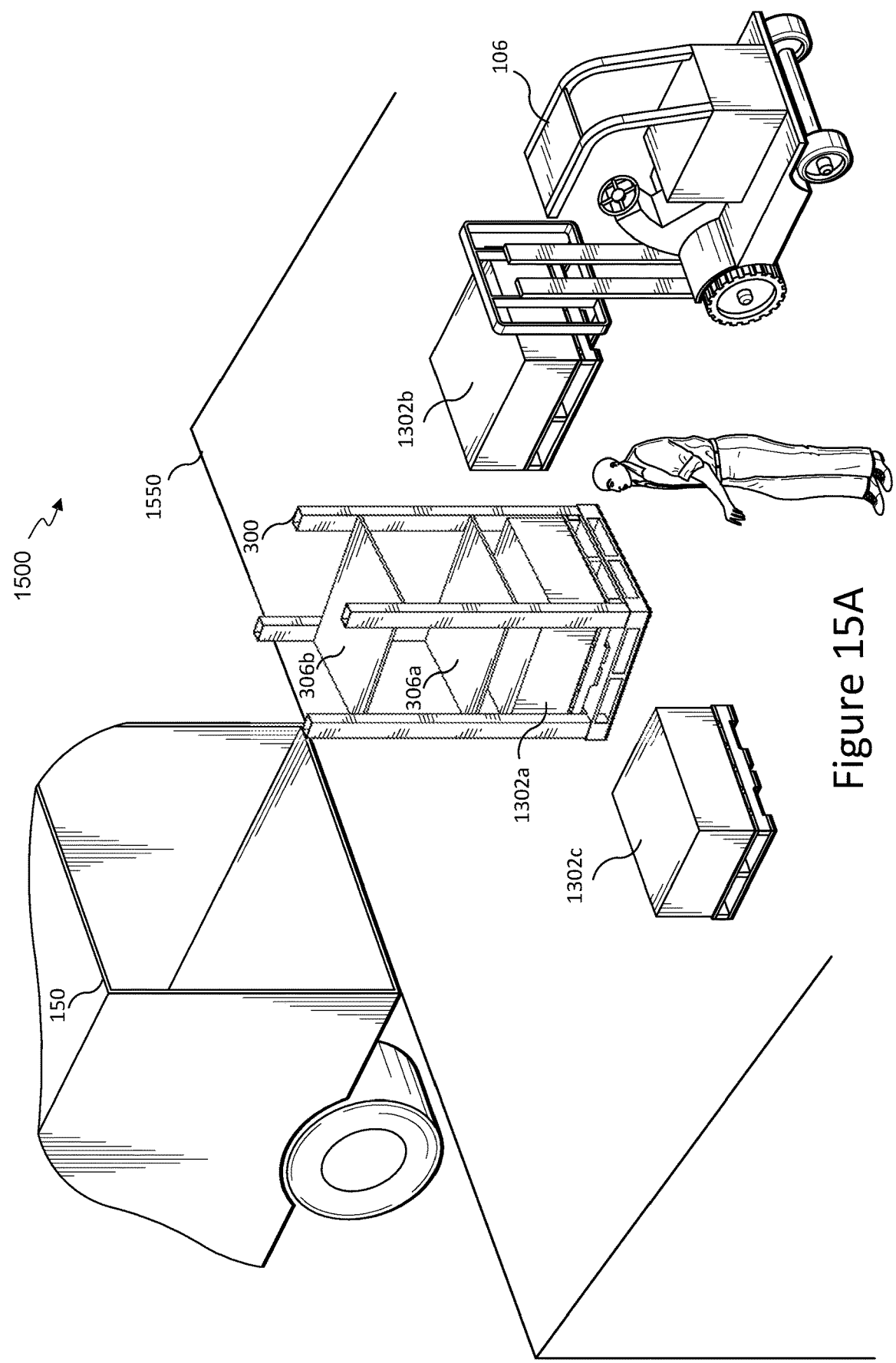
FIGS. 15A-15C illustrate the loading and unloading of loaded pallets into the adjustable pallet rack in accordance with some embodiments.
Figure 15B:
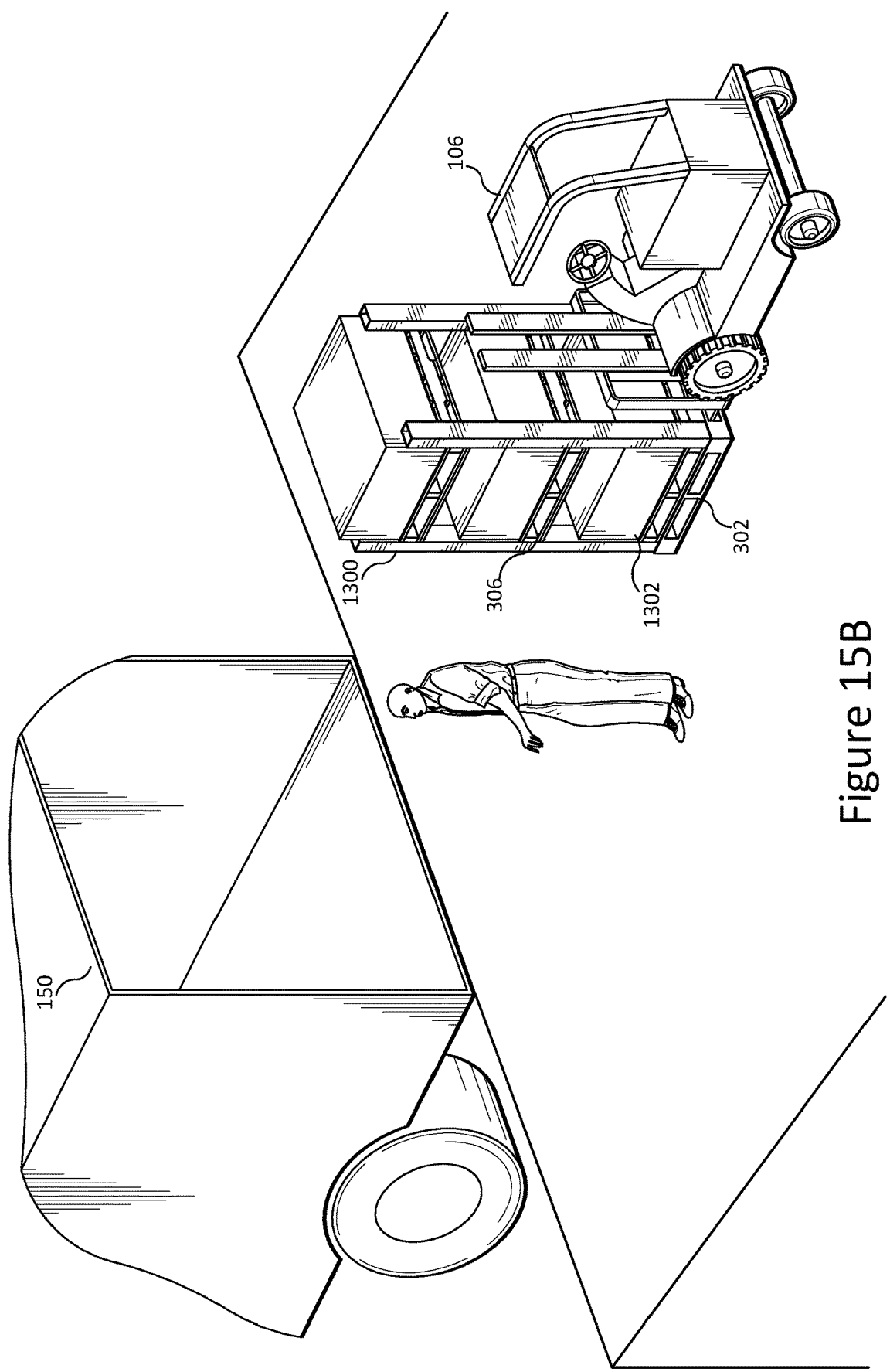
Figure 15C:
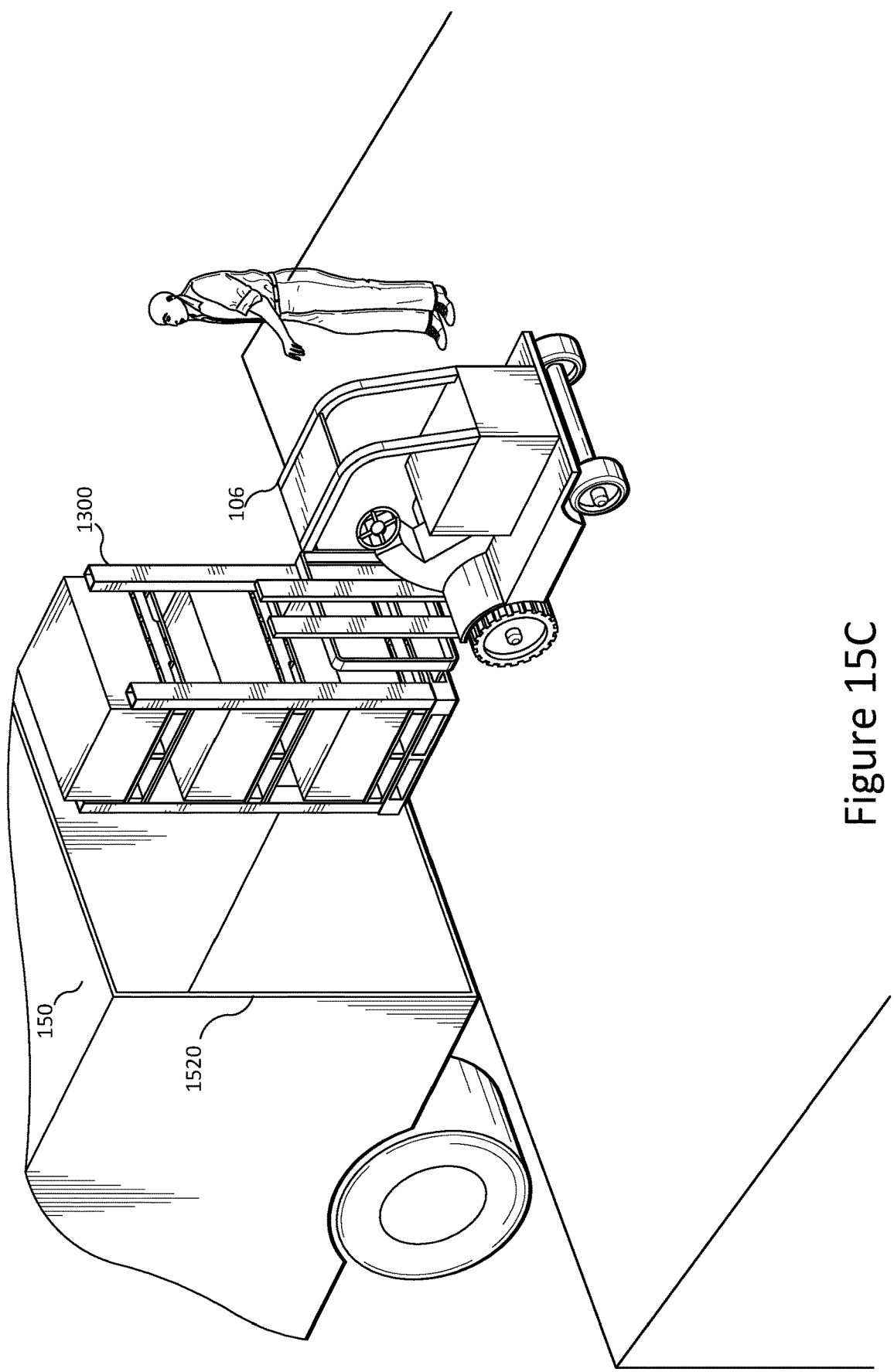

FIGS. 15A-15C illustrate the loading or unloading of loaded pallets into the adjustable pallet rack in accordance with some embodiments. The system 1500 includes adjustable pallet racks 300 and/or any other variations described above in FIGS. 3A-11B, one or more loaded pallets 1302, transportation unit 150, and a device and/or vehicle for forklifting the one or more loaded pallets 1302 or the adjustable pallet racks 300. Additionally, the adjustable pallet racks 300 in system 1500 include all of the features discussed above with respect to FIGS. 3A-11B.

In some embodiments, an adjustable pallet racks 300 is on a loading dock 1550 next to a transportation unit 150 to load or unload loaded pallets 1302 or other freight (e.g., nested adjustable racks as described above). In some embodiments, the loaded pallets 1302 are loaded or unloaded onto the adjustable pallet rack 300 via a forklift 106. For example, as shown if FIG. 15A, adjustable pallet rack 300 includes two height adjustable shelves 306 and a loaded pallet 1302a loaded onto the base 302 of the adjustable pallet rack 300. In some embodiments, a forklift 106 loads or unloads additional loaded pallets 1302b/1302c onto or off of the adjustable pallet rack 300.

In some embodiments, as discussed above in FIG. 12, the height adjustable shelves 306 are coupled to the plurality of posts 304 such that additional loaded pallets, such as loaded pallet 1302b, are loaded onto the adjustable pallet rack 300 without adding additional weight or pressure to the loaded pallets below the height adjustable shelves 306. For example, height adjustable shelf 306a is coupled to the plurality of posts 304 slightly above loaded pallet 1302a (e.g., leaving enough space to load or unload loaded pallets 1302 or other freight below) and is configured to receive an additional loaded pallet 1302b without adding any additional weight or pressure onto loaded pallet 1302a. In some embodiments, an additional height adjustable shelf 306b is coupled to the top or near the top of the plurality of post 304 to load or unload another loaded pallet 1302b onto the height adjustable shelf 306a. In some embodiments, after the other loaded pallet 1302b is loaded or unloaded onto the height adjustable shelf 306a, the additional height adjustable shelf 306*b* is repositioned or lowered in a similar manner as the height adjustable shelf 306*a*. For example, the additional height adjustable shelf 306*b* is lowered to leave a slight space under the other loaded pallet 1302*b* (e.g., without adding additional weight or pressured on the other loaded pallet 1302*b*). In some embodiments, adjusting the height of the additional height adjustable shelf 306*b* leaves enough space to load or unload the other loaded pallet 1302*b* while maximizing available space of the adjustable pallet rack 300 (e.g., creating additional space) to load an additional loaded pallet 1302*c* on the additional height adjustable shelf 306*b*. Further examples of a loaded adjustable pallet rack 300 are discussed below.

FIG. 15B further illustrates a loaded adjustable pallet rack in accordance with some embodiments. In some embodiments, loaded adjustable pallet rack 1300 (e.g., adjustable pallet racks described herein loaded with freight) is configured to be forklifted (e.g., via a forklift 106). In some embodiments, the loaded adjustable pallet rack 1300 is forklifted from any side. For example, as shown, forklift 106 is able to move loaded adjustable pallet rack 1300 (e.g., via base 302). In some embodiments, the loaded adjustable pallet racks 1300 include one or more loaded pallets 1302 or height adjustable shelves 306. For example, as illustrated in FIG. 15B, the loaded adjustable pallet rack 1300 includes two height adjustable shelves 306 and three loaded pallets 1302. In this way, the loaded adjustable pallet rack 1300 allows for multiple loaded pallets 1302 and/or other freight to be moved at once in a single unit with a set footprint (e.g., dimensions of a loaded pallet rack 1302). In some embodiments, the loaded adjustable pallet rack 1300 is moved to and/or from the transportation unit 150. The use of the loaded adjustable pallet rack 1300 improves overall efficiency and substantially fills the length and width of a transportation unit 150 by allowing a single adjustable pallet rack to support multiple loaded pallets 1302. Further adjustment of the height adjustable shelves 306 allows for use of substantially all of the available space of the transportation unit 150 from top to bottom. Although FIGS. 15A-15C shows a standard forklift (e.g., forklift 106), similar result are achieved by manually transporting a wheeled adjustable pallet rack 320 (as described in FIG. 3B) and/or by an automated/robot moving adjustable pallet rack 350 (as described in FIG. 3C).

FIG. 15C illustrates the moving or transportation of a loaded adjustable pallet rack into a transportation unit in accordance with some embodiments. FIG. 15C shows loaded adjustable pallet rack 1300 being loaded into transportation unit 150. In some embodiments, loaded adjustable pallet rack 1300 is placed in transportation unit 150 with other loaded adjustable pallet rack 1300 and/or with any other adjustable pallet rack variation described herein. The loaded adjustable pallet rack 1300 (or any variations of adjustable pallet rack described herein) are positioned and/or organized within the transportation unit 150 as described herein. In some embodiments, the transportation unit 150 is loaded from the back 1520 of the transportation unit 150.

Figure 16:
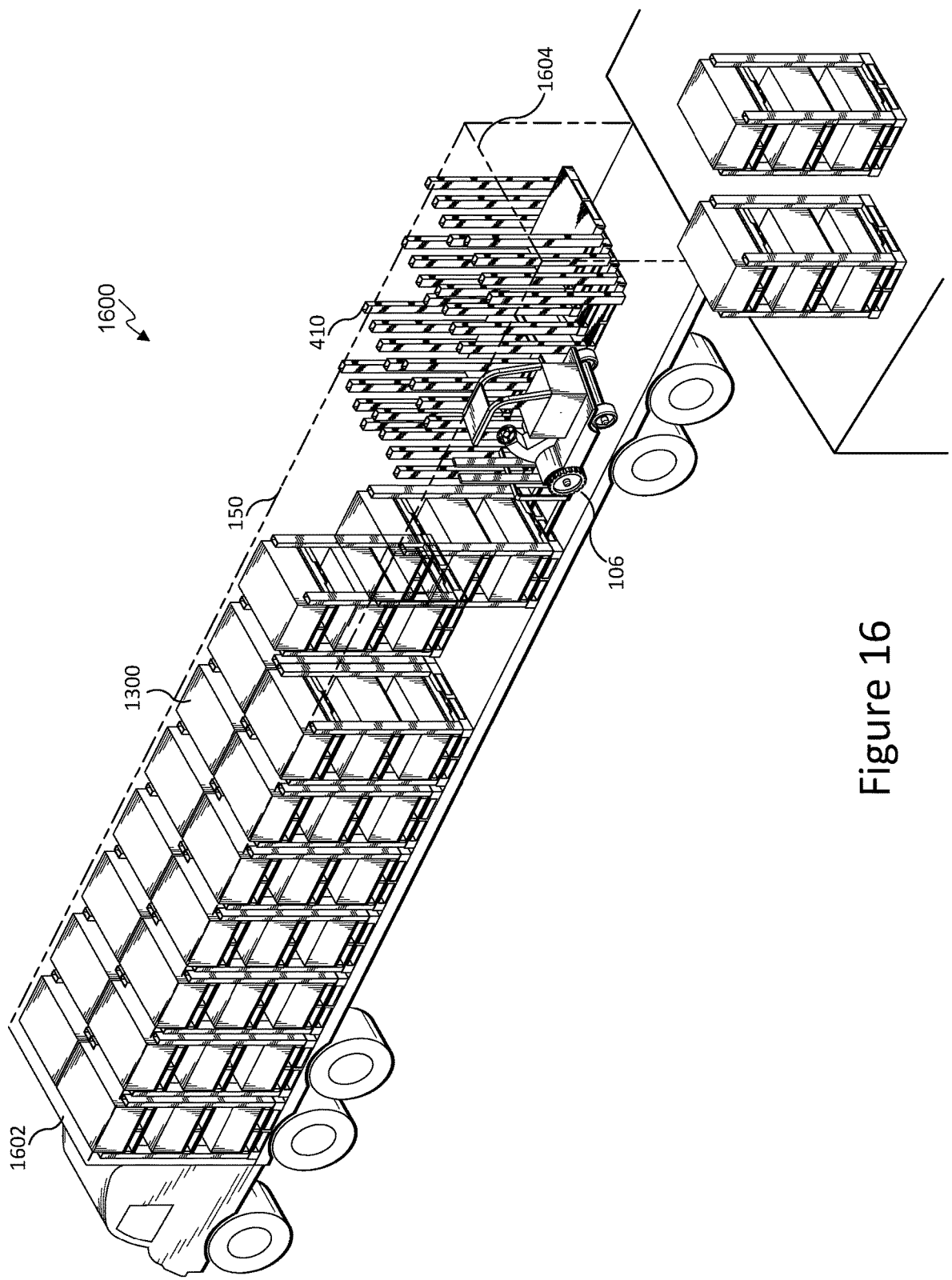
FIG. 16 illustrates a transportation unit in operation in accordance with some embodiments.

FIG. 16 illustrates a transportation unit in operation in accordance with some embodiments. Loading system 1600 a transportation unit 150 loaded with different variations of the adjustable pallet racks described herein (e.g. adjustable pallet racks described in FIGS. 3A-11B). In some embodiments, transportation unit 150 includes a plurality of loaded adjustable pallet racks 1300, nested adjustable pallet racks 410, and/or other variations of the adjustable pallet racks. In some embodiments, the adjustable pallet racks (e.g., nested adjustable pallet racks 410) are reoriented to allow for one or more adjustable pallet racks 1300 to be loaded, unloaded or accessed in transportation unit 150. For example, nested adjustable pallet racks 410 are reoriented to have their opening side or rear side (e.g., opening side 402*a* or rear side 402*b*; FIG. 4) facing the head 1602 (e.g., front) or rear 1604 (e.g., transportation unit exit or entrance) of transportation unit 150. This orientation is perpendicular to the normal loaded position of the adjustable pallet racks described herein (e.g. opening side 402*a* or rear side 402*b* facing the center and/or sidewalls of transportation unit 150). In this way, the adjustable pallet racks allow for the loading and unloading of the transportation unit 150 or accessing other adjustable pallet racks without having to remove the loaded adjustable pallet racks 1300, empty or unloaded adjustable pallet racks (e.g., nested adjustable pallet racks 410) from the transportation unit 150.

As shown in FIG. 16, reorienting adjustable pallet racks (e.g., nested adjustable pallet racks 410) generates space in transportation unit 150 such that a forklift device or vehicle (e.g. forklift 106) may load, unload, or access adjustable pallet racks or other freight as needed. For example, forklift 106 passes reoriented nested adjustable pallet racks 410 to load or unload a loaded adjustable pallet rack 1300. Although nested adjustable pallet racks 410 are shown, any embodiment of the adjustable pallet racks described herein may be reoriented to allow for access of additional adjustable pallet racks in transportation unit 150.

Figure 17:
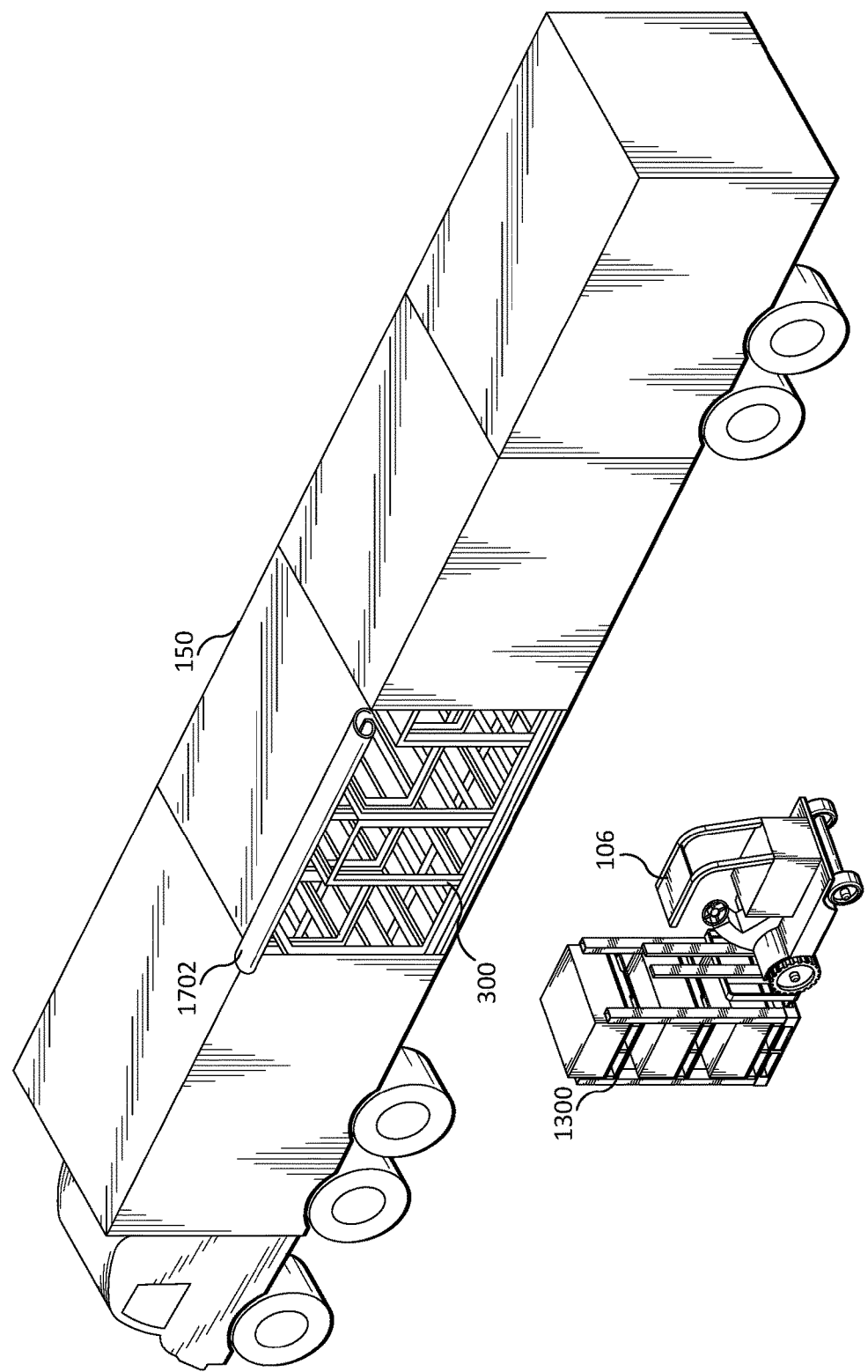
FIG. 17 illustrates another embodiment of a transportation unit being loaded with a loaded adjustable pallet rack in accordance with some embodiments.

FIG. 17 illustrates another embodiment of a transportation unit being loaded with a loaded adjustable pallet rack in accordance with some embodiments. In some embodiments, a transportation unit 150 is accessed via a side 1702 (e.g., instead of the back of the trailer as shown in FIGS. 15A-15C). In some embodiments, a forklift vehicle or device (e.g., forklift 106) loads or unloads a loaded adjustable pallet rack 1300 or an unloaded adjustable pallet rack (e.g., any variation of an adjustable pallet rack described herein) from the side 1702 of the transportation unit 150. In some embodiments, the adjustable pallet racks (e.g. adjustable pallet racks 300) are loaded at ground level.

Figure 18:
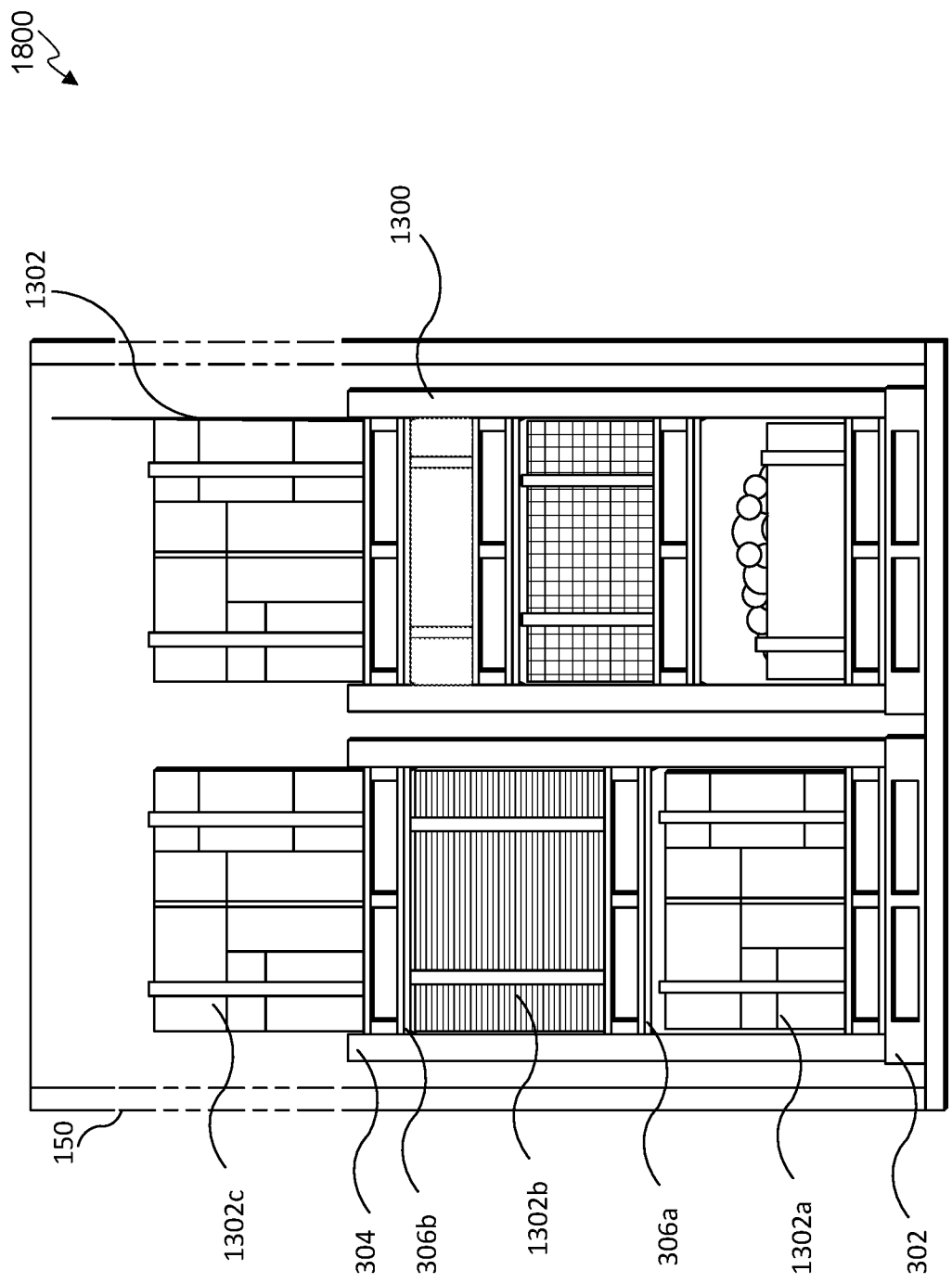
FIG. 18 illustrates a rear view of a transportation unit loaded with adjustable pallet racks in accordance with some embodiments.

FIG. 18 illustrate a rear view of a transportation unit loaded with adjustable pallet racks in accordance with some embodiments. Rear view 1800 shows a view of transportation unit 150 from a loading dock (e.g., rear of an open trailer transportation unit 150; FIG. 2). In some embodiments, transportation unit 150 is loaded with one or more rows 204 (e.g., FIG. 2) of loaded adjustable pallet racks 1300 or unloaded adjustable pallet racks (e.g., adjustable pallet racks described in FIGS. 3A-11B). In some embodiments, the one or more rows 204 of loaded adjustable pallet racks 1300 include at least two adjustable pallet racks. In some embodiment, the loaded adjustable pallet racks 1300 are loaded, unloaded, or nested as described in FIGS. 15A-15C. As further seen in FIG. 18, in some embodiments, the loaded adjustable pallet racks 1300 are loaded with loaded pallets 1302 or other freight. As further shown in FIG. 18, the adjustable pallet racks (any discussed herein) include one or more height adjustable shelves 306 that are configured at different heights.

In some embodiments, loaded adjustable pallet racks 1300 include an open top such that loaded pallets 1302 or other freight may extend higher than the plurality of posts 304. Although loaded pallets 1302 or other freight may extend higher than the plurality of posts 304, there is a predetermined maximum height for a loaded adjustable pallet rack 1300. In some embodiments, the predetermined maximum height for a loaded adjustable pallet rack 1300 is equal to the inner height of the transportation unit 150 (e.g.

floor to roof of transportation unit 150) minus a headroom margin for moving, loading, or unloading the unloaded or loaded adjustable pallet racks 1300 in, out of, or within the transportation unit 150 (e.g., via a forklift 106). In some embodiments, the headroom margin needed is between 1 in. to 1 ft.

In some embodiments, the height of the transportation unit 150 is configured for high capacity (e.g. a high capacity trailer). In some embodiments, a high capacity transportation unit 150 varies from a conventional transportation in that the distance between the floor of the trailer and the ceiling is greater than on a normal. In some embodiments, the high capacity transportation unit 150 includes a higher than normal trailer roof height. In some embodiments, the loaded adjustable pallet racks 1300 uses the space available in the high capacity transportation unit 150 via placement of the one or more height adjustable shelves 306 such that loaded pallets 1302 extend beyond the height of the plurality of posts 304 (e.g., placing a height adjustable shelf 306 near or at the top of the plurality of posts 304). In this way, a high capacity transportation unit 150 is substantially filled or occupied from floor to ceiling without stacking loaded pallets 1302 or other freight on top of each other.

For example, as shown in FIG. 18, top loaded pallet 1302*c* is received and supported by a top height adjustable shelf 306*b*. The top height adjustable shelf 1306*c* is coupled to the top or near the top of plurality of posts 306 and is configured such that it is resting over an additional loaded pallet 1302*b* without applying any additional weight or pressure on the additional loaded pallet 1302*b*. Similarly, no additional weight or pressure is placed on lower loaded pallet 1302*a* that is supported by the base 302 of the loaded adjustable pallet racks 1300. As further shown in FIG. 18, top loaded pallet 1302*c* has a height that extends beyond the height of the plurality of posts 304 and leaves a margin (e.g., headroom of 1 in. to 1 ft.) to be lifted or moved as needed.

The loaded adjustable pallet racks 1300 and variations thereof (e.g., adjustable racks described in FIGS. 3A-11B) may be used in different transportations units with different dimensions (e.g. transportation units described in FIG. 2). In some embodiments, the one or more height adjustable shelves 306 of the adjustable pallet racks 300 allow for efficient use of different transportation units with different dimensions by allowing the loaded pallets 1302 in an adjustable pallet racks 300 to extend beyond the height of the adjustable pallet racks 300 while allowing the adjustable pallet rack 300 to be moved, loaded, or unloaded in, out of, or within the transportations unit 150.

FIGS. 19A-19C illustrate a top down view of configurations and/or positions of adjustable pallet racks in a transportation unit in accordance with some embodiments. In some embodiments, transportation unit 150*a*/150*b* includes one or more rows of adjustable pallet racks 300 or any variation disclosed herein. In some embodiments, the one or more rows of adjustable pallet racks 300 include at least two adjustable pallet racks. In some embodiments, the configurations or positions of the one or more rows of adjustable pallet racks 300 determine the amount of space used in the transportation unit 150. In some embodiments, a first row configuration 1902 of the one or more rows of adjustable pallet racks 300 has the at least two adjustable pallet racks facing each other (e.g., opening sides 1904 or the wider sides facing each other). The first row configuration 1902 includes the opening sides 1904 of the at least two adjustable pallet racks 300 facing the center of transportation unit 150*a* (e.g. respective opening sides 1904 of the at least two adjustable pallet racks 300 facing imaginary midline 1906). In some embodiments, a second row configuration 1908 of the one or more rows of adjustable pallet racks 300 has the opening sides 1904 of the at least two adjustable pallet racks facing away from each other (e.g., narrow sides 1910 facing each other at the center of transportation unit 150*a* and opening sides 1906 facing away from each other towards respective sidewalls 1914*a*/1914*b* of transportation unit 150). In other words, the second row configuration 1908 includes respective narrow sides 1910 of the at least two adjustable pallet racks 300 facing imaginary midline 1906. The second row configuration 1908 is a 180 degrees rotation of the adjustable pallet racks 300 in the first row configuration 1902.

In some embodiments, the one or more rows of adjustable pallet racks 300 alternate between the first 1902 and second 1908 row configuration and vice versa. For example, FIG. 19A shows the one or more rows of adjustable pallet racks 300 with alternating configurations or positions every other row. In some embodiments, alternating between the first 1902 and second 1908 row configuration increases the amount of available space (e.g., freight space) in transportation unit 150*a* (e.g., allowing the adjustable pallet racks to substantially fill the transportation unit leaving at most 2 ft. of the transportation unit length unused and leaving at most 6 in. of the transportation unit width unused). Specifically, the widest sides (e.g., opening side 1904) of the adjustable pallet racks 300 align with the narrow side (e.g., narrow side 1910) of the adjustable pallet racks 300 in an adjacent row. By aligning the alternating configurations of the one or more rows of adjustable pallet racks 300, additional/extra rows of adjustable pallet racks 1902 may be loaded into the transportation unit 150*a*. In some embodiments, the predetermined number of rows of adjustable pallet racks 300 (in alternating configurations) is based on (Number of rows)× (maximum width of adjustable pallet rack+minimum width of adjustable pallet rack)/2 for the length of the transportation unit 150*a*. For example, in some embodiments, an adjustable pallet racks 300 has a maximum width of 49.5 in +/−1 in. (e.g., opening side 1904) and a minimum width of 43 in +/−2 in. (e.g., narrow side 1910) and the total number of predetermined number of rows for a 53 ft. transportation unit is 14 rows.

FIG. 19B shows an alternative configuration of the one or more rows of adjustable pallet racks 300. In some embodiments, transportation unit 150*b* includes one or more rows of adjustable pallet racks 300 in the same configuration (e.g., first 1902 or second 1908 row configuration). For example, as shown in FIG. 19B, each row of the one or more rows of adjustable pallet racks 300 is in the first row configuration 1902. Although not shown, each row of the one or more rows of adjustable pallet racks 300 may be in the second row configuration 1908. In some embodiments, the one or more rows of adjustable pallet racks 300 are in the same configuration to improve overall stability and use as much space as possible in transportation unit 150*b* when the length of the transportation unit 150*b* is greater than the total number of available adjustable pallet racks 300. For example, in some embodiments, the transportation unit 150*a* has a length of 53 ft. and the number of available adjustable pallet racks 300 support 13 rows. In this example, the one or more rows of adjustable pallet racks 300 are either in the first 1902 or the second 1908 row configuration to avoid tipping over and/or sliding (e.g., increasing total surface area used by the adjustable pallet racks 300 and therefore improving stability).

Although not shown in FIGS. 19A and 19B, it should be noted that the one or more rows of adjustable pallet racks 300 may be in either the first 1902 or second 1908 row configuration while unloaded (e.g., empty), loaded with loaded pallets (e.g. loaded pallets 1302) or other freight, or nested (e.g., nested adjustable racks 410).

FIG. 19C illustrates a top down view of the adjustable pallet rack with distinct plurality of posts in accordance with some embodiments. In FIG. 19C, adjustable pallet rack configuration 1930 shows the positioning or orientation of adjustable pallet racks 500 (e.g., adjustable pallet racks described in FIG. 5) in a transportation unit 150c. In some embodiments, adjustable pallet rack configuration 1930 increases the use of the available space in transportation unit 150c by reducing the amount of space used by the plurality of posts 504 of adjustable pallet racks 500. For instance, in some embodiments, adjustable pallet rack configuration 1930 allows at least 15 rows of at least two or more adjustable pallet racks 500 (e.g., adjustable pallet racks configured to be loaded with pallet with dimensions of 40 in. by 48 in.) to be loaded into a transportation unit of at least 53 ft.

FIGS. 20A-20B illustrate top down views of transportation units loaded with different positioning of adjustable pallet racks in accordance with some embodiments. As shown in FIG. 20A. in some embodiments, transportation unit 150a (e.g., FIG. 1) is loaded with one or more rows of adjustable pallet racks 300. In some embodiments, each row of the one or more rows of adjustable pallet racks 2002 includes at least two adjustable pallet racks 300. In some embodiments, adjustable pallet racks 300 are configured as described in FIGS. 3A-11B. In some embodiments, the one or more rows of adjustable pallet racks 300 alternate between a first row configuration and a second row configuration (e.g. described above in FIG. 19A-19C).

In FIG. 20B, transportation unit 150b is loaded with one or more rows of adjustable pallet racks 300. In some embodiments, each row of the one or more rows of adjustable pallet racks 300 includes at least two adjustable pallet racks 300. In some embodiments, adjustable pallet racks 300 are configured as described in FIG. 3A-11B. In some embodiments, each adjustable pallet racks 300 in a row, one or more rows of adjustable pallet racks 300 face the same direction. For example, each adjustable pallet racks 300 in a row of the one or more rows of adjustable pallet racks 300 may face the same sidewall 2004a/2004b of transportation unit 150b (e.g., respective opening sides 402a facing the same direction or sidewall 2004a/2004b). In some embodiments, each row of the one or more rows of adjustable pallet racks 300 alternates the facing direction that the at least two adjustable pallet racks 300. For instance, a first row of the one or more rows of adjustable pallet racks 300 may have the at least two adjustable pallet racks 300 facing sidewall 2004a and a second row (adjacent to the first row) of the one or more rows of adjustable pallet racks 300 may have the at least two adjustable pallet racks 300 facing sidewall 2004b.

In some embodiments, alternating the direction that the at least two adjustable pallet racks 300 face between adjacent rows (e.g., first row facing sidewall 2004a and second row facing sidewall 2004b) reduces the amount of space required to load adjustable pallet racks 300 with wider front sides than rear sides such as in FIG. 6. In some embodiments, the number rows of adjustable pallet racks 300 that may be loaded in transportation unit 150 is equal to (2×(the length of the transportation unit)/(width of the front side of adjustable pallet racks+width of side of adjustable pallet racks)). Placing the one or more rows of adjustable pallet racks 300 in this configuration reduces the space of the transportation unit 150b used by the adjustable pallet racks 300 and increases the total amount of freight that may be loaded in transportation unit 150b.

Figure 21:
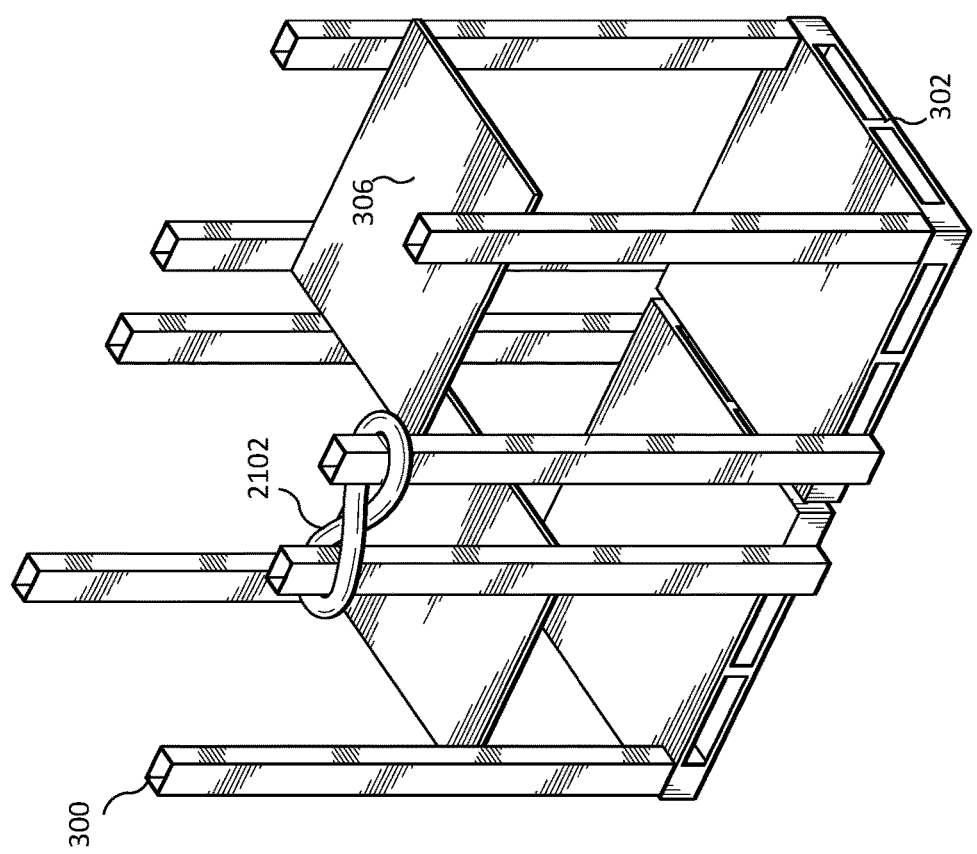
FIG. 21 illustrates a row of two adjustable pallet racks with a connector in accordance with some embodiments.

FIG. 21 illustrates a row of two adjustable pallet racks in accordance with some embodiments. In some embodiments, adjacent adjustable pallet racks 300 (e.g. adjustable pallet racks described in FIGS. 3A-11B) are coupled together to improve stability while in transit (via transportation unit 150; FIG. 2). In general, the adjustable pallet racks 300 are stable over flat terrain. In some embodiments, to improve overall stability over steep terrain, rough terrain, or when the transportation unit 150 (e.g., FIG. 2) is subject to sharp acceleration or deceleration, adjacent adjustable pallet racks 300 are configured to be coupled together. Coupling adjacent adjustable pallet racks 300 together reduces the risk of the adjustable pallet racks 300 tipping over, falling towards the back of the, or towards a side if the adjustable pallet racks 300 if the transportation unit 150 (e.g., FIG. 1) is not loaded with another adjacent pallet rack. In some embodiments, coupling adjustable pallet racks 300 includes connecting the adjacent adjustable pallet rack 300 with a fastener 2102 such as a strap, cable, rigid connector, and/or other securing device. In this way, by connecting adjacent adjustable pallet racks 300 together, the effective base of the adjustable pallet racks 300 becomes twice as wide and therefore increases the stability and greatly reduces the risk of an adjustable pallet rack 300 toppling over in adverse conditions. In some embodiments, the adjustable pallet racks 300 are configured to be coupled on either the same or different rows or on different portions of the adjustable pallet racks (e.g., base 302 coupled to height adjustable shelves 306).

Figure 22:
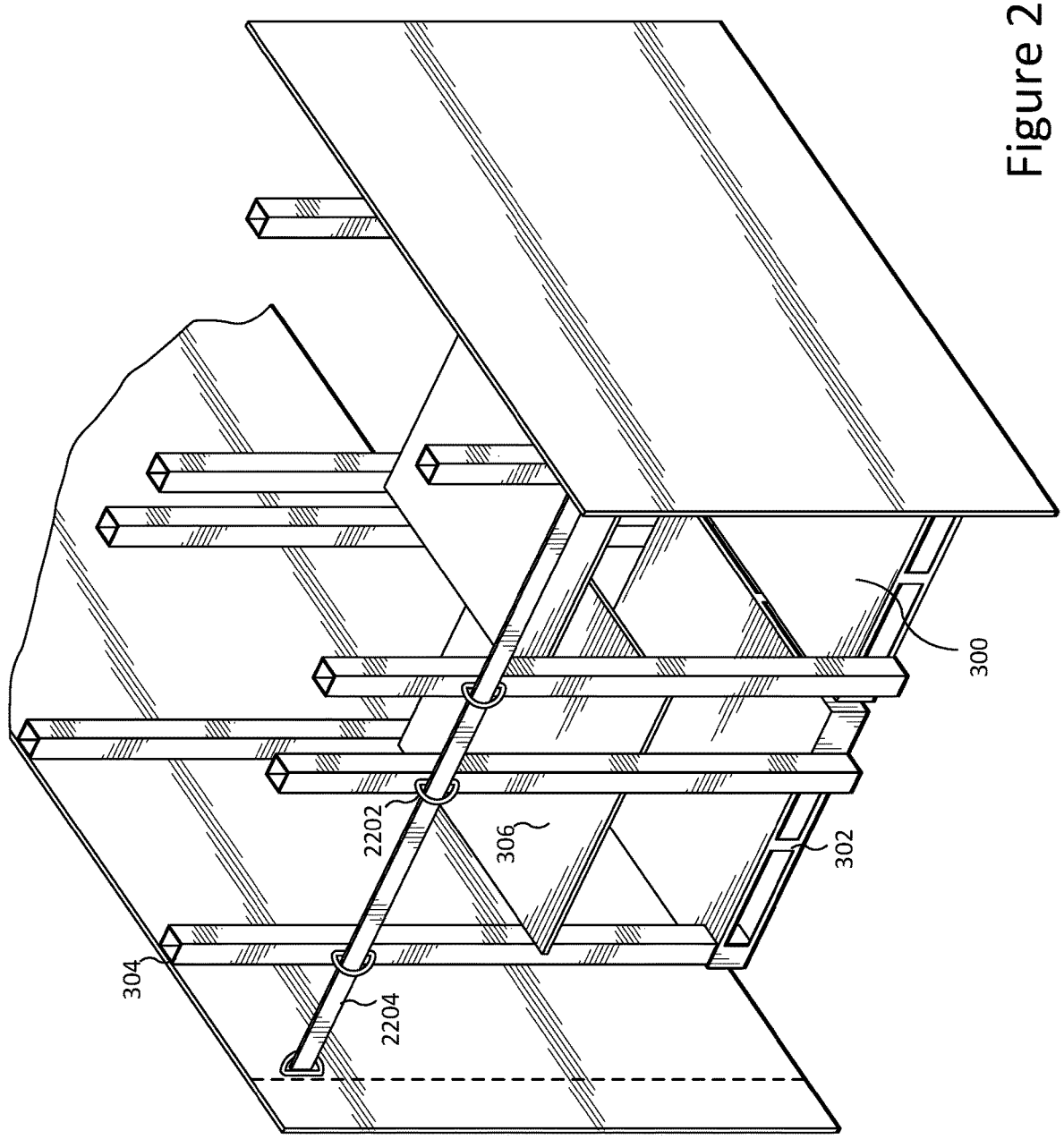
FIG. 22 illustrates adjustable pallet racks being secured to a transportation unit in accordance with some embodiments.

FIG. 22 illustrates adjustable pallet racks being secured to a transportation unit in accordance with some embodiments. In some embodiments, one or more adjustable pallet racks 300 (e.g., adjustable pallet racks described in FIGS. 3A-11B) are secured to transportation unit 150. In some embodiments, adjustable pallet racks 300 include one or more fixtures 2202 (e.g. rings, anchors, gaps, holes, clasps, etc.) on the plurality of posts 304 configured to receive a fastener 2204 (e.g., strap and/or a load bar) to secure adjustable pallet rack 300 to transportation unit 150 and/or other adjustable pallet racks 300. Alternatively and/or additionally, in some embodiments, adjustable pallet rack 300 is secured to transportation unit 150 or other adjustable pallet racks 300 via the plurality of posts 304 (e.g., without fixtures 2202). For example, in some embodiments, a fastener 2204 wraps around, pushes against, and/or crosses the plurality of posts 304. Securing adjustable pallet rack 300 to the transportation unit 150 and/or other adjustable pallet racks 300 reduces the movement of adjustable pallet rack 300 and prevents adjustable pallet rack 300 from toppling over. In some embodiments, at least two adjustable pallet racks 300 are secured together or with transportation unit 150.

In some embodiments, the number and/or type of fasters 2204 used depends on the number of adjustable pallet racks 300 in transportation unit 150 and/or the amount of unused space in transportation unit 150. For example, a transportation unit 150 filled to capacity leaves little room for movement of adjustable pallet racks 300 or makes it improbable for adjustable pallet racks 300 to topple over and, therefore less fasters 2204 are needed. Alternatively, if the transportation unit 150 is mostly unloaded, more fasters 2204 or more restrictive fasteners 2204 (e.g., load bar) are used.

Figure 23:
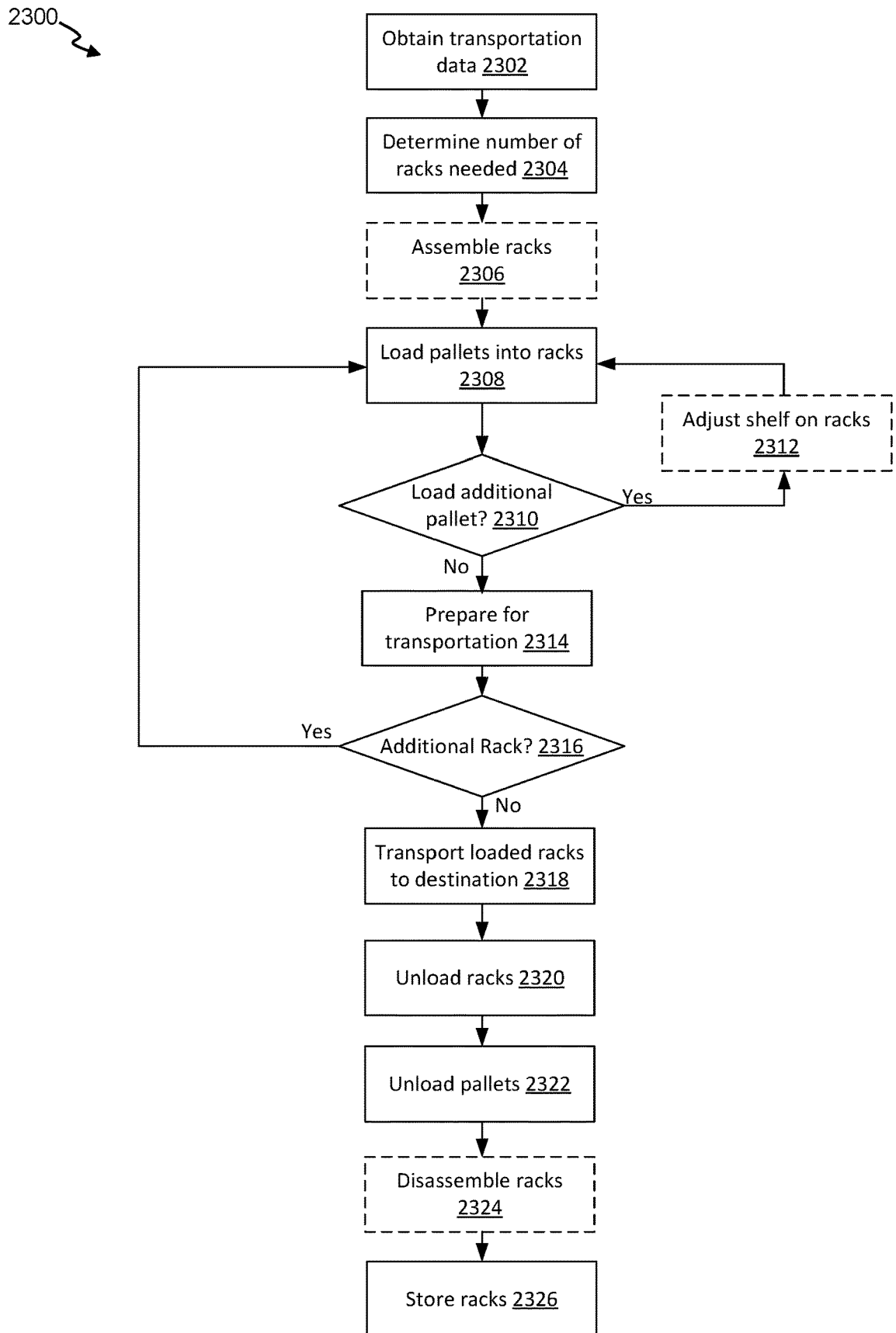
FIG. 23 illustrates a method of loaded adjustable pallet racks in accordance with some embodiments.

FIG. 23 is a flow diagram illustrating a method for transporting adjustable pallet racks via a transportation unit in accordance with some embodiments. The method 2300 includes obtaining (2302) transportation data. In some embodiments, transportation data includes the starting and final locations of the shipment, traveling route, intermediate stops, weigh-ins and check-ins, weight limitations along the traveling route, etc. In some embodiments, the transportation data includes information corresponding to the goods (e.g., on loaded pallets 1302 or other handling units; FIG. 13) such as weight of the goods, the types of goods, restrictions on transporting the goods, conditions in transporting the foods, the size and the dimensions of the goods (e.g., the height, pallet dimensions, etc.), the total number of goods (e.g., number of loaded pallets 1302 or handing units), etc. Additionally or alternatively, in some embodiments, the transportation data includes data corresponding to the transportation unit 150 (e.g. FIG. 1) such as dimensions of the transportation unit, type of transportation unit, region of the transportation unit (e.g., country or state), weight limitations of the transportation unit 150, condition of the transportation unit 150, or unusable space of the transportation unit 150. In some embodiments, the transportation data includes data for at least two shipments, each shipment consisting of one or more loaded pallets (e.g., on loaded pallets 1302 or other handling units; FIG. 13) that are to be loaded on one or more adjustable pallet racks 300.

The method 2300 includes determining (2304) the number of adjustable pallet racks 300, or other variations disclosed herein, needed to optimally use the available space of the transportation unit 150 (e.g., substantially fill a length and width of a transportation unit as described above) or to transport the goods. The number of adjustable pallet racks is determined based on the obtained transportation data. For instance, in some embodiments, the number of adjustable pallet racks 300 is based on the size or dimensions of the pallets (as described above in FIGS. 14A and 14B), the width and length of transportation unit 150, or the number of goods being transported. Additionally or alternatively, in some embodiments, the determined number of adjustable pallet racks 300 is based on the number of adjustable pallet racks needed to substantially fill the length and width of the transportation unit 150.

In some embodiments, if the transportation data includes data for at least two shipments, determining (2304) the number of adjustable pallet racks 300 includes assigning shipments to a transportation unit 150. In conjunction with assigning shipments to the transportation unit 150, determining (2304) the number of adjustable pallet racks 300 includes sequencing or ordering the pickup stop and the delivery stop sequence (e.g., determining an order in which loaded adjustable pallet racks 1300 will be loaded or unloaded from transportation unit 150). For example, the loaded adjustable pallet racks corresponding to a respective shipment will be arranged such that the first shipment pickup (e.g., loaded in transportation unit 150) will be the last delivered shipment (e.g., unloaded from transportation unit 150), and the first shipment to be delivered is the last shipment pickup (e.g., loaded in transportation unit 150). In some embodiments, the sequence or order includes transfer of shipments between transportation units 150. In this way, the amount of handling required at each freight dock is minimized. In some embodiments, the sequence or order of the loaded adjustable pallet racks of the at least two shipments is determined using optimization or other algorithms to minimize the cost to transport the shipments within the service commitments and transit times committed to the shipper.

As a further example, at operation 2304, method 2300 determines the number of adjustable pallet racks required (e.g., adjustable pallet racks 300) to transport a specific freight shipment. In some embodiments, the number of adjustable pallet racks is based on the obtained transportation data corresponding to the goods. For example, in some embodiments, the number of adjustable pallet racks is based on the number of loaded pallets 1302 or handling units in the shipment, the weight of the handling units, and the height and dimensions of the handling units. The obtained (2302) transportation data is used to efficiently plan the transportation of the shipment. This may include the use of fewer adjustable pallet racks than fit in a transportation unit 150, so as to leave room in the transportation unit 150 for freight that will not fit in an adjustable pallet rack or does not require an adjustable pallet rack to be handled efficiently.

In some embodiments, the method 2300 includes assembling (2306) one or more adjustable pallet racks 300. In some embodiments, assembling the one or more adjustable pallet racks 300 is based on the adjustable pallet rack embodiment. For example, in some embodiments, the adjustable pallet rack 300 includes a plurality of collapsible posts 902 (e.g., FIG. 9) that need to be expanded, and/or one or more foldable rigid walls 702 (e.g., FIG. 7) that need to be unfolded, and/or adjusting removable posts 814 (e.g., FIG. 8), and/or removing one or more nested adjustable racks 410 (e.g., FIG. 4), or other embodiments discussed herein.

Method 2300 includes loading (2308) pallets into the adjustable pallet rack 300. The adjustable pallet rack 300 is loaded with goods (e.g., via a loaded pallet 1302; FIG. 13). The loaded pallets 1302 are loaded into adjustable pallet rack 1300 as discussed in FIGS. 14A and 14B. Specifically, based on the configuration of the adjustable pallet rack 300, the loaded pallet 1302 is loaded via a short edge or a long edge. The adjustable pallet rack 300 is loaded until the maximum height available for the loaded adjustable pallet rack 300 is reached but not exceeded. The maximum available height of the loaded adjustable pallet rack 1300 is the inner height of the transportation unit 150 (e.g. floor to roof of the transportation unit 150) minus a headroom margin as described above in FIG. 18, less any height margin required for loading the pallet rack.

Method 2300 includes determining (2310) whether additional loaded pallets need to be loaded into the adjustable pallet rack 300. In some embodiments, if it is determined that the adjustable pallet rack has received a first loaded pallet onto the base 302 and additional freight is planned to be loaded on the same adjustable pallet rack 300, then the method 2300 proceeds to operation 2312 to adjust one or more height adjustable shelves 306.

In some embodiments, at operation 2312, the one or more height adjustable shelves 306 are configured such that additional goods (e.g., loaded pallet racks 1302) may be stacked, loaded vertically (e.g., from floor to ceiling of the transportation unit 150), or transported as needed (e.g., travel conditions, weight restrictions, etc.). At operation 2312 adjusting the height of the shelves in an adjustable pallet rack includes adding or removing a shelf(s) from the adjustable pallet rack to optimize the configuration of the pallet rack for the freight to be loaded and to minimize the number of pallet racks required to handle the freight. For example, after loading a first pallet on the base 302 of the adjustable pallet rack 302, a first height adjustable shelf 306 is added or adjusted in height based on the position (e.g., height) of the first loaded pallet such that the first height adjustable shelf 306 is as low as possible without impinging on the freight on the first pallet. After the first height adjustable shelf 306 has been adjusted, a second pallet may then be loaded on the first height adjustable shelf 306. Method 2300 repeats operations 2308 through 2312 until no additional loaded pallets are to be loaded on adjustable pallet rack 300. In some embodiments, as part of the freight planning process, method 2300 may include optimizing the assignment of pallets or handling units of freight to different pallet racks, to minimize the unused vertical height across multiple pallet racks and minimize the number of pallet racks required to handle the aggregated number of pallets or handling units. Alternatively or additionally. in some embodiments, the height adjustable shelves 306 are configured before the adjustable pallet rack 300 is loaded with freight.

Returning to operation 2310, if it is determined that the adjustable pallet rack 300 is not to be loaded with additional loaded pallet racks 1302 or handling units, method 2300 proceeds to prepare (2314) for transportation. Preparing (2314) for transportation includes staging of loaded pallets 1302 or handling units via the adjustable pallet racks 300 near a dock before stowing it into a warehouse or transferring it for further transportation. Preparing (2314) for transportation also includes loading the loaded adjustable pallet rack 300 onto transportation unit 150. The loaded adjustable pallet racks 1300 are prepared in accordance with one or more configurations described in FIGS. 15A-15C and 19A-20B. In some embodiments, the configuration of the loaded adjustable pallet racks 1300 loaded into transportation unit 150 is based in part on the number of adjustable pallet racks 300 available, the number of adjustable pallet racks needed, the size of the transportation unit, or transportation conditions (e.g., rough terrain, flat surface, steep hills, etc.). In some embodiments, for transportation data that includes at least two shipments, the loaded adjustable pallet racks 1300 are loaded in transportation unit 150 based on the sequence or order determined at operation 2304. Additionally or alternatively, preparing (2314) for transportation may also include strapping the adjustable pallet racks together to secure them for transportation when the adjustable pallet racks are loaded in transportation unit 150. Preparing (2314) for transportation is based on the needs of the shippers or carrier as well as freight planning and the determined number of adjustable pallet racks calculated at step 2304.

Additionally or alternatively, preparing (2314) for transportation includes the transfer of shipments between transportation units 150 by either transferring loaded adjustable pallet racks 300 directly from a first transportation unit 150 to a second transportation unit 150. In some embodiments, preparing (2314) for transportation includes the removal of one or more loaded pallet racks 1302 or handling units of freight from a first loaded adjustable pallet rack 300 in a first transportation unit 150 and reloading the one or more loaded pallet racks 1302 or handling units into either a second pallet rack 300 which is subsequently transferred to a second transportation unit 150, or the reloading of the one or more loaded pallet racks 1302 or handling units directly into the second transportation unit 150 without the use of another adjustable pallet rack 300. In some embodiments, the sequence or order determined at operation 2304 accounts for transfer of shipments between transportation units 150.

Method 2300 includes determining (2316) whether additional adjustable pallets racks 300 need to be prepared for transportation. If it is determined that additional adjustable pallets racks 300 do need to be prepared for transportation, method 2300 repeats operations 2308 through 2314 until no additional adjustable pallets racks 300 need to be prepared for transportation. If at operation 2316 it is determined that no additional adjustable pallets racks 300 need to be prepared for transportation, method 2300 proceeds to transport (2318) the adjustable pallet racks to the shipping destination. The adjustable pallet racks are shipped to the location obtained from the transportation data or locations determined in a freight plan. Freight plans are determined by shippers or carriers to determine the optimal route for transporting goods.

After the adjustable pallet racks 300 have been transported 2318 to the shipping destination, method 2300 further includes unloading (2320) the one or more loaded adjustable pallet racks 300 from the transportation unit. In some embodiments, the one or more loaded adjustable pallet racks 1300 are unloaded from transportation unit 150 individually from the rear 1604 (e.g., FIG. 16) of the transportation unit to the head 1602 (e.g., FIG. 16) of the transportation unit 150 until the transportation unit 150 is empty. Optionally, the loaded adjustable pallet racks 1300 are unloaded from the side of transportation unit 150 as describe in FIG. 17. Alternatively, a few or select loaded adjustable pallet racks 1300 need to be unloaded from transportation unit 150. To unload the few or select loaded adjustable pallet racks 1300, one or more adjustable pallet racks 1300 are adjusted to generate additional space in transportation unit 150 (e.g., changing the orientation of one or more adjustable pallet racks as shown in FIG. 16). The generated additional space allows for a forklift 106 (e.g., FIG. 1) to access one or more adjustable pallet racks 1300 located deeper within the transportation unit 150 (e.g., closer to the head 1602 of transportation unit 150).

Method 2300 includes unloading (2322) the loaded pallets 1302 from the loaded adjustable pallet racks 1300. The loaded pallets 1302 are unloaded from the adjustable pallet racks in the same manner as they are loaded in adjustable pallet rack 1300. Specifically, the loaded pallets 1302 are removed from the loaded adjustable pallet racks 1300 via a short edge or a long edge as discussed in FIGS. 14A and 14B. In some embodiments, for transportation data that includes at least two shipments, the loaded adjustable pallet racks 1300 are unloaded from transportation unit 150 based on the sequence or order determined at operation 2304. In some embodiments, method 2300 includes, after unloading adjustable pallet racks 300, disassembling (2324) the adjustable pallet racks 300. The adjustable pallet racks 300 are disassembled based on the configuration of the adjustable pallet racks 300. For example, in some embodiments of the adjustable pallet racks 300 require folding, removal of posts, removal of material, or other disassembling features as discussed herein. In some embodiments, folding, collapsing and/or otherwise disassembling adjustable pallet racks 300 and/or other variations disclosed herein reduces the amount of cost and space required to transport empty adjustable pallet racks 300.

Method 2300 further includes, storing (2326) adjustable pallet racks 300. In some embodiments, storing (2326) includes placing the adjustable pallet racks 300 in a warehouse, a transportation unit 150, or in standby to be subsequently used. In some embodiments, the adjustable pallet racks 300 are stored after being disassembled. In some embodiments, the adjustable pallet racks 300 are stored in a nested or stacked configuration to reduce the amount of space used by the total number of adjustable pallet racks 300 (e.g., FIGS. 4A through 4D). In some embodiments, a maximum safe nesting/stacking number and/or height for the nested or stacked adjustable pallet racks 300 is determined. The determined nesting/stacking number and/or height for the nested or stacked adjustable pallet racks 300 is used to manage the nesting or stacking the adjustable pallet racks 300. In some embodiments, the nesting/stacking number and/or height for the nested or stacked adjustable pallet racks 300 is based on the total number of adjustable pallet racks 300, adjacent adjustable pallet racks 300, the height of the transportation unit 150, the available space (length, width, and/or height) of the transportation unit 150, etc. In some embodiments, the determined nesting/stacking number and/or height for the nested or stacked adjustable pallet racks 300 is equal to or less than the 12. in from the maximum height of the nested or stacked adjustable pallet racks 300 and the interior ceiling of the transportation unit 150 (e.g., the number of stacked or nested adjustable pallet racks 300 must leave at least 12 in. of space from the top of the stacked or nested adjustable pallet racks 300 and the interior ceiling of the transportation unit 150). In some embodiments, when adjustable pallet racks 300 are stored in a transportation unit 150 while in a nested configuration or not, the adjustable pallet racks 300 may be strapped together to secure them for transportation. Optionally, in some embodiments, before storing the at least two pallet rack units, the at least two pallet rack units are strapped together to improve stability and safety (e.g. FIGS. 21 and 22).

All of these examples are non-limiting and any number of combinations and multi-layered structures are possible using the example structures described above.

Further embodiments also include various subsets of the above embodiments including embodiments in FIGS. 1-23 combined or otherwise re-arranged in various embodiments, as one of skill in the art will readily appreciate while reading this disclosure.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A transportation unit loading system comprising:
    a pallet rack unit having at least six sides including a bottom, a top opposing the bottom, and four sides between the bottom and the top, the pallet rack unit configured to: (i) receive and support at least two loaded pallets that are each forkliftable, and (ii) be loaded into the transportation unit with other pallet rack units that are substantially identical to the pallet rack unit and that together substantially fill a length and width of the transportation unit, the pallet rack unit comprising:
        a base at the bottom of the pallet rack unit, the base having a top surface configured to receive thereon a first loaded pallet of the at least two loaded pallets via a first side of the four sides of the pallet rack unit, such that when loaded, the first loaded pallet occupies substantially the entire top surface, and the base being configured to be forkliftable separately from the at least two loaded pallets;
        a plurality of posts coupled to the base; and
        at least one height adjustable shelf coupled to the posts and configured to receive and support a second loaded pallet of the at least two loaded pallets via the first side of the pallet rack unit.

2. The system of claim 1, wherein the base is configured to be moved by a forklift, a pallet jack, a walkie, or an automated forklift.

3. The system of claim 1, wherein a first set of posts of the plurality of posts are spaced such that they define the first side of the pallet rack unit, the first side of the pallet rack unit configured to receive a short side of the at least two loaded pallets.

4. The system of claim 1, wherein a first set of posts of the plurality of posts are spaced such that they define the first side of the pallet rack unit, the first side of the pallet rack unit configured to receive a long side of the at least two loaded pallets.

5. The system of claim 1, wherein the rack unit includes a cross-beam coupled between at least two posts of the plurality of posts and is aligned with a side of the base.

6. The system of claim 1, wherein the pallet rack unit and the other pallet rack units are configured to be loaded into the transportation unit in two or more rows, the two or more rows substantially filling the length and width of the transportation unit.

7. The system of claim 6, wherein:
    a first row of the two or more rows includes the pallet rack unit and a first other pallet rack unit; and
    the first row has a first configuration, wherein the pallet rack unit and the first other pallet rack unit have respective loading sides facing each another.

8. The system of claim 7, wherein
    a second row of the two or more rows is adjacent to the first row;
    the second row of the two or more rows includes a second pallet rack unit and a second other pallet rack unit; and
    the second row has a second configuration, wherein the second pallet rack unit and the second other pallet rack unit have respective loading sides facing opposite directions.

9. The system of claim 8, wherein the two or more rows alternate between a first and second configuration.

10. The system of claim 9, wherein the first configuration and the second configuration are configured such the two or more rows have the plurality of posts of the respective pallet rack units partially overlapped.

11. The system of claim 1, wherein the pallet rack unit and the other pallet rack units are configured to be loaded into the transportation unit in 14 or more rows.

12. The system of claim 1, wherein substantially filling the width of the transportation unit leaves less than 6 inches of unused width in the transportation unit.

13. The system of claim 1, wherein substantially filling the length of the transportation unit leaves less than 2 feet of unused length in the transportation unit.

14. The system of claim 1, wherein the base includes an opening for forklift access that is less than 3.25 inches high and a top of the base is less than 4.5 inches from the ground.

15. The system of claim 1, wherein the pallet rack unit has a height of at least 72 inches and a first side of the pallet rack unit has a length less than 51 inches, the first side being the greatest length.

16. The system of claim 1, wherein the other pallet rack units are configured to be nested within the pallet rack unit.

17. A pallet rack unit comprising:
    a base at the bottom of the pallet rack unit, the base having a top surface configured to receive thereon a first loaded pallet of at least two loaded pallets via a first side of four sides of the pallet rack unit, such that when loaded, the first loaded pallet occupies substantially the entire top surface, and the base configured to be forkliftable separately from the at least two loaded pallets;
a plurality of posts coupled to the base; and
at least one height adjustable shelf coupled to the posts and configured to support a second loaded pallet of the at least two loaded pallets via the first side of the pallet rack unit;
wherein the pallet rack unit has at least six sides including the bottom, a top opposing the bottom, and the four sides between the bottom and the top, the pallet rack unit being configured to: (i) receive and support the at least two loaded pallets that are each forkliftable, and (ii) be loaded into a transportation unit with other pallet rack units that are substantially identical to the pallet rack unit and that together substantially fill a length and width of the transportation unit.

18. A method of loading and transporting pallet rack units in a transportation unit, the method comprising:
obtaining transportation data;
determining a number of pallet rack units based on the transportation data, wherein the number of determined pallet rack units is at least two pallet rack units;
loading a pallet rack unit of the at least two pallet rack units with at least one loaded pallet, wherein the pallet rack unit is configured to (i) receive and support at least two loaded pallets that are each forkliftable, and (ii) be loaded into the transportation unit with other pallet rack units that are substantially identical to the pallet rack unit and that together substantially fill a length and width of the transportation unit, and the pallet rack unit having at least six sides including a bottom, a top opposing the bottom, and four sides between the bottom and the top and includes:
a base at the bottom of the pallet rack unit, the base having a top surface configured to receive thereon a first loaded pallet of the at least two loaded pallets via a first side of the four sides of the pallet rack unit such that when loaded, the first loaded pallet occupies substantially the entire top surface, and, the base being configured to be forkliftable separately from the at least two loaded pallets,
a plurality of posts coupled to the base, and
at least one height adjustable shelf coupled to the posts and configured to receive and support a second loaded pallet of the at least two loaded pallets via the first side of the pallet rack unit;
determining an arrangement of the pallet rack unit with other pallet rack units of the at least two pallet rack units;
loading the pallet rack unit in the transportation unit with the other pallet rack units of the at least two pallet rack units based on the determined arrangement of the pallet rack unit with other pallet rack units of the at least two pallet rack units; and
transporting the at least two pallet rack units to a predetermined location, the predetermined location based on the obtained transportation data.

19. The method of claim 18, further comprising, after loading the pallet rack unit of the at least two pallet rack units with at least one loaded pallet, adjusting one or more height adjustable shelves of the pallet rack unit and loading an additional loaded pallet on the adjusted one or more height adjustable shelves of the pallet rack unit.

20. The method of claim 19, further comprising, after determining the number of determined pallet racks units based on the transportation data, assembling the at least two pallet racks.

21. The method of claim 18, wherein the pallet rack units loaded into the transportation unit form an array of at least two by two pallet rack units.

22. The system of claim 1, wherein the pallet rack units loaded into the transportation unit form an array of at least two by two pallet rack units.

* * * * *